(12) United States Patent
Choe et al.

(10) Patent No.: US 12,043,940 B2
(45) Date of Patent: Jul. 23, 2024

(54) LAUNDRY TREATING APPARATUS AND SYSTEM HAVING THE SAME

(71) Applicant: LG Electronics Inc., Seoul (KR)

(72) Inventors: Dami Choe, Seoul (KR); Eunsoo Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/851,667

(22) Filed: Jun. 28, 2022

(65) Prior Publication Data

US 2022/0411984 A1    Dec. 29, 2022

(30) Foreign Application Priority Data

Jun. 28, 2021  (KR) .................... 10-2021-0084010

(51) Int. Cl.
*D06F 34/05* (2020.01)
*D06F 34/32* (2020.01)
*D06F 34/34* (2020.01)
*D06F 101/00* (2020.01)

(52) U.S. Cl.
CPC ............. *D06F 34/05* (2020.02); *D06F 34/32* (2020.02); *D06F 34/34* (2020.02); *D06F 2101/00* (2020.02)

(58) Field of Classification Search
CPC ........................ D06F 34/05; D06F 2101/00
See application file for complete search history.

(56) References Cited

U.S. PATENT DOCUMENTS

| 7,925,298 B2 * | 4/2011 | Chen ................... G06F 3/0481 345/169 |
| 2014/0156082 A1 * | 6/2014 | Ha ..................... H04L 12/2818 700/275 |
| 2015/0267338 A1 | 9/2015 | Helms et al. |

FOREIGN PATENT DOCUMENTS

| EP | 2706704 | 3/2014 |
| EP | 3670728 | 6/2020 |
| JP | 2014230060 | 12/2014 |
| KR | 10-2013-0090252 | 8/2013 |
| KR | 10-2016-0062917 | 6/2016 |

(Continued)

OTHER PUBLICATIONS

Extended European Search Report in European Appln. No. 22181546.7, dated Mar. 30, 2023, 7 pages.

(Continued)

*Primary Examiner* — Joseph L. Perrin
*Assistant Examiner* — Kevin G Lee
(74) *Attorney, Agent, or Firm* — Fish & Richardson P.C.

(57) ABSTRACT

A laundry treating apparatus includes: a cabinet; a drum; a driver rotating the drum; a control panel including a manipulation portion receiving a selection command for selecting a course or an option triggering an operation of the driver, a display portion displaying state information including at least one of a name, a selected state, or an executed state of the course or the option, and a setting portion disposed at an outside of the manipulation portion and the display portion and receiving a change command to change the option; a communication module communicating with a home appliance; and a switch disposed at the cabinet and receiving a connection command that causes the communication module to communicate with the home appliance, where the setting portion is deactivated, based on the switch receiving (Continued)

an input, to thereby restrict at least a part of the setting portion from receiving the change command.

20 Claims, 27 Drawing Sheets

(56) References Cited

FOREIGN PATENT DOCUMENTS

| | | |
|---|---|---|
| KR | 20180086168 | 7/2018 |
| KR | 20200014029 | 2/2020 |
| KR | 102236743 | 4/2021 |

OTHER PUBLICATIONS

International Search Report in International Appln. No. PCT/KR2022/009234, dated Oct. 13, 2022, 9 pages.
Office Action in Korean Appln. No. 10-2021-0084010, mailed on Mar. 26, 2024, 12 pages (with English translation).

\* cited by examiner

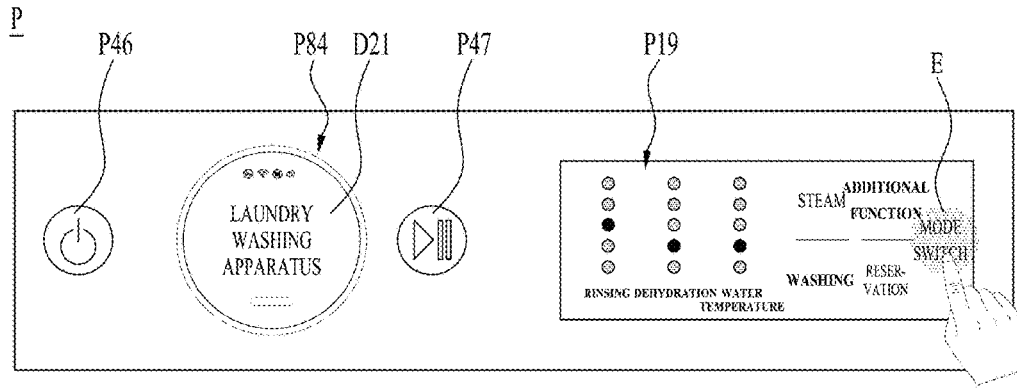
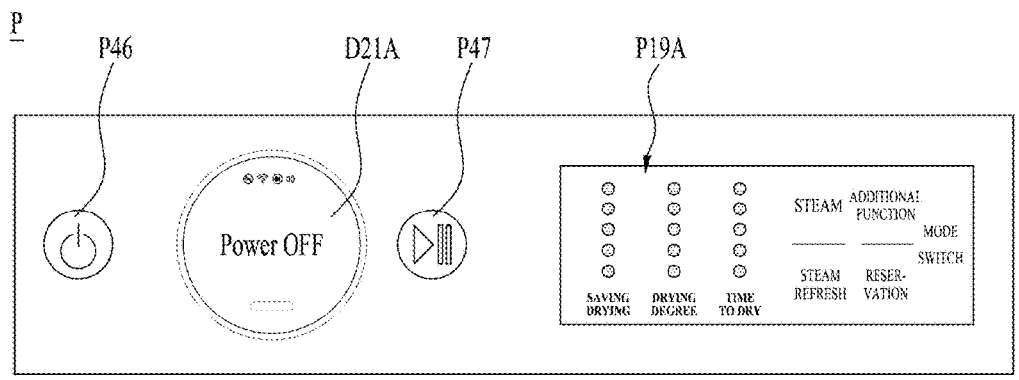
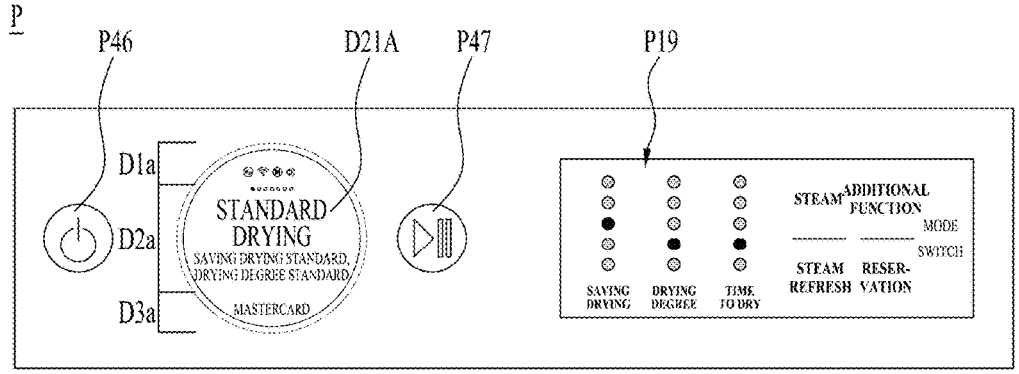

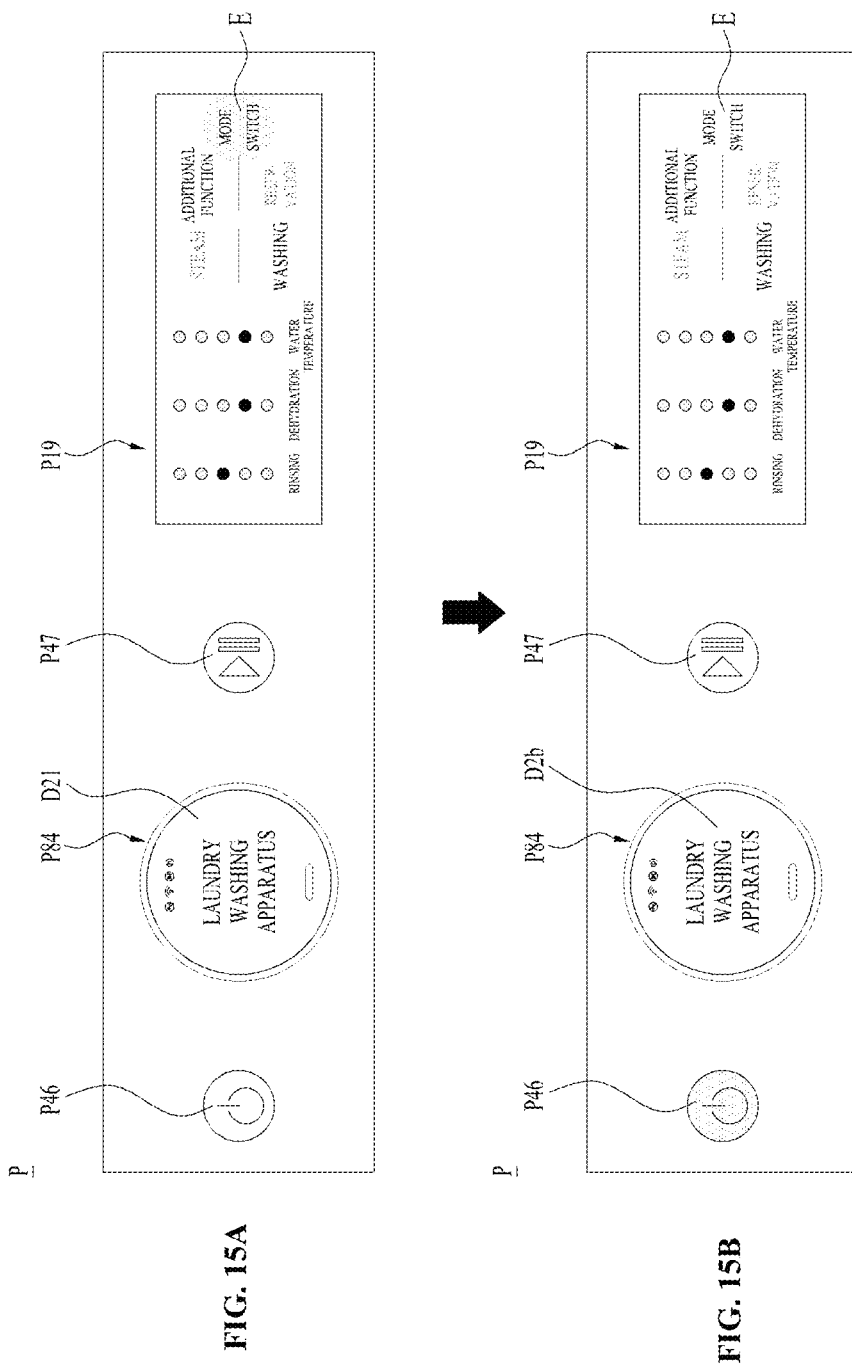

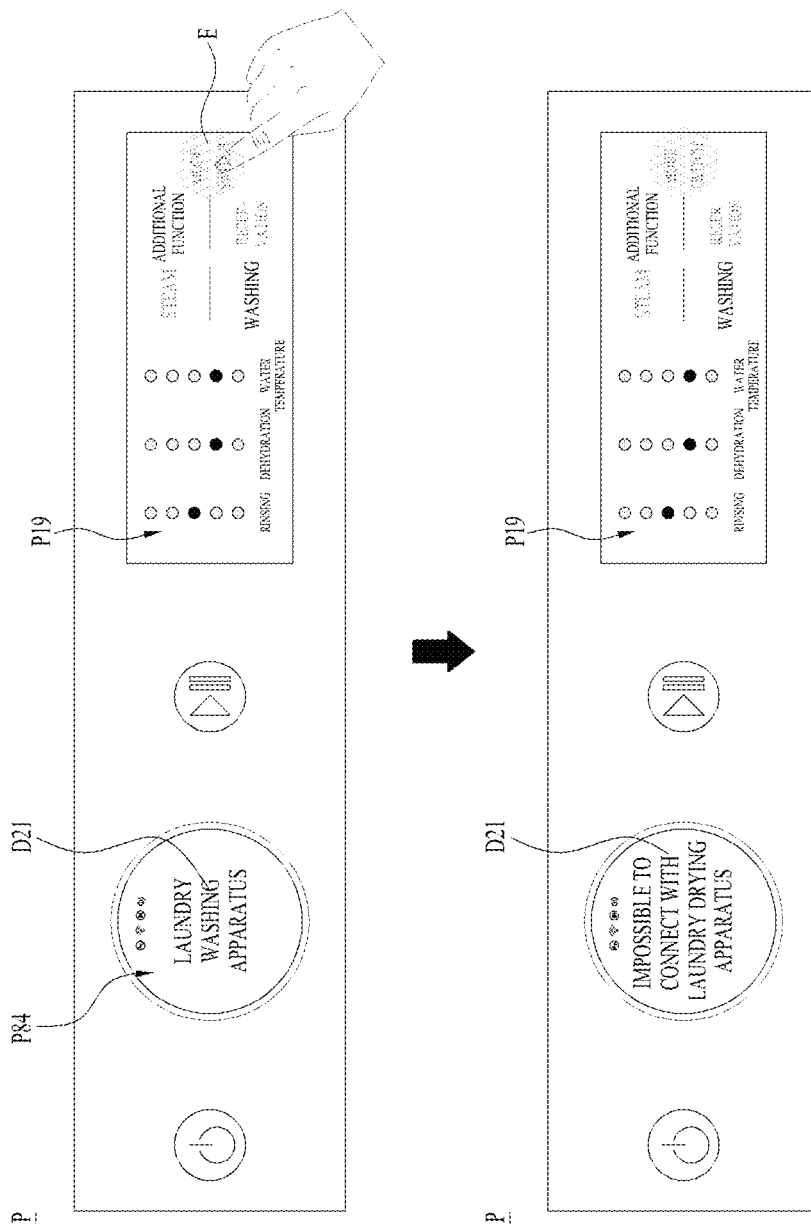

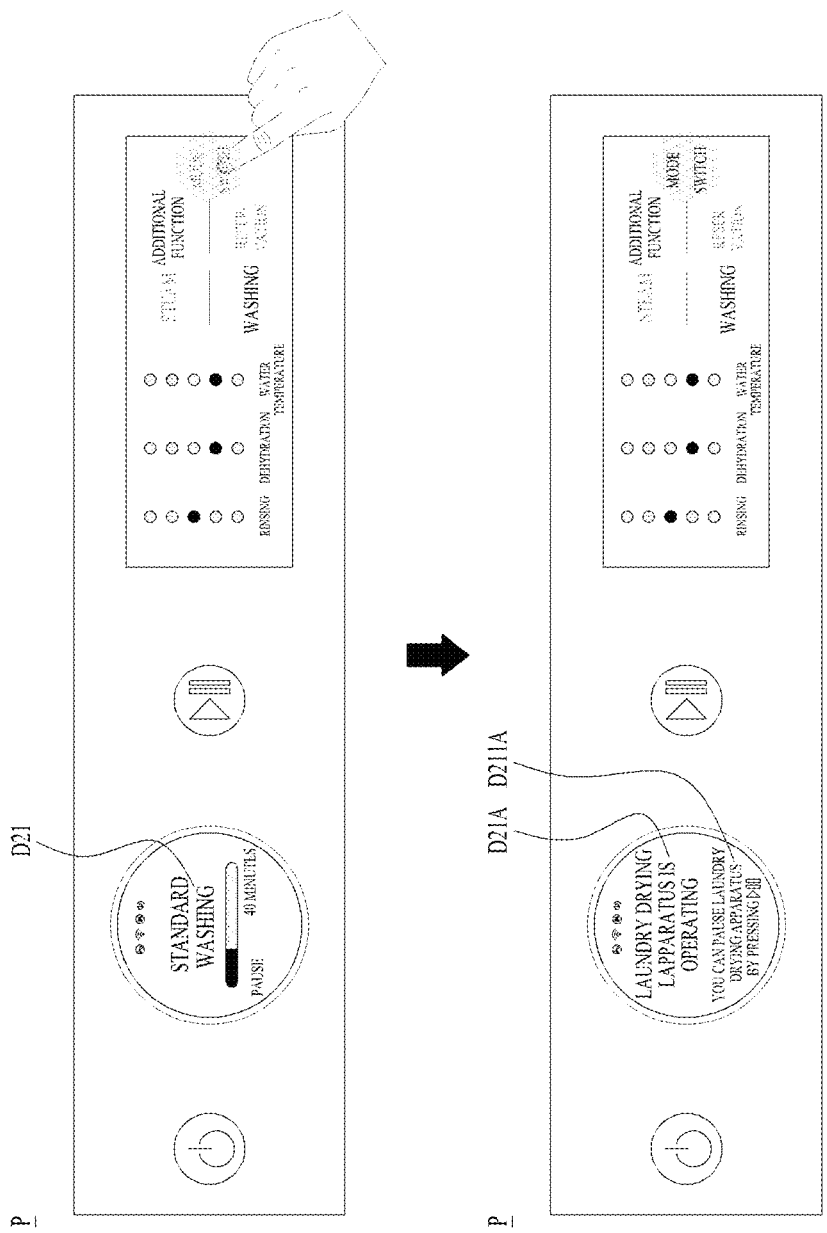

LAUNDRY TREATING APPARATUS AND SYSTEM HAVING THE SAME

CROSS-REFERENCE TO RELATED APPLICATION

This application claims the benefit of Korean Patent Application No. 10-2021-0084010, filed on Jun. 28, 2021, which is hereby incorporated by reference as if fully set forth herein.

TECHNICAL FIELD

The present disclosure relates to a system in which a plurality of laundry treating apparatuses are disposed.

BACKGROUND

Laundry treating apparatuses may be classified into a laundry washing apparatus that washes laundry with water and detergent, and a laundry drying apparatus that dries the laundry containing moisture. Recently, the number of households in which the washing and the drying are performed simultaneously by arranging the laundry washing apparatus and the dryer in one household has increased significantly.

Referring to Korean Patent Application Publication No. 10-2020-0014029, a system in which the laundry washing apparatus and the laundry drying apparatus respectively have communication modules to communicate with each other has appeared. As a result, the laundry drying apparatus was able to receive information on a course and an option performed by the laundry washing apparatus, select drying course and option suitable for the course and the option, and then recommend the selected drying course and option to a user.

Therefore, based on operating the laundry washing apparatus, the user was able to perform appropriate course and option without special manipulation of the laundry drying apparatus. As a result, a performance of the laundry drying apparatus was able to be used to the maximum, and there was convenience of not having to manipulate a control panel of the laundry drying apparatus frequently.

However, in the conventional system, there was a problem in that the laundry washing apparatus only transmits the information to the laundry drying apparatus, and there is no embodiment in which the laundry drying apparatus transmits information to the laundry washing apparatus. In particular, even when the laundry washing apparatus receives the information from the laundry drying apparatus, there is a problem that there is no suggestion or scheme for utilizing the received information.

In particular, when the laundry washing apparatus and the laundry drying apparatus are spaced apart from each other, there was a hassle of having to access both the laundry washing apparatus and the laundry drying apparatus in order for the user to identify states of the laundry washing apparatus and the laundry drying apparatus.

Furthermore, when the control panel of the laundry washing apparatus or laundry drying apparatus is constructed as a rotary knob or the like and does not have a large display screen, there was a problem that there was no innovative scheme to display the states of the laundry washing apparatus and the laundry drying apparatus with the laundry washing apparatus or display the states of the laundry washing apparatus and the laundry drying apparatus with the laundry drying apparatus.

Therefore, the conventional system had a problem in that, despite the fact that the environment in which the laundry washing apparatus and the laundry drying apparatus are in communication with each other and are able to exchange various information with each other is established, a control method for actively utilizing such environments is not provided.

SUMMARY

The present disclosure is to provide a system that may identify a state of another laundry treating apparatus with one laundry treating apparatus.

The present disclosure is to provide a system in which one laundry treating apparatus may display not only a state of thereof but also a state of another laundry treating apparatus by selection of a user.

The present disclosure is to provide a system capable of inputting a command for controlling another laundry treating apparatus with one laundry treating apparatus.

The present disclosure is to provide a system in which a laundry washing apparatus may receive information of a laundry drying apparatus from the laundry drying apparatus, selectively display a state of the laundry drying apparatus, and directly manipulate the laundry drying apparatus.

One aspect of the present disclosure provides a laundry treating apparatus comprising: a cabinet; a drum received in the cabinet so as to accommodate laundry therein; a driver for rotating the drum; manipulation portion for receiving a selection command for selecting a course or an option capable of triggering an operation of the driver; a display portion for displaying thereon state information including at least one of a name, selected state, and an executed state of the course or the option; a setting portion disposed outside of the manipulation portion and the display portion and configured to receive a change command to change the option; a communication module configured to communicate with a home appliance, wherein the home appliance is disposed outside of the cabinet and is capable of accommodating therein the laundry; and a switching portion disposed on the cabinet and configured to receive a connection command to instruct the communication module to communicate with the home appliance.

In this regard, when the connection command is input to the switching portion, the setting portion is configured such that at least one menu thereof is deactivated so that the change command is prohibited to be input thereto.

In one implementation, when the connection command is input to the switching portion, the display portion is configured to display thereon a list of options allowed to be changed in the home appliance.

In one implementation, when the list of options allowed to be changed in the home appliance is displayed on the display portion, the manipulation portion is configured to receive a selection command for selecting the option allowed to be changed in the home appliance.

In one implementation, the apparatus further comprises a selection portion configured to receive a determination command to determine the state information, wherein the determination command is variable based on the state information, wherein the list of options allowed to be changed in the home appliance is displayed on the display portion, the selection portion is configured to receive a determination command for determining the selection command selecting the option allowed to be changed in the home appliance.

In one implementation, the display portion is configured to display a list of options prohibited to be selected based on an executed state of a course or an option of the home appliance such that the list of options is prohibited to be selected using the manipulation portion.

In one implementation, when the connection command is input to the switching portion, the display portion is configured to display thereon at least one of a name, a selected state, and an executed state of a course or an option which the home appliance can execute, wherein when the home appliance receives a control command for independently selecting or executing the course or the option, the display portion is configured to display thereon the name, the selected state, or the executed state of the course or the option allowed to be selected using the manipulation portion.

In one implementation, the display portion is configured to display thereon an executed state of a course or an option allowed to be selected using the manipulation portion and an executed state of a course or an option performed in the home appliance in different forms.

In one implementation, the display portion is configured to display thereon a remaining time duration of the course or the option allowed to be selected using the manipulation portion, wherein the display portion is configured to not display thereon a remaining time duration of the course or the option performed in the home appliance.

In one implementation, when the communication module and the home appliance cannot communicate with each other, the display portion, and when the connection command is input to the switching portion, the display portion is configured to display thereon display inability information to indicate that a name, a selected state, or an executed state of a course or an option which the home appliance can perform cannot be displayed thereon.

In one implementation, when the communication module and the home appliance cannot communicate with each other while the display portion displays the name, the selected state, or the executed state of the course or the option that the home appliance can perform, the display portion is configured to display thereon at least one of or the display inability information or reconnection information for re-attempting communication connection with the home appliance.

In one implementation, when the reconnection state or the inability state is continuously displayed for a reference time duration, the display portion is configured to re-display thereon the name, the selected state, and the executed state of the course or the option allowed to be selected using the manipulation portion.

In one implementation, when the connection command is input to the switching portion again within the reference time duration, the display portion is configured to display thereon the reconnection information.

In one implementation, a list of options displayed on the display portion is variable based on an executed state of a course or an option of the home appliance.

In one implementation, the communication module is configured to further communicate with an additional product, wherein the additional product is disposed separately from the cabinet and the home appliance and is configured to accommodate therein the laundry.

In this regard, when the connection command is input to the switching portion, the display portion is configured to display thereon a selection request for requesting to select one of the home appliance and the additional product such that at least one of a name, a selected state, and a executed state of a course or an option of the selected one is displayed on the display portion.

In one implementation, the manipulation portion is configured to select one of the home appliance and the additional product such that at least one of a name, a selected state, and a executed state of a course or an option of the selected one is displayed on the display portion.

In one implementation, the manipulation portion is rotatably disposed on the cabinet, wherein the display portion is fixedly disposed on the cabinet and is positioned inside the manipulation portion.

The present disclosure has the effect of identifying the state of another laundry treating apparatus with one laundry treating apparatus.

The present disclosure has the effect in which one laundry treating apparatus may display not only the state of thereof but also the state of another laundry treating apparatus by the selection of the user.

The present disclosure has the effect of inputting the command for controlling another laundry treating apparatus with one laundry treating apparatus.

The present disclosure has the effect in which the laundry washing apparatus may receive the information of the laundry drying apparatus from the laundry drying apparatus, selectively display the state of the laundry drying apparatus, and directly manipulate the laundry drying apparatus.

BRIEF DESCRIPTION OF THE DRAWINGS

FIGS. 13A to 16D show various embodiments in which another laundry treating apparatus is able to be controlled by the control panel.

FIGS. 20 to 27B show additional embodiments of utilizing a control panel of a laundry treating apparatus of the present disclosure.

DETAILED DESCRIPTION

Figure 1:
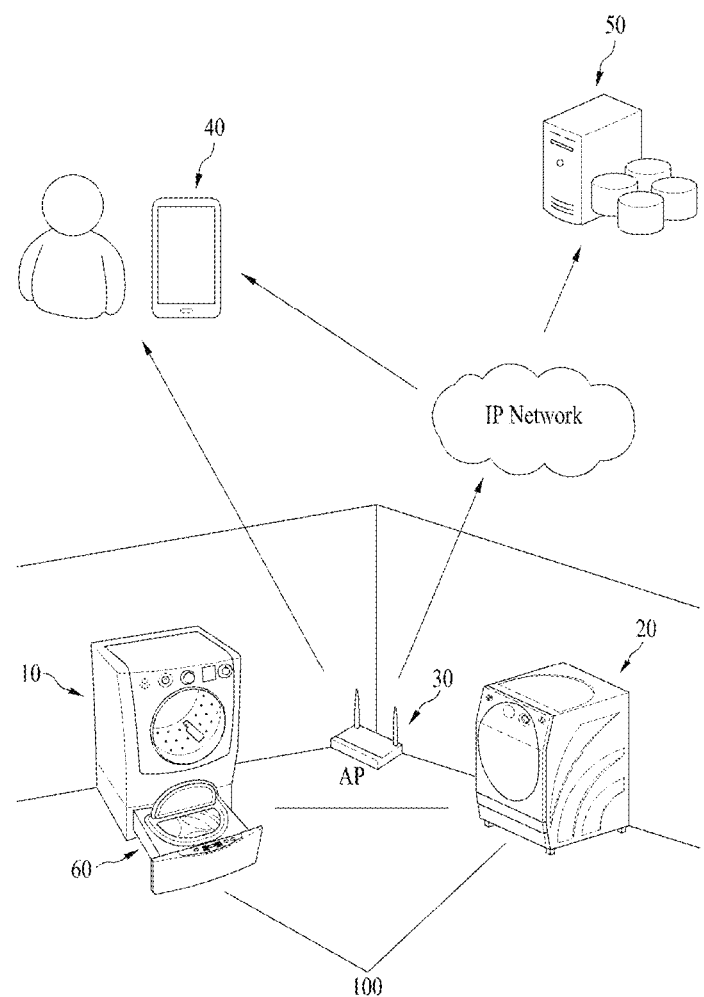
FIG. 1 shows a system having laundry treating apparatuses of the present disclosure.

Hereinafter, embodiments disclosed in the present specification will be described in detail with reference to the accompanying drawings. In the present specification, even in different embodiments, the same and similar reference numerals are assigned to the same and similar components, and the description thereof is replaced with the first description. As used herein, the singular expression includes the plural expression unless the context clearly dictates otherwise. In addition, in describing the embodiments disclosed herein, when it is determined that a detailed description of a related known technology may obscure the gist of the embodiments disclosed herein, a detailed description thereof will be omitted. In addition, the accompanying drawings are only for easy understanding of the embodiments disclosed in the present specification, and it should be noted that the technical idea disclosed in the present specification is not to be construed as being limited by the accompanying drawings.

FIG. 1 shows a home appliance system and an online system in which a laundry treating apparatus of the present disclosure is disposed.

The laundry treating apparatus of the present disclosure may include a laundry washing apparatus 10 that performs an arbitrary washing course or washing option that performs a washing cycle for removing foreign substances from laundry using water and detergent, and a mini apparatus 60 that is disposed near or beneath the laundry washing apparatus and performs the arbitrary washing course or washing option that performs the washing cycle for removing the foreign substances from the laundry using the water and the detergent.

The laundry washing apparatus 10 may be of a front load type in which the laundry is put into the laundry washing apparatus 10 from a front face thereof, and the mini apparatus 60 may be of a top load type in which the laundry is put into the mini apparatus 60 from a top face thereof.

As shown, the mini apparatus 60 may be disposed beneath the laundry washing apparatus 10 to increase a vertical level of a laundry inlet of the laundry washing apparatus 10. In this case, the mini apparatus 60 may be of a drawer type of being extended frontwards such that a laundry inlet thereof into which the laundry is put is exposed.

In addition, the mini apparatus 60 may be disposed on top of the laundry washing apparatus 10. Accordingly, a user may easily access the mini apparatus 60.

In one example, the laundry treating apparatus of the present disclosure may include a laundry drying apparatus 20 that performs an arbitrary drying course or drying option that dries the laundry containing moisture after the washing is completed in the laundry washing apparatus 10 or the mini apparatus 60.

The user may arrange the laundry washing apparatus 10 and the laundry drying apparatus 20 among the laundry treating apparatus of the present disclosure together in the room, and may include all of the components of the laundry treating apparatus by additionally including the mini apparatus 60.

Accordingly, the mini apparatus 60 may wash laundry that has a relatively small volume and is frequently washed, such as underwear and baby clothes. In addition, the laundry washing apparatus 10 may wash laundry that has a large volume and is infrequently washed, such as jeans and quilts.

In one example, at least one of the laundry washing apparatus 10, the laundry drying apparatus 20, and the mini apparatus 60 may access an Internet network via a router (AP) 30. At least one of the laundry washing apparatus 10, the laundry drying apparatus 20, and the mini apparatus 60 may have a communication module to connect to the router, and a server 50 provided by a producer who produced the laundry treating apparatus may recognize the laundry washing apparatus 10, the laundry drying apparatus 20, and the mini apparatus 60 via port information of the router 30 and register and control the laundry washing apparatus 10, the laundry drying apparatus 20, and the mini apparatus 60.

When the user has an external terminal 40 equipped with a communication module, such as a smartphone, the user may access the server 50 via the Internet network with the external terminal 40 to control at least one of the laundry washing apparatus 10, the laundry drying apparatus 20, and the mini apparatus 60.

In addition, the user may register at least one of the laundry washing apparatus 10, the laundry drying apparatus 20, and the mini apparatus 60 to the server 50 via the external terminal 40.

In addition, when there is notification information or there is an update of the course or the option for at least one of the laundry washing apparatus 10, the laundry drying apparatus 20, and the mini apparatus 60, the server 50 may notify the user with the external terminal 40.

In one example, the laundry washing apparatus 10, the laundry drying apparatus 20, and the mini apparatus 60 may be configured to be in communication with each other.

One of the laundry washing apparatus 10, the laundry drying apparatus 20, and the mini apparatus 60 may be configured to be in communication with the other two via the router 30 and the server 50. To this end, each of the laundry washing apparatus 10, the laundry drying apparatus 20, and the mini apparatus 60 may include the communication module such as WIFI.

In addition, the laundry washing apparatus 10, the laundry drying apparatus 20, and the mini apparatus 60 may be configured to be in communication with each other without via the server 50. For example, the laundry washing apparatus 10, the laundry drying apparatus 20, and the mini apparatus 60 may be configured to be in communication with each other via a Bluetooth communication module.

The laundry washing apparatus 10, the laundry drying apparatus 20, and the mini apparatus 60 may be configured to be in communication with each other to share the states thereof with each other and to display each other's states.

For example, the user may identify the states of the laundry drying apparatus 20 and the mini apparatus 60 via the laundry washing apparatus 10. Therefore, even when the laundry drying apparatus 20 and the mini apparatus 60 are disposed to be spaced apart from the laundry washing apparatus 10 or are disposed at positions where the laundry drying apparatus 20 and the mini apparatus 60 are not visible when the user looks at the laundry washing apparatus 10, the user may display the states of the laundry drying apparatus 20 and the mini apparatus 60 via the laundry washing apparatus 10.

The laundry washing apparatus 10, the laundry drying apparatus 20, and the mini apparatus 60 may be configured to share names of a course or option thereof, a selected state of the course or option thereof, a executed state of the course or option thereof, a completion state of the course or option thereof, and an error or notification state thereof with each other or display each other's names and states of the courses or options and error or notification states.

In addition, one of the laundry washing apparatus 10, the laundry drying apparatus 20, and the mini apparatus 60 may be configured to manipulate the other two with a manipulation portion thereof for receiving a command.

The laundry washing apparatus 10, the laundry drying apparatus 20, and the mini apparatus 60 may transmit and receive control commands to and from each other via the respective communication modules thereof or the server 50.

Accordingly, even when the laundry washing apparatus 10, the laundry drying apparatus 20, and the mini apparatus 60 are spaced apart from each other, the user may control another device with one device, thereby improving convenience.

Figure 2:
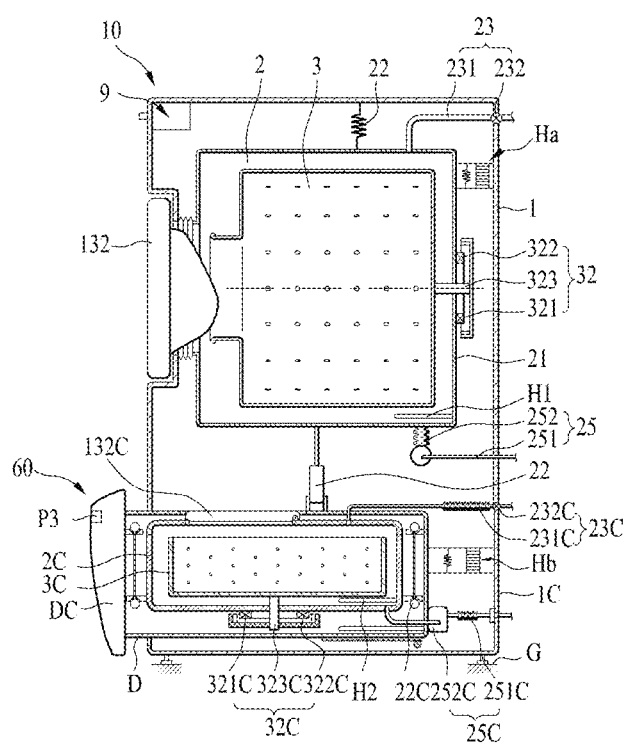
FIG. 2 shows structures of a laundry washing apparatus and a mini apparatus of a laundry treating apparatus of the present disclosure.

FIG. 2 shows an embodiment of internal structures of the laundry washing apparatus 10 and the mini apparatus 60.

Unlike the drawing, the laundry washing apparatus 10 and the mini apparatus 60 may be independently constructed to be separated from each other.

The laundry washing apparatus 10 may include a cabinet 1 that forms an appearance of the laundry washing apparatus, a tub 2 that is accommodated in the cabinet 1 and stores water therein, a drum 3 that is rotatably disposed in the tub 2 and stores water therein, a driver 32 that is coupled to the tub 2 to rotate the drum 3, a water supply 23 that is constructed to supply water to the tub 2, and a drainage 25 constructed to drain water of the tub 2.

Each of the tub 2 and the drum 3 may have the laundry inlet for putting the laundry into the laundry washing apparatus in a front face thereof, and the cabinet 1 may further include a door 132 for opening and closing the laundry inlet.

The driver 32 may include a stator 321 coupled to a rear face of the tub 2, a rotor 322 rotated by the stator 321, and a rotation shaft 323 coupled to the rotor 322 to rotate the drum 3.

The water supply 23 may include a water supply pipe 231 that allows an external water supply source and the tub 2 to be in communication with each other, and a water supply valve 232 that opens and closes the water supply pipe 231.

In one example, the water supply 23 may further include a detergent box that is able to be extended forwardly of the cabinet 1 and is constructed to put detergent into the tub 2, and the water supply pipe 231 may be in communication with the detergent box.

The drainage 25 may include a drain pipe 251 disposed below the tub 2, and a drain pump 252 coupled to the drain pipe 252 to provide power for discharging water.

The laundry washing apparatus 10 may further include a support 22 that supports the tub 2 to the cabinet 1, and a heater H1 that heats water inside the tub 2.

In addition, the laundry washing apparatus 10 may further include a hot air supply Ha constructed to supply hot air to the tub 2.

In one example, the laundry washing apparatus 10 may include a control panel P or a washing controller that receives a command for displaying or controlling the state of the laundry washing apparatus 10. The control panel P may be disposed coupled to the cabinet 1.

In addition, the control panel P may operate at least one of the driver 32, the water supply valve 232, the drain pump 252, the heater H1, and the hot air supply Ha to perform the arbitrary washing course and washing option for removing the foreign substances from the laundry. The washing course and the washing option may be composed of a series of control methods capable of performing all of a washing cycle, a rinsing cycle, and a dehydration cycle.

The mini apparatus 60 may include a mini cabinet 1C that forms an appearance of the mini cabinet, a mini tub 2C that is accommodated in the mini cabinet 1C and stores water therein, a mini drum 3C that is rotatably disposed in the mini tub 2C and stores water therein, a mini driver 32C that is coupled to the mini tub 2C to rotate the mini drum 3C, a mini water supply 23C constructed to supply water to the mini tub 2C, and a mini drainage 25C constructed to drain water of the mini tub 2C.

The mini cabinet 1C may be disposed beneath the cabinet 1 to support the cabinet 1. It is not excluded that the mini cabinet is placed on top of the cabinet 1.

The mini cabinet may be formed integrally with the cabinet 1.

Each of the mini tub 2C and the mini drum 3C may have the laundry inlet for putting the laundry into the mini apparatus in a top face thereof, and the mini laundry cabinet 1C may further include a mini door 132C for opening and closing the laundry inlet.

The mini driver 32C may include a mini stator 321C coupled to a bottom face of the mini tub 2C, a mini rotor 322C rotated by the mini stator 321C, and a mini rotation shaft 323C coupled to the mini rotor 322C to rotate the mini drum 3C.

The mini water supply 23C may include a mini water supply pipe 231C that allows the external water source and the mini tub 2C to be in communication with each other, and a mini water supply valve 232C that opens and closes the mini water supply pipe 231C.

In one example, the mini water supply 23C may further include a mini detergent box that is able to be extended forwardly of the cabinet 1 and is constructed to put the detergent into the mini tub 2C, and the mini water supply pipe 231C may be in communication with the detergent box.

The mini drainage 25C may include a mini drain pipe 251C disposed below the mini tub 2C, and a mini drain pump 252C coupled to the mini drain pipe 252C to provide power for discharging water.

The mini apparatus 60 may further include a mini support 22C that supports the mini tub 2C to the mini cabinet 1C, and a mini heater H2 that heats water inside the mini tub 2C.

In addition, the mini apparatus 60 may further include a hot air supply Hb constructed to supply hot air to the mini tub 2C.

In one example, the mini apparatus 60 may include a mini control panel PC or a mini controller that receives a command for displaying or controlling the state of the mini apparatus 60. The mini control panel PC may be disposed coupled to the mini cabinet 1C.

In addition, the mini control panel PC may operate at least one of the mini driver 32C, the mini water supply valve 232C, the mini drain pump 252C, the mini heater H2, and the mini hot air supply HaC to perform the arbitrary washing course and washing option for removing the foreign substances from the laundry. The washing course and the washing option may be composed of a series of control methods capable of performing all of the washing cycle, the rinsing cycle, and the dehydration cycle.

The mini apparatus 60 may further include a drawer D that is able to be extended forwardly of the mini cabinet 1c and accommodates the mini tub 2c therein. The drawer D may include a front cover DC at a front face thereof to open and close an entrance through which the drawer D is extended from the mini cabinet 1C.

The mini control panel PC may be disposed on the front cover DC.

Figure 3:
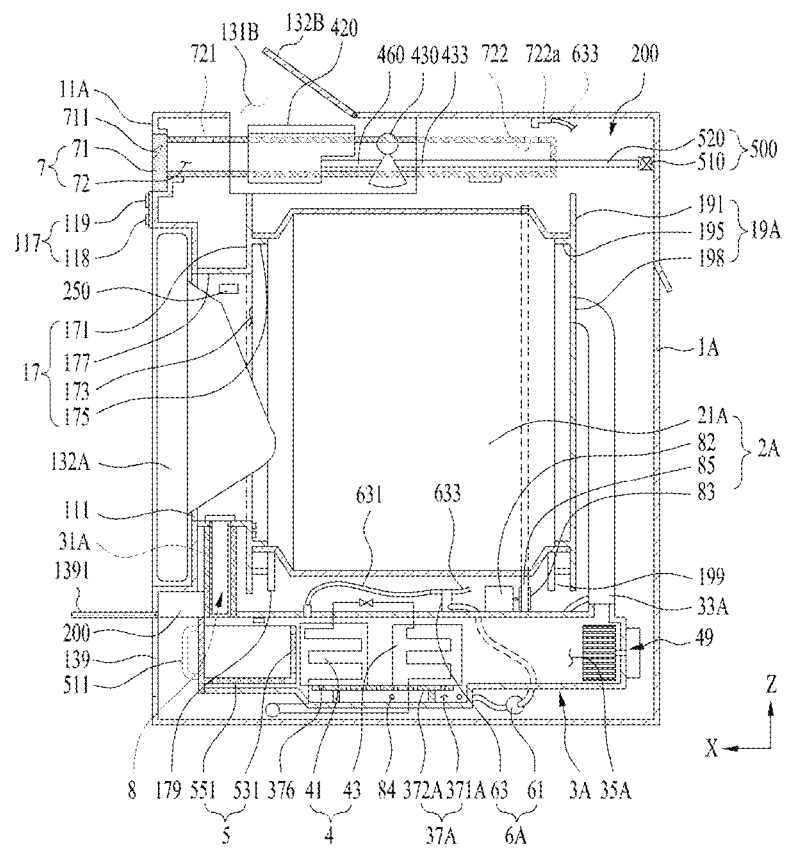
FIG. 3 shows a structure of a laundry drying apparatus of a laundry treating apparatus of the present disclosure.

FIG. 3 shows a structure of the laundry drying apparatus 20 of the laundry treating apparatus of the present disclosure.

The laundry drying apparatus 20 may include a drying cabinet 1A, a drying drum 2A that is rotatably disposed inside the drying cabinet to provide a space for storing the laundry, a circulation flow path 3A that forms a flow path for re-supplying air discharged from the drying drum 2 to the drying drum 2A, and a heat exchanger 4 that dehumidifies and heats air introduced into the circulation flow path 3A and then re-supplies dehumidified and heated air to the drying drum 2A.

When the drying drum 2A is formed as a cylindrical drum body 21A with open front face and rear face, a first support 17 that rotatably supports the front face of the drying drum 2A and a second support 19A that rotatably supports the rear face of drying drum 2A may be disposed inside the cabinet 1A.

The first support 17 may include a first fixed body 171 fixed inside the drying cabinet 1A, a drum laundry inlet 173 defined to extend through the first fixed body to allow the laundry inlet 111 and an interior of the drum body 21A to be in communication with each other, and a first support body 175 disposed on the first fixed body 171 and inserted into a front face (a first open face) of the drum body 21A.

The first fixed body 171 may be in any shape as long as the drum laundry inlet 173 and the first support body 175 are able to be disposed. The first support body 175 may be formed in a pipe shape protruding from the first fixed body 171 toward the drying drum body 21A. A diameter of the first support body 175 may be larger than a diameter of the drum laundry inlet 173, and may be smaller than a diameter of a front face of the drying drum body 21A. In this case, the drum laundry inlet 173 will be located inside the space defined by the first support body 175.

The first support 17 may further include a connection body 177 that connects the laundry inlet 111 and the drum laundry inlet 173 to each other. The connection body 177 may be formed in a pipe shape extending from the drum laundry inlet 173 toward the laundry inlet 111. The connection body 177 may have an air outlet 178 in communication with the circulation flow path 3A.

The air outlet 178, as a passage that allows air inside the drying drum body 21A to flow to the circulation flow path 3, may be defined as a through-hole defined to extend through the connection body 177.

The second support 19A may include a second fixed body 191 fixed inside the cabinet 1A, and a second support body 195 disposed on the second fixed body 191 and inserted into a rear face (a second open face) of the drum body 21A. The second support 19 includes an air inlet 198 defined to extend through the second fixed body 191 to allow an interior of the drum body 21 and an interior of the drying cabinet 1A to communicate with each other. In this case, a duct 3A may be constructed to connect the air outlet 178 and the air inlet 198 to each other.

The cylindrical drum body 21A with an empty interior may be rotated by various types of drying drivers. A case in which the drying driver 82,83,85 includes a motor 82 fixed inside the drying cabinet 1A, a pulley 85 rotated by the motor, and a belt 83 that connects a circumferential face of the pulley 85 and a circumferential face of the drum body 21A to each other is shown as an example.

In one example, the drying driver may be disposed on a rear face of the drying drum 2A to directly rotate the drum 2A. A rotation shaft of the drying driver 82,83,85 may be directly coupled to the drum 2A to rotate the drying drum 2A.

In this case, the second support 19A may support the drying driver 82,83,85 to be located on a rear face or at a center of the drying drum 2A.

In one example, a separate reducer may be disposed between the drying driver 82,83,85 and the drying drum 2A. In this case, a rotation shaft from the reducer may be directly coupled to a center of the rear face of the drum 2A, and the reducer may be coupled to and supported by the second support 19.

In this regard, the drying driver 82,83,85 may freely change a rotation speed and a rotation direction of the drum 2A.

The first support 17 may have a first roller 179 that rotatably supports the circumferential face of the drum body 21A, and the second support 19 may have a second roller 199 that rotatably supports the circumferential face of the drum body.

The circulation flow path 3A may include a duct in communication with the drum 2. The duct 3A may be in communication with the drying drum 2A, so that it may be considered that the duct 3A forms a circulation flow path in which air discharged from the drying drum passes the heat exchanger 4 and is re-introduced into the drum 2A.

The duct 3A may include an exhaust duct 31A connected to the air outlet 178, a supply duct 33A connected to the air inlet 198, and a connection duct 35A that connects the exhaust duct and the supply duct to each other.

The heat exchanger 4 may be formed as various apparatuses as long as the dehumidification and the heating of air introduced into the duct 3A may be sequentially performed. For example, the heat exchanger 4 may be formed as a heat pump system.

The heat exchanger 4 may include a fan 49 that allows air to flow along the duct 3A, a first heat exchanger (a heat absorber) 41 that removes moisture from air introduced into the duct 3A, and a second heat exchanger (a heater) 43 that is disposed inside the duct 3A to heat air that has passed through the first heat exchanger 41.

The heat absorber 41 may be formed as an evaporator that absorbs heat, and the heater 43 may be formed as a condenser that emits heat.

Figure 4:
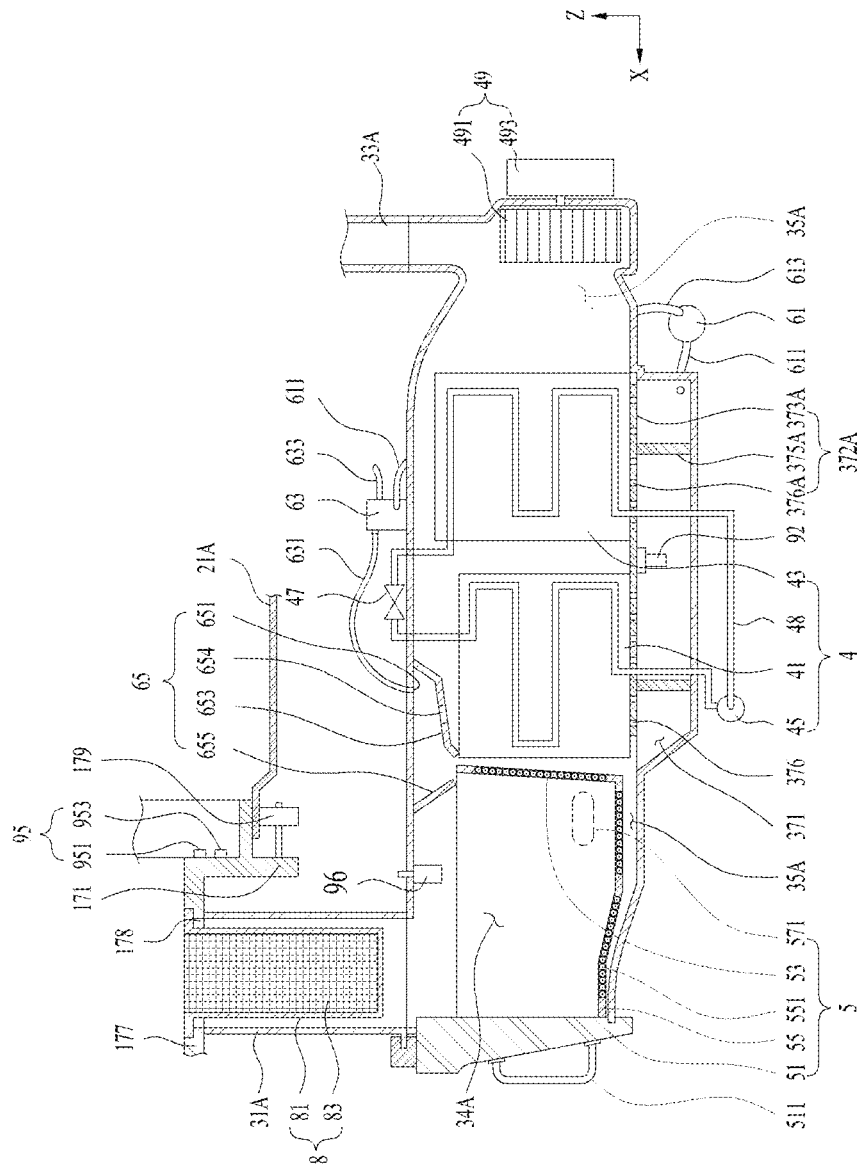
FIG. 4 shows a structure of a washer of a laundry drying apparatus.

The fan 49 may include an impeller 491 disposed inside the duct 3A, and an impeller motor 493 that rotates the impeller 491 (see FIG. 4). The impeller 491 may be disposed in any of the exhaust duct 31A, the connection duct 35A, and the supply duct 33A. The impeller 491 may be disposed in the supply duct 33A.

The heat absorber 41 is formed with multiple metal plates disposed along a width direction (a Y-axis direction) of the connection duct 35A or a height direction (a Z-axis direction) of the connection duct, and the heater 43 may be formed with multiple metal plates disposed along the width direction of the connection duct or the height direction of the connection duct. The heat absorber 41 and the heater 43 are sequentially arranged inside the connection duct 35A in a direction from the exhaust duct 31A toward the supply duct 33A, and are connected to each other via a refrigerant pipe 48 that forms a circulation flow path of a refrigerant.

The refrigerant moves along the refrigerant pipe 48 by a compressor 45 located outside the duct 3A, and the refrigerant pipe 48 has a pressure regulator 47 that adjusts a pressure of the refrigerant that has passed through the heater 43.

The heat absorber 41 is means for cooling air and evaporating the refrigerant by transferring the heat of air introduced into the exhaust duct 31A to the refrigerant. The heater 43 is means for heating air and condensing the refrigerant by transferring the heat of the refrigerant that has passed through the compressor 45 to air. In this case, the moisture contained in air will be collected on a bottom face of the connection duct 35A along a surface of the heat absorber 41 when passing through the heat absorber 41.

In order to collect water removed from air passing through the heat absorber 41, the laundry drying apparatus 20 has a water collecting portion.

The water collected in the water collecting portion may be collected in a water storage 7 and discharged all at once later. The water storage 7 may include a water storage tank 72 that is detachably disposed in the cabinet 1 to provide a space for storing water, and an inlet 722 defined to extend through the water storage tank 72 to introduce water discharged from a water storage supply pipe 633 into the water storage tank 72.

The water storage tank 72 may be formed as a tank in a form of a drawer extended from the cabinet 1. In this case, the front panel 11A of the cabinet must have a water storage mounting hole or tank hole into which the water storage tank 72 is inserted. A water storage panel 71 is fixed to a front face of the water storage tank 72. The water storage panel 71 may be detachably coupled to the water storage mounting hole or tank hole 115 to form a portion of the front panel 11A.

The water storage panel 71 may further include a groove 711 into which a user's hand is inserted. In this case, the water storage panel 71 will also perform a function of a handle for extending or retracting the water storage tank 72 from or into the cabinet.

The inlet 722 may be defined to receive water discharged from a nozzle 722a fixed to the drying cabinet 1A. The nozzle 722a may be fixed to a top panel 13 of the cabinet so as to be positioned above the inlet 722 when the storage body 72 is inserted into the cabinet 1.

In the water storage 7 having the above structure, the user may discard water inside the water storage tank 72 by extending the water storage tank 72 from the cabinet 1 and then inverting or tilting the water storage tank 72 in a direction in which the inlet 722 is directed. A communication hole 721 defined to extend through a top face of the storage body 72 may be further defined such that water inside the water storage tank 72 is easily discharged through the inlet 722.

In one example, the heat exchanger 4 is constructed to condense the moisture in air circulating in the heat absorber 41. Therefore, even when the air circulates in the drum 2A, the moisture is removed by the heat absorber 41, so that the laundry inside the drum 2A may be continuously dried.

The moisture condensed in the heat absorber 41 may be first collected in the water collecting portion 37A and then collected secondary in the water storage 7. The water collecting portion 37A may be located inside the connection duct 35, and may be separately disposed in a space spaced apart from the connection duct 35.

FIG. 4 shows a detailed structure of the water collecting portion 37A, the heat exchanger 4, and a washer 6.

The water collecting portion 37A may be formed as a water collecting body 371A fixed to a bottom face of the connection duct 35A and in communication with the interior of the connection duct. A heat exchanger support 372A may be further disposed inside the water collecting body 371A such that the heat absorber 41 and the heater 43 do not come into contact with water (condensed water) stored in the water collecting body 371A. The heat exchanger support 372A may include a support plate 373A in contact with the heat absorber 41 and the heater 43, a spacer 375A that maintains a gap between the support plate 373 and a bottom face of the water collecting body 371A, and a support plate through-hole 376A defined to extend through the support plate 373A.

The support plate through-hole 376A may be defined only in a space in which the heat absorber 41 is supported of the space provided by the support plate 373A, and may be defined in each of the space in which the heat absorber is supported and a space in which the heater is supported. When the support plate through-hole 376A is also defined in a bottom face of the heater 43, water flowed to the heater 43 along the support plate 373A may be discharged to the water collecting portion 371A (to prevent a decrease in heat transfer efficiency that occurs when the heater comes into contact water).

In order to minimize the foreign substances (lint and the like) discharged from the drying drum body 21A being stacked in the heat absorber 41 and the heater 43, the laundry drying apparatus 20 may further include filtration means for filtering air.

Second filtration means 8 may be formed as means for filtering air introduced into the exhaust duct 31A from the drying drum body 21A, and first filtration means 5 may be located between the second filtration means 8 and the heat absorber 41 and be formed as means for filtering air that has passed through the second filtration means. A diameter of a filtration hole defined in the first filtration means 5 may be set smaller than a diameter of a filtration hole defined in the second filtration means 8.

The second filtration means 8 may include a frame 81 that is detachably inserted into the exhaust duct 31A through the air outlet 178, and a filter (a fourth filter) 83 disposed in the frame to filter air.

The first filtration means 5 may be detachably disposed in the connection duct 35. In this case, the front panel 11 of the cabinet may have a filter mounting hole from which the first filtration means 5 is withdrawn and a mounting hole door that opens and closes the filter mounting hole, and the duct 3A may have a duct through-hole 34 (see FIG. 3) into which the first filtration means 5 is inserted. Accordingly, the user may remove the foreign substances remaining in the first filtration means 5 and wash the first filtration means after separating the first filtration means 5 from the laundry treating apparatus as needed.

The first filtration means 5 may include a filtration means body 51, 53, and 55 inserted into the filter mounting hole and the duct through-hole 34 and positioned between the second filtration means 8 and the heat absorber 41, and filters 531, 551, and 571 disposed in the filtration means body to filter fluid (air and water) flowing to the heat absorber 41 and the water collecting portion 371A.

The filtration means body may be formed in various forms depending on a shape of a cross-section (a Y-Z plane and a X-Z plane) of the connection duct 35A. FIG. 1 shows an example of a case in which the filtration means body is formed in a shape similar to a hexahedron.

In this case, the filtration means body may include a front face 51 formed in a shape capable of closing the duct through-hole 34, a rear face 53 positioned between the front face and the heat absorber 41, a bottom face 55 constructed to connect the front face and the rear face with each other, and a first side face 57 and a second side face 58 that form a left side face and a right side face of the filtration means body.

The front face 51 may have a lock 511 removably coupled to a lock fastening portion 16 disposed in the cabinet. The lock 511 may be formed as a bar rotatably coupled to the front face 51 of the filtration means body, and the lock fastening portion may define a groove in which a free end of the bar is accommodated. Preferably, the locks 511 are respectively disposed on opposite sides of the front face 51, and the lock fastening portions 16 are respectively disposed on opposite sides of the filter mounting hole.

To facilitate insertion of the filtration means body into the connection duct 35A or removal of the filtration means from the connection duct 35A, the front face 51 may further include a handle 511.

The rear face 53 and the bottom face 55 may respectively have a first filter 531 and a second filter 551 for filtering the fluid (air and water) introduced into the filtration means body. The rear face 53 has a rear face through-hole defined therein for allowing an interior of the filtration means body and the internal space of the duct 3A to be in communication with each other, and the first filter 531 is disposed in the rear face through-hole. The bottom face 55 has a bottom face through-hole for allowing the interior of the filtration means body and the internal space of the duct 3A to be in communication with each other, and the second filter 551 is disposed in the bottom face through-hole. Therefore, the first filter 531 is means for filtering the fluid (air and water) supplied to the heat absorber 41, and the second filter 551 is means for filtering the fluid supplied to the water collecting portion 371A.

The first side face 57 and the second side face 58 may be constructed to connect the front face 51, the rear face 53, and the bottom face 55 to each other.

The first filtration means 5 having the above structure may be in communication with the exhaust duct 31A through the top face or the second side face 58 of the filtration means body. FIG. 1 shows a case in which the first filtration means 5 is connected to the exhaust duct 31A through a top face through-hole defined to extend through the top face of the filtration means body and a side face through-hole defined to extend through the second side face 58 as an example.

The first filter 531 may be inclined in an angle range from 90 degrees to 100 degrees toward a front face of the heat absorber 41 based on the bottom face 55 of the filtration means body. This is to allow the foreign substances remaining in the first filter to easily move to the bottom face 55 when water is injected into the first filter 531 via the washer 6 to be described later.

The second filter 551 may be inclined downward in an angle range from 10 to 20 degrees from the front face 51 toward the first filter 531 (The second filter may be inclined upward in an angle range from 10 to 20 degrees in a direction from a lower end of the first filter to the filter mounting hole). When the second filter 551 is inclined downward toward the first filter 531, because a connection point of the first filter 531 and the second filter 551 will be the lowest point in the space provided by the first filtration means, the foreign substances of the first filtration means 5 may be concentrated at the connection point of the first filter 531 and the second filter 551. When the foreign substances are concentrated at the connection point of the first filter 531 and the second filter 551, the user will be able to more easily remove the foreign substances inside the first filtration means 5.

However, when the foreign substances are concentrated at the connection point of the first filter 531 and the second filter 551, there may be a situation in which a long time is required for water sprayed via the washer 6 to be discharged to the water collecting portion 371. In order to solve such problem, a bypass hole for allowing the interior of the first filtration means 5 and the water collecting portion 371 to be in communication with each other, and a third filter 571 disposed in the bypass hole may be further disposed.

The bypass hole and the third filter 571 may be defined at a position higher than an uppermost end of the second filter 551 and lower than an uppermost end of the first filter 531. Therefore, the laundry treating apparatus may minimize a phenomenon in which water sprayed to the first filtration means 5 is not able to be recovered at the water collecting portion 371 by the foreign substances remaining in the first filtration means 5.

In one example, the laundry drying apparatus 20 may further include the washer 6 that washes the first filtration means 5 using water stored in the water collecting portion 371A. That is, water stored in the water collecting portion 371A may be separately collected into the water storage 7 or may be selectively flowed to the washer 6.

The washer 6 may be formed as means for washing at least one of the first filter 531, the second filter 551, the third filter 571, and the heat absorbers 41 by spraying water stored in the water collecting portion 371A to the first filtration means 5. The washer 6 may include a spray 65 disposed in the duct 3A to supply water to the first filtration means 5, and a washing pump 61 that allows water stored in the water collecting portion 371A to flow to the spray 65.

The washing pump 61 may be connected to the water collecting portion 371A via a first connection pipe 611, and may be connected to the spray 65 via a second connection pipe 613. When the laundry treating apparatus is constructed to allow water of the water collecting portion 371A to flow to the spraying portion 65 and the water storage 7 with only one washing pump 61, the laundry drying apparatus 20 may further include flow path switching portion 63. In this case, the flow path switching portion 63 may be connected to the washing pump 61 via he second connection pipe 613, the spray 65 may be connected to the flow path switching portion 63 via a spray supply pipe 631, and the water storage 7 may be connected to the flow path switching portion 63 via the water storage supply pipe 633.

In this case, the water storage supply pipe 633 should connect the nozzle 722a and the flow path switching portion 63 to each other.

The flow path switching portion 63 includes a valve for controlling opening and closing of the spray supply pipe 631 and opening and closing of the water storage supply pipe 633. Therefore, the laundry drying apparatus 20 may control the valve disposed in the flow path switching portion 63 to supply water stored in the water collecting portion 371A to the spray 65 or to the water storage 7.

A case in which the spray 65 includes a duct through-hole 651 defined to extent through the connection duct 35 and to which the spray supply pipe 631 is connected, a first guide 653 that guides water supplied from the duct through-hole to the first filter 531, and a second guide 655 that guides at least a portion of water supplied through the first guide 653 to the front face of the heat absorber 41 is shown as an example. In this case, the second guide 655 may be disposed as means for allowing water to be supplied to the front face of the heat absorber 41 via the first filter 531. That is, the first filter 531 may be disposed between the first guide 653 and the second guide 655 when the first filtration means 5 is fixed to the connection duct 35A, and the second guide 655 may be formed as an inclined face inclined downward toward the first filter 531 from a top face of the connection duct 35.

The first guide 653 may further include a guide through-hole 654. The guide through-hole 654, as a hole defined to extend through the first guide 653, may allow water introduced into the duct through-hole 651 to be supplied to a front area of the heat absorber 41 through the guide through-hole 654. The front area of the heat absorber means an area positioned at a side facing toward the first filter 531 based on a vertical line passing through a center of the heat absorber 41.

In one example, it is preferable that the laundry treating apparatus of the present disclosure includes water collecting portion water level sensing means 92 that measures a water level of the water collecting portion 371A and transmits the water level to the controller. When the water collecting portion water level sensing means 92 is disposed, the laundry treating apparatus may determine a time point of allowing water stored in the water collecting portion 371A to flow to the storage body 72. Therefore, water of the water collecting portion 371A may be prevented from flowing back into the connection duct 35A.

The water collecting portion water level sensing means 92 may be formed as any device capable of sensing the water level inside the water collecting portion 371A. FIG. 3 shows a sensor with multiple electrodes having different lengths (multiple electrodes electrically connected based on the water level) as an example.

The laundry drying apparatus 20 may have dryness sensing means to determine a time point to stop operation of the heat exchanger 4 by determining a dryness of the laundry. The dryness sensing means may be formed as at least one of an electrode sensor 95 constructed to be in contact with the laundry to measure an amount of moisture contained in the laundry, and a humidity sensor for measuring humidity of air introduced into the duct 3A from the drum 3.

The electrode sensor may include a first electrode 951 and a second electrode 953 that may be fixed to the first fixed body 171 and may be in contact with the laundry inside the drum body 21A. As the dryness increases, the amount of moisture contained in the laundry will decrease (an electrical resistance of the laundry will increase), so that the laundry drying apparatus 20 may determine the dryness of the laundry by observing an electrical resistance measured when the two electrodes 951 and 953 are connected to each other via the laundry. In one example, as the dryness of the laundry increases, the amount of moisture contained in air introduced into the duct 3A will decrease, so that the laundry drying apparatus 20 may determine the dryness of the laundry by observing the humidity of air introduced into the duct 3A via the humidity sensor.

In addition, the laundry drying apparatus 20 may further include temperature sensing means 96 for measuring a temperature of air introduced into the duct 3A. The temperature sensing means 96 may be fixed to the top face of the connection duct 35A and positioned between the first filter 531 and the second filter 551.

Figure 5:
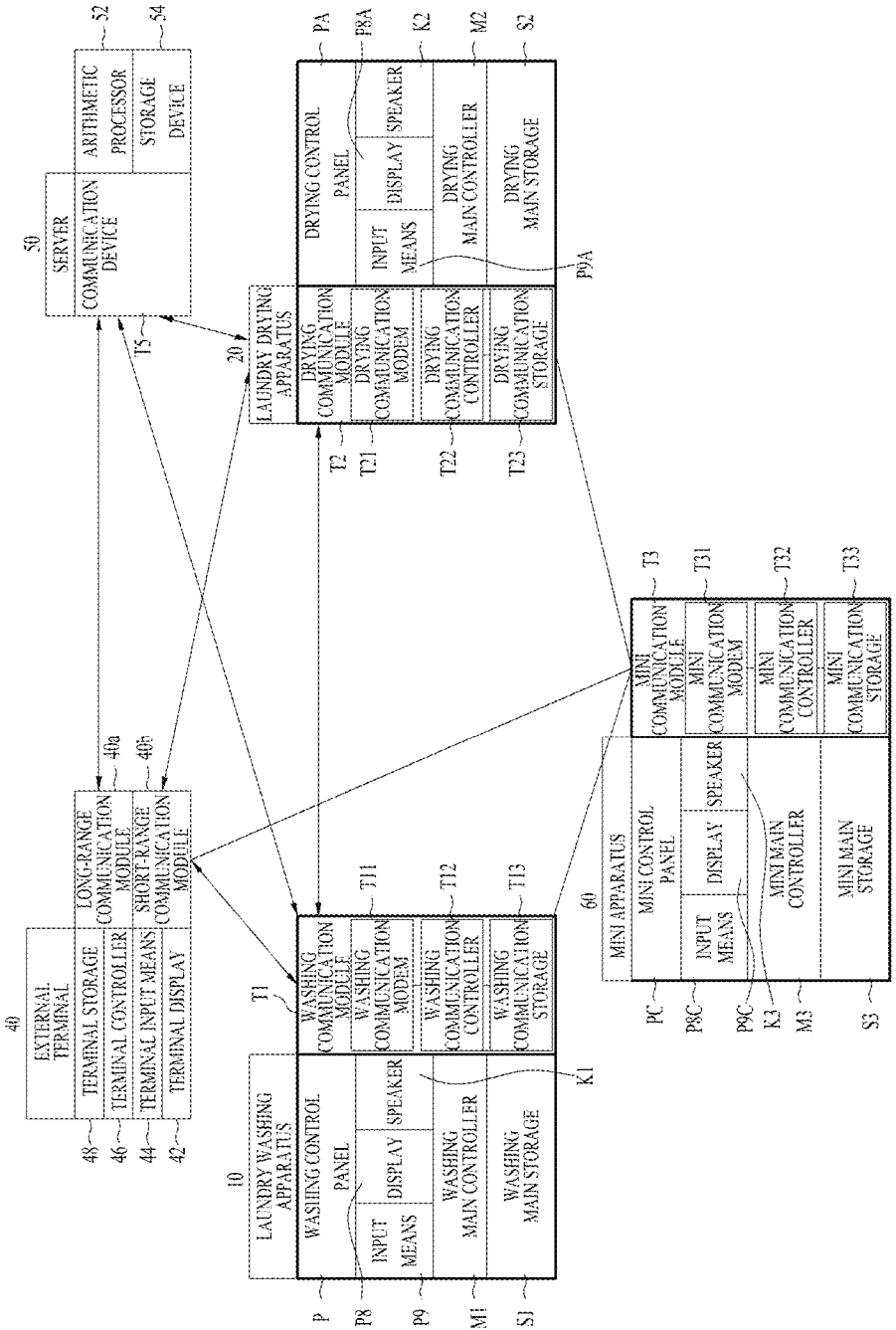
FIG. 5 is a block diagram showing a configuration that enables communication of a system of the present disclosure.

FIG. 5 shows a structure in which, when the laundry treating apparatus includes the laundry washing apparatus 10, the laundry drying apparatus 20, and the mini or mini apparatus 60, the laundry washing apparatus 10, the laundry drying apparatus 20, and the a mini apparatus 60 may be in communication with each other.

The laundry washing apparatus 10 may include a washing control panel P configured to display information and to receive a command from the user.

The washing control panel P may include a displaying portion P8 capable of displaying the state of the laundry washing apparatus 10, an input means P9 capable of inputting the command to the laundry washing apparatus 10, and a washing speaker K1 capable of externally outputting a notification generated from the laundry washing apparatus 10. The laundry washing apparatus 10 may include a controller M1 that may perform the washing course and option including the driver, the water supply, the drainage, and the like of the laundry washing apparatus 10, and may include storage S1 that transmits the information to the controller M1 or stores a program to be used by the controller M1.

The input means P9 may be a concept including all components configured to receive the command of the user for the laundry washing apparatus 10, such as a manipulation portion P47, a power switch P46, an executing portion P47, a setting portion P2, and the like to be described later.

In addition, the laundry washing apparatus 10 may include a washing communication module T1. The washing communication module T1 may include a washing communication modem T11 including means of communication such as Wi-Fi or Bluetooth, a washing communication controller T12 configured to control the communication modem, and washing communication storage T13 that may transmit the received information to the controller M1 or may store a program for controlling the washing communication controller T12 when power to the washing controller M1 is cut off.

The washing communication module T1 may be configured to continuously receive the power even in a state in which power supply to the control panel P of the laundry washing apparatus 10 is cut off, and may be configured to maintain a state in communication with the external terminal 40 and the server 50.

In addition, the washing communication module T1 may be configured to be directly paired with a drying communication module T2 and a mini communication module T31 to be described later to maintain the communication state.

In addition, when the washing communication module T1 receives a power command for supplying power to the control panel p, the power may be controlled to be supplied to the control panel P.

The laundry drying apparatus 20 may include a drying control panel PA configured to display information and to receive a command from the user.

The drying control panel PA may include a drying displaying portion P8A capable of displaying the state of the laundry drying apparatus 20, a drying input means P9A capable of inputting the command to the laundry drying apparatus 20, and a drying speaker K2 capable of externally outputting a notification generated from the laundry drying apparatus 20. The laundry drying apparatus 20 may include a drying controller M2 that may perform the drying course and option of operating the driver and the like, and may include drying storage S2 that transmits the information to the drying controller M1 or stores a program to be used by the drying controller M1.

The drying input means P9A may be a concept including all components configured to receive the command of the user for the laundry washing apparatus 10, such as the manipulation portion P47A, the power switch P46A, the executing portion P47A, the setting portion P2A, and the like to be described later.

In addition, the laundry drying apparatus 20 may include a drying communication module T2. The drying communication module T2 may include a drying communication modem T21 including means of communication such as the Wi-Fi or the Bluetooth, a drying communication controller T22 configured to control the communication modem, and drying communication storage T23 that may transmit the received information to the drying controller M2 or may store a program for controlling the drying communication controller T22 when power to the drying controller M2 is cut off.

The drying communication module T2 may be configured to continuously receive the power even in a state in which power supply to the drying control panel PA of the laundry drying apparatus 20 is cut off, and may be configured to maintain a state in communication with the external terminal 40 and the server 50.

In addition, the drying communication module T2 may be configured to be directly paired with the communication module T1 and the mini communication module T31 to be described later to maintain the communication state.

In addition, when the drying communication module T2 receives a power command for supplying power to the drying control panel PA, the power may be controlled to be supplied to the drying control panel PA.

The mini apparatus 60 may include a mini control panel PC configured to display information and to receive a command from the user.

The mini control panel PC may include a mini displaying portion P8C capable of displaying the state of the mini apparatus 60, a mini input means P9C capable of inputting the command to the mini apparatus 60, and a mini speaker K3 capable of externally outputting a notification generated from the mini apparatus 60. The mini apparatus 60 may include a mini controller M3 that may perform the washing course and option of operating the driver, the water supply, the drainage, and the like of the mini apparatus 60, and may include mini storage S3 that transmits the information to the mini controller M3 or stores a program to be used by the mini controller M3.

The mini input means P9C may be a concept including all components configured to receive the command of the user for the laundry washing apparatus 10, such as the manipulation portion P47C, the power switch P46C, the executing portion P4C, the setting portion P2C, and the like to be described later.

In addition, the mini apparatus 60 may include a mini communication module T3. The mini communication module T3 may include a mini communication modem T31 including means of communication such as the Wi-Fi or the Bluetooth, a mini communication controller T32 configured to control the mini communication modem, and mini communication storage T33 that may transmit the received information to the mini controller M3 or may store a program for controlling the mini communication controller T32 when power to the mini controller M3 is cut off.

The mini communication module T3 may be configured to continuously receive the power even in a state in which power supply to the mini control panel PC of the mini apparatus 60 is cut off, and may be configured to maintain a state in communication with the external terminal 40 and the server 50.

In addition, the mini communication module T3 may be configured to be directly paired with the communication module T1 and the drying communication module T2 to be described later to maintain the communication state.

In addition, when the mini communication module T3 receives a power command for supplying power to the mini control panel PC, the power may be controlled to be supplied to the mini control panel PC.

In one example, the external terminal 40 may include a short-range communication module 40b configured to be in direct communication with the laundry washing apparatus 10, the laundry drying apparatus 20, and the mini apparatus 60, and a long-range communication module 40a configured to be in communication with the server 50.

In addition, the external terminal 40 may further include a terminal displaying portion 42 for displaying the information received from the communication module, a terminal input means 44 that transmits the command to a home appliance such as the laundry washing apparatus 10 or to the server 50, and a terminal controller 46 for controlling the terminal displaying portion 42, the terminal input means 44, and the communication module. The external terminal 40 may further include terminal storage 48 to store the information received from the communication module or to store a program for controlling the terminal controller 46.

The server 50 may include a communication device T5 capable of being in communication with the external terminal 40, the laundry washing apparatus 10, the laundry drying apparatus 20, and the mini apparatus 60, an arithmetic processor 52 that calculates information received from or to be transmitted to the external terminal 40, the laundry washing apparatus 10, the laundry drying apparatus 20, and the mini apparatus 60, and a storage device 54 in which the information received from the external terminal 40, the laundry washing apparatus 10, the laundry drying apparatus 20, and the mini apparatus 60 may be stored or the arbitrary course or option that may operate the laundry washing apparatus 10, the laundry drying apparatus 20, and the mini apparatus 60 may be stored.

Figure 6:
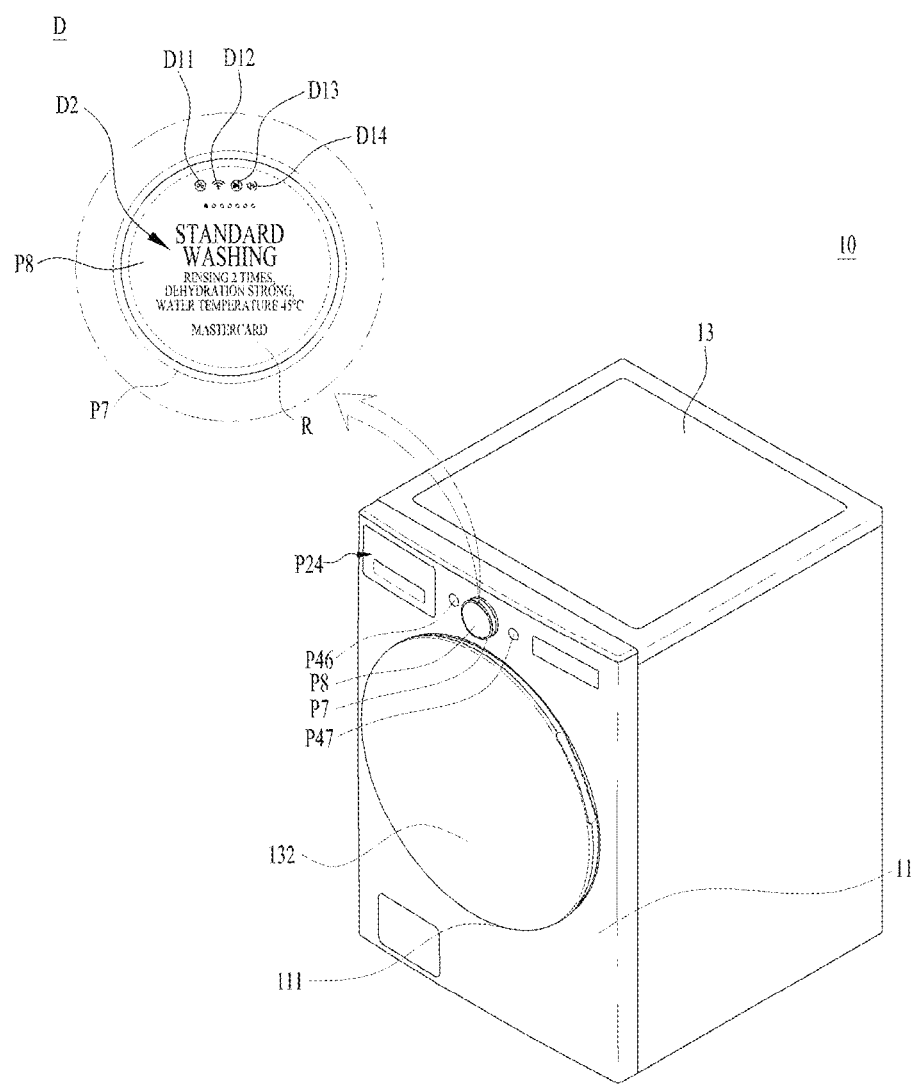
FIGS. 6 to 10 show a structure of a control panel that may be mounted on a laundry treating apparatus of the present disclosure.

FIG. 6 shows an embodiment of the control panel P that may be applied to the laundry treating apparatus of the present disclosure.

Hereinafter, a description will be made based on the control panel P being disposed in the laundry washing apparatus 10, but the control panel P may be applied to the laundry washing apparatus 10 and the laundry drying apparatus 20 with the same structure and may also be applied to the mini apparatus 60.

In other words, the control panel P, the drying control panel PA, and the mini control panel PC may have the same structure.

The laundry washing apparatus 10 includes the cabinet 1 and the control panel P disposed on the cabinet 1.

The control panel P refers to a device that enables communication between the user and the laundry treating apparatus (including other electronic devices in addition to the laundry treating apparatus). The communication between the user and the laundry treating apparatus means a process in which the user inputs the control command to the laundry treating apparatus and a process in which the laundry treating apparatus transmits the information to the user.

The user may input, via the control panel P, at least one of a power command of supplying or cutting off the power of the laundry treating apparatus, a selection command of selecting the arbitrary course or option that treats the laundry, an execution command of performing the selected course or option, and a stop command of stopping the course or option being performed.

The treatment of the laundry may include the washing cycle of removing the foreign substances of the laundry via water and the detergent, or a drying cycle of drying water contained in the laundry.

The control panel P may display an operation state of the laundry treating apparatus or information of the course or option to the user.

For example, the control panel P may display a state in which at least one of the power command, the selection command, the execution command, the performance command, and the stop command is input. In addition, the control panel P may display error information of displaying a problem situation occurring in the laundry treating apparatus, or guide information of guiding an action to be taken by the user.

The cabinet 1 may include the front panel 11 forming a front face of the cabinet 1, and the top panel 13 coupled to a top face of the front panel 11. The front panel 11 and the top panel 13 may be made of a metal material, and may have a steel plate shape.

The control panel P of the laundry treating apparatus of the present disclosure may be coupled to the front panel 11.

The control panel P may be coupled to a rear face of the front panel 11 and may be partially exposed to a front face of the front panel 11. The front panel 11 may be manufactured as a simple metal plate, and the control panel P may be simply coupled to the rear face of the front panel 11 and be fixed.

Accordingly, the front panel 11 may form a most area of the front face of the cabinet 1. As a result, a sense of unity of the front panel 11 may be strengthened and an aesthetics sensation may be maximized. In addition, a process of manufacturing the front panel 11 may be simplified, and a process of assembling or installing the front panel 11 and the control panel P may be simplified. In addition, a separate component such as a frame for mounting the control panel P on the front panel 11 may be omitted.

The control panel P of the laundry treating apparatus of the present disclosure may include a manipulation portion P7 rotatably coupled to the cabinet, and a displaying portion P8 disposed inside the manipulation portion P7 to display the state of the laundry treating apparatus.

The manipulation portion P7 may be formed in a shape of a rotary knob, and the displaying portion P8 may be formed as a display D including a liquid crystal or the like. It may be seen that the displaying portion P8 and a selection portion R to be described later are included in the manipulation portion P7.

The displaying portion P8 may be entirely formed as a touch panel, or may be at least partially formed as the touch panel.

The manipulation portion P7 may be configured to rotate to select the arbitrary course or option that may treat the laundry, and the displaying portion P8 may be configured to display a corresponding course or option each time the manipulation portion P7 rotates.

As a result, the control panel P of the laundry treating apparatus of the present disclosure may prevent an arbitrary course or option capable of rotating the drum to be described later from being displayed as characters, guide phrases, and the like in a certain area.

Accordingly, an area or an area ratio occupied by the control panel P in the front panel 11 may be greatly reduced, and the aesthetics sensation may be maximized as no separate characters or guide phrases are attached to the front panel 11.

Figure 11:
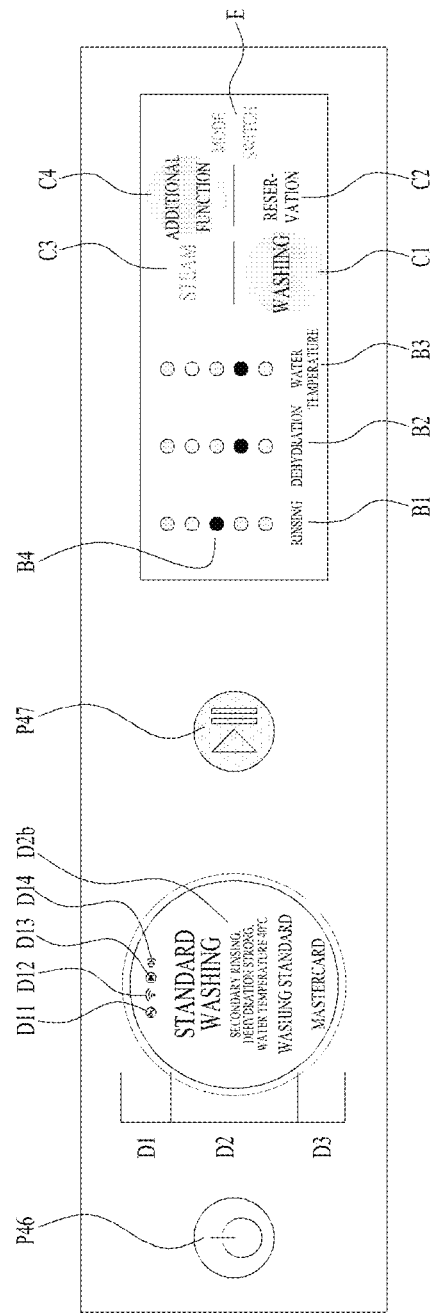
FIG. 11 shows an embodiment of application of the control panel.

A display P84 of the displaying portion P8 may include a state display area D1 for displaying the state of the laundry treating apparatus, and a content display area D2 for displaying the state in which the at least one of the power command, the selection command, the execution command, the performance command, and the stop command of the laundry treating apparatus is input, the error information, or the guide information of guiding the action to be taken by the user (see FIG. 11).

The state display area D1 may display a lock state D11 illustrating whether the door 132 is locked to the cabinet, an activation state D12 of the communication module T1, a executed state D13 of the course or the option, and a notification state D14 indicating that there is the notification information for the user.

The content display area D2, as an area displayed with the largest area in the displaying portion P8, may display the selected state, the executed state, the stop state, and the completion state of the course or the option, and may also display states of other home appliances to be described later.

In addition, the control panel P may further include the selection portion R for the user to input a determination command of determining the information to be displayed on the displaying portion P8. The selection portion R may be disposed inside the manipulation portion P7 to further reduce an area occupied by the control panel P.

The selection portion R may be disposed inside the displaying portion P8 and may be disposed spaced apart from the content display area D2. The selection portion R may be formed as a physical button or a touch panel for sensing a contact of a user's body.

The display P84 of the displaying portion may include an input area D3 that may request an input of the selection portion R at a point corresponding to the selection portion R. (see FIG. 11).

The input area D3 may be configured to emit light when the selection portion R may be activated to receive the command from the user.

In one example, the manipulation portion P7 and the displaying portion P8 may be operated only when the power is supplied.

To this end, the control panel P of the laundry treating apparatus of the present disclosure may further include the power switch P46 for inputting the power command to the laundry treating apparatus, as well as the manipulation portion P7 and the displaying portion.

The user may activate the manipulation portion P7 by inputting the power switch P46.

The front panel 11 may include a power switch mounting portion 116 formed such that the power switch P46 may be installed.

In addition, the control panel P may further include the executing portion P47 to which the performance command of performing or stopping the selected course or option is input.

The executing portion P47 may be formed separately from the manipulation portion P7 and the displaying portion P8 to reflect a definite performance or stop intention of the user. In addition, the functions of the manipulation portion P7 and the displaying portion P8 may be prevented from being excessive.

The front panel 11 may include an executing portion mounting portion 117 formed such that the executing portion P47 may be installed.

Figure 8:
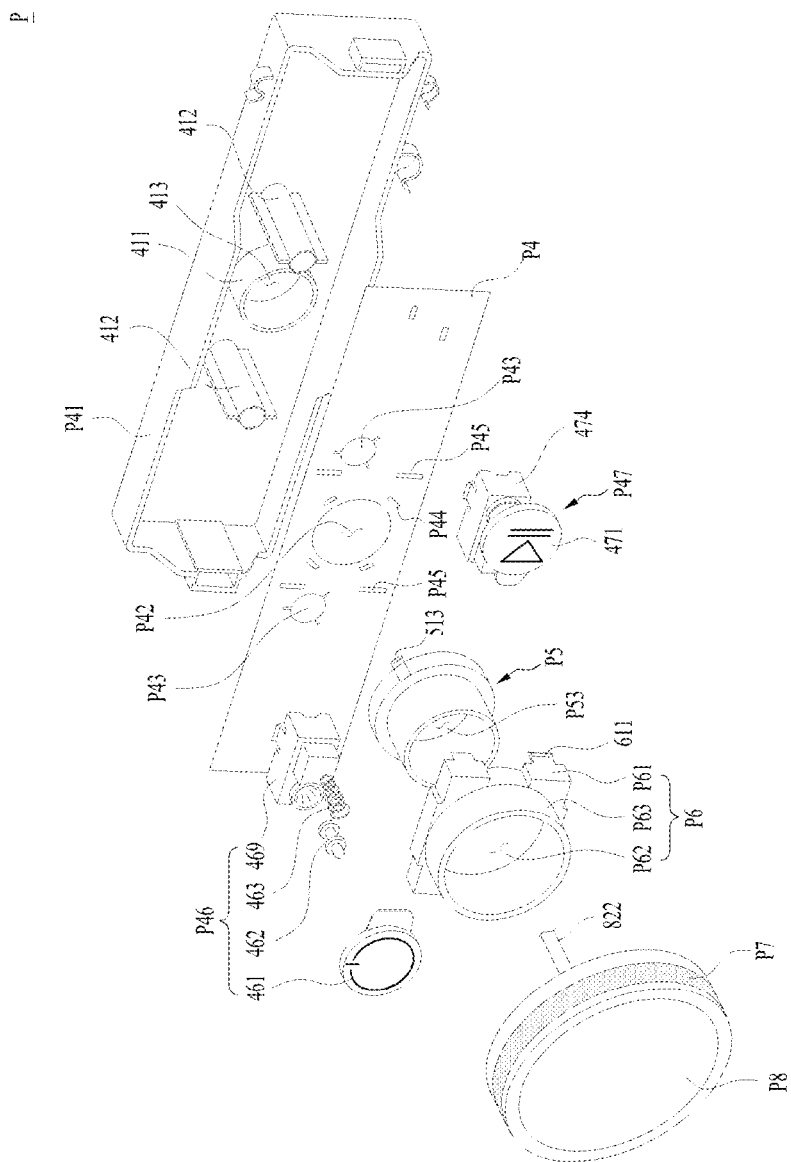

The control panel P may include one control box or casing P41 that may accommodate or install the power switch P46, the execution device P47, the manipulation portion P7, and the displaying portion P8 therein (see FIG. 8).

In one example, the control panel P may further include the setting portion P2 that may add an option to the course or change the option of the course on the front panel 11. The user may set an option capable of changing an intensity, a duration, and the like of the course via the setting portion P2.

The setting portion P2 may be formed separately from the casing P41 and may be coupled to the front panel 11. The setting portion P2 may include a separate liquid crystal and may include a touch panel or a physical button to input the option.

The power switch P46, the executing portion P47, the manipulation portion P7, and the setting portion P2 may be collectively referred to as the input means P9.

In one example, the front panel 11 may have the laundry inlet 111 defined to be in communication with the drum 2, and the door 132 that is pivotably coupled to the cabinet to open and close the laundry inlet 111.

The control panel P may be located above the door 132 to enhance accessibility of the user.

In one example, the front panel 11 may further include locking means L for fixing the door 132 to the front panel 11. When the laundry treating apparatus operates, such as the drum of the laundry treating apparatus rotates, the locking means L may lock the door 132 to the front panel 11. Therefore, a safety accident may be prevented. The locking means L may be unlock the door 132 when the operation of the laundry treating apparatus is completed.

The locking means L may be formed as any component as long as it is able to fix the door 132 to the cabinet 1. The locking means L may be formed as a fastener for fastening a hook protruding from the door, or may be formed as a solenoid valve for holding the hook.

The laundry treating apparatus of the present disclosure may include a detergent box 243 that accommodates therein the detergent for washing the laundry, and the front panel 11 may include a detergent hole P24 from which the detergent box 243 is extended.

The control panel P may be coupled to the front panel 11. As a result, the control panel P may include the input means P9 that receives the control command from the user, and the displaying portion P8 that outputs the information such as the control command selectable by the user.

The main controller M1 for controlling a command for performing the drying operation of the laundry treating apparatus may be installed.

The input means P9 may include a power supply requesting device P46 for requesting the power supply to the laundry treating apparatus, the manipulation portion P7 that enables the user to select a desired course among multiple courses, and the executing portion P47 for requesting start of the course selected by the user.

The displaying portion P8 may include at least one of a display panel capable of outputting text and figures, and a speaker capable of outputting a voice signal and sound.

Figure 7:
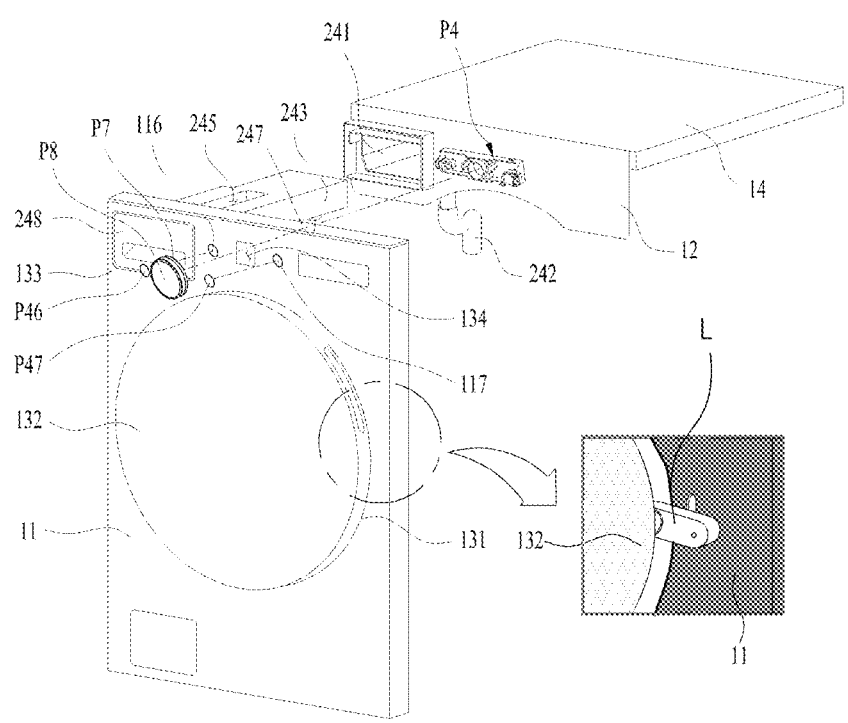

FIG. 7 shows a structure in which a control panel is coupled to a front panel.

As shown in the drawing, the laundry washing apparatus 10 may further include a detergent supply P24. The detergent supply P24 may include a detergent box housing 241 disposed inside the cabinet 1, a connecting pipe 242 for connecting the detergent box housing to the tub body 21, and a detergent box 243 that may be extended from the detergent box housing 241 through a detergent box laundry inlet 133 defined in the front panel 11.

The detergent box 243 may include a chamber 245 that provides a space in which the detergent is stored, and a discharge flow path 247 that discharges the detergent inside the chamber to the detergent box housing 241. The discharge flow path 247 may be formed as a water trap (a siphon flow path or the like) that allows liquid to flow to the detergent box housing 241 when a level of the liquid stored in the chamber 245 exceeds a preset water level.

When the detergent supply P24 is disposed in the laundry treating apparatus 10, the water supply 23 may further include a nozzle 232 for supplying water to the chamber 245. The nozzle 232 may be fixed to the cabinet 1 to form a top face of the detergent box housing 241, and the water supply pipe 231 may connect the nozzle 232 and the water supply source to each other.

A detergent box panel 248 may be disposed on a front face of the detergent box 243. The detergent box panel 248 may be formed in a shape to close the detergent box laundry inlet 133, and the detergent box panel 248 may have a detergent box handle.

The front panel 11 may be fixed to the cabinet 1 via a panel support 12. That is, the panel support 12 may be fixed to the cabinet 1, and the front panel 11 may be fixed to the panel support 12. The panel support 12 may have a detergent box through-hole 121 through which the detergent box 243 passes.

The control panel P may be fixed to the cabinet 1 via the panel support 12. The panel support 12 may have an interface mounting groove into which the control panel P is fixed.

The front panel 11 has a first button mounting portion 116 and a second button mounting portion 117. The first button 461 may be exposed to the outside of the cabinet 1 via the first button mounting portion 136, and the second button 471 may be exposed to the outside of the cabinet 1 via the second button mounting portion 117.

The first input means 46 and the second input means 47 may be separately disposed in a left space and a right space of the displaying portion P8, may be separately disposed in an upper space and a lower space of the displaying portion, or may be disposed vertically or horizontally in one of the left space and the right space of the displaying portion.

The cabinet 1 has a panel through-hole 134 defined to extend through the front panel 11. The shaft 71 may be inserted into the panel through-hole 134.

When the laundry treating apparatus is formed as the laundry drying apparatus 20, the rest may be the same except that the component related to the detergent box is changed to the water storage 7.

FIG. 8 shows an internal structure of a control panel.

The control panel P includes a circuit board (a first circuit board) P4 fixed to the panel support 12 and positioned inside the cabinet 1, an encoder P5 fixed to the circuit board and located inside the cabinet 1, the manipulation portion P7 connected to the encoder P5 through the front panel 11, and the displaying portion P8 fixed to the encoder P5 or the first circuit board P4 through the front panel 11.

The first circuit board P4, as a board equipped with a control circuit required for control (power control and operation control) of at least one of the drivers 32, a steam apparatus 200, and the water supply portion 23, the discharge portion 25 may be fixed to the panel support 12 via the casing P41. The casing P41 may have any shape as long as it is able to fix the first circuit board 4 to the panel support 12.

The casing P41 may be formed in a hexahedral shape with one face (a face facing the panel support) open.

A boss for setting a position of the first circuit board P4 may be disposed in the casing P41. The boss may include a first boss 411 and a second boss 412.

In this case, the first circuit board P4 may have a board through-hole P42 through which the first boss 411 passes, and a boss insertion hole P43 through which the second boss 412 passes. The second boss 412 may be disposed in each of left and right spaces of the first boss 411, or may be disposed in each of upper and lower spaces of the first boss 411.

A wire 822 is connected to the displaying portion P8. The wire 822 may be formed as a power line for supplying the power to the displaying portion, or may be formed as a communication line that enables the displaying portion P8 to communicate with devices inside the cabinet including the first circuit board P4.

The first boss 411 may have a first boss through-hole 413 defined therein, and the panel support 12 may have a wire through-hole P42 (see FIG. 4) defined therein. In this case, the wire 822 may be extended into the cabinet 1 by being inserted into the first boss through-hole 413 and the wire through-hole P42.

The first circuit board P4 may further include the power switch P46 and the executing portion P47. The laundry device P46 may be formed as means for inputting the control command for requesting the power supply to the laundry treating apparatus 100, and the executing portion P47 may be formed as means for inputting a command for requesting execution of the control command displayed on the displaying portion P8 or a command for temporarily stopping the control command being executed by the laundry treating apparatus 10.

The power switch P46 and the executing portion P47 may be configured to generate a control signal by sensing static electricity of the user's body.

The power switch P46 may include the first button 461 exposed to the outside of the cabinet 1, a first detection sensor 469 fixed to the first circuit board P4, and a conductor (a first touch spring) 463 for connecting the first button and the first detection sensor to each other. Similarly, the executing portion P47 may include the second button 471 exposed to the outside of the cabinet 1, a second detection sensor 474 fixed to the first circuit board P4, and a conductor (a second touch spring) for connecting the second button and the second detection sensor to each other.

The front panel 11 has the first button mounting portion 136 and the second button mounting portion 117. The first button 461 may be exposed to the outside of the cabinet 1 via the first button mounting portion 116, and the second button 471 may be exposed to the outside of the cabinet 1 via the second button mounting portion 117.

The power switch P46 and the executing portion P47 may be separately disposed in the left space and the right space of the displaying portion P8, may be separately disposed in the upper space and the lower space of the displaying portion, or may be disposed vertically or horizontally in one of the left space and the right space of the displaying portion.

The first touch spring 463 and the second touch spring may be formed in a shape of a coil, which is to provide a restoring force to the first button 461 and the second button 471. Furthermore, in order to prevent the first button 461 and the second button 471 from being respectively deviated from the button mounting portions 116 and 117, the power switch 46 may have a first stopper 462 that limits a range of motion of the first button, and the execution device 47 may have a second stopper that limits a range of motion of the second button.

The encoder P5 is means for rotatably fixing the manipulation portion P7 to the first circuit board P4, and is means for generating an electrical signal (or generating an electrical signal set differently based on a rotation angle of an actuator) during the rotation of the manipulation portion P7.

The drying control panel PA may have the same structure as the control panel P.

In addition, the mini control panel PC may also have the same structure as the control panel P.

Figure 9:
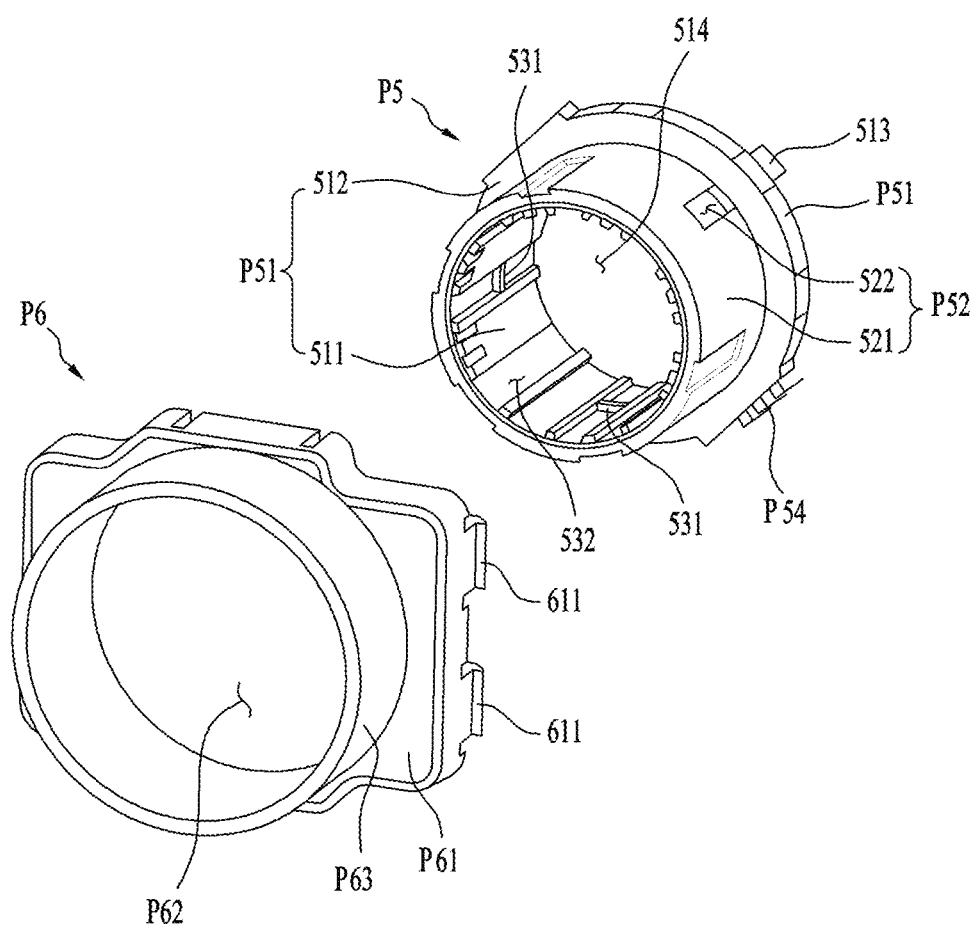

FIG. 9 shows a structure of an encoder.

The encoder P5 may include a fixed portion P51 fixed to the first circuit board P4 and to which the displaying portion P8 is fixed, a rotating portion P52 rotatably disposed on the fixed portion P51 and to which the manipulation portion P7 is fixed, and a signal generator P54 for generating an electrical signal when the rotating portion P52 is rotated.

The fixed portion P51 may include a fixed body P512 fixed to the first circuit board P4, a support body 511 extending from the fixed body 512 and rotatably fixing the rotating portion P52, and a body through-hole 514 connected to the board through-hole P42 (connected to the first boss through-hole) through the fixed body and the support body.

The fixed body 512 may be formed in a cylindrical shape. A board fastening portion 513 may be disposed on a circumferential face of the fixed body 512 or on one face (a face facing the first circuit board) of the fixed body. In this case, the first circuit board P4 may have an encoder fixing hole P44 defined therein into which the board fastening portion 513 is inserted.

The board fastening portion 513 and the encoder fixing hole P44 may respectively include multiple board fastening portions and multiple encoder fixing holes, and the encoder fixing holes P44 may be arranged to surround the board through-hole P42.

Inside the body through-hole 514, a fastening body fixing portion 531 for fastening the displaying portion P8 to the fixed portion 51, and a position setting groove 532 for preventing the displaying portion 8 from rotating (fixing the position of the displaying portion) when the displaying portion P8 is inserted into the body through-hole 514 may be disposed.

The fastening body fixed portion 531 may be formed as a protrusion protruding toward a center of the body through-hole 514 from at least one of the support body 511 and the fixed body 512. The drawing shows a case in which the fastening body fixed portion 531 is disposed on the support body 511 as an example.

The positioning groove 532 may be defined as a groove in which one face of the fixed portion P51 defining the body through-hole 514 is concavely bent. In this case, the positioning groove 532 may be defined along a longitudinal direction of the body through-hole 514.

The rotating portion P52 may be formed as a rotating body 521 rotatably coupled to the support body 511. The rotating body 521 should have a rotating body through-hole through which the support body 511 passes.

The rotating body 521 may have a shaft fastening portion 522 to which the manipulation portion P7 is fastened. The shaft fastening portion 522 may be formed as a fastening hole extending through a circumferential face of the rotating body 521, or may be formed as a fastening groove defined as the circumferential face of the rotating body 521 is concavely bent.

The signal generator P54 may include a magnet fixed to the rotating body 521, a sensor that is disposed on the fixed body 512 or the support body 511 to sense a magnetic force, and a terminal that connects the sensor and the first circuit board 4 to each other. The magnet may be formed as multiple permanent magnets are arranged to be spaced apart from each other along the circumferential face of the rotating body 521.

The first circuit board P4 to which the encoder P5 is assembled may be coated with an insulating material. This is to minimize a possibility that water is supplied to the first circuit board P4 and the circuit is short-circuited. When the insulating material is coated on one face (a face facing the front panel) of the first circuit board P4, in order to prevent the rotating body 521 from being fixed to the support body 511 by the insulating material, the control panel P may further include an encoder cover P6.

The encoder cover P6 may be formed in a pipe shape that is fixed to the first circuit board P4 and surrounds the encoder P5. That is, as shown in the drawing, the encoder cover P6 may include a fixed body cover P61 that is fixed to the first circuit board P4 and surrounds the fixed body 512, and a cover through-hole P62 defined to extend through the fixed body cover P61 and into which the encoder 5 is inserted.

The fixed body cover P61 may have a board fastening portion 611, and the first circuit board P4 may have an encoder cover fixing hole P45 to which the board fastening portion 611 is fixed. The board fastening portion 611 and the encoder cover fixing hole P45 may respectively include multiple board fastening portions and multiple encoder cover fixing holes, and the encoder cover fixing holes P45 may be arranged to surround the board fastening portion 513.

For discharging water introduced into the fixed body cover P61, a cover outlet 612 may be further disposed on a circumferential face of the fixed body cover P61. The cover outlet 612 is preferably located at a lowermost end of the circumferential face of the fixed body cover P61.

In one example, the above-described insulating material is applied to the first circuit board P4 after both the encoder P5 and the encoder cover P6 are coupled to the first circuit board P4, and the insulating material sprayed on a partial area of the first circuit board P4 (an outer space of the encoder cover) flows into the encoder cover P6 through the cover outlet 612. In such a process, in order to block the insulating material from being supplied to the rotating body 521, a distance L1 from the first circuit board to an uppermost end of the fixed body 512 is preferably set to be equal to or greater than a distance L2 from the first circuit board to an uppermost end of the cover outlet 612.

The encoder cover P6 may further include a support body cover P63 extending from the fixed body cover P61 and surrounding the rotating body 521 (surrounding the support body). The support body cover P63 may limit the movement of the manipulation portion P7 in a radial direction of the cover through-hole 62, so that the support body cover P63 may prevent the manipulation portion P7 from being separated from the rotating body 521.

Figure 10:
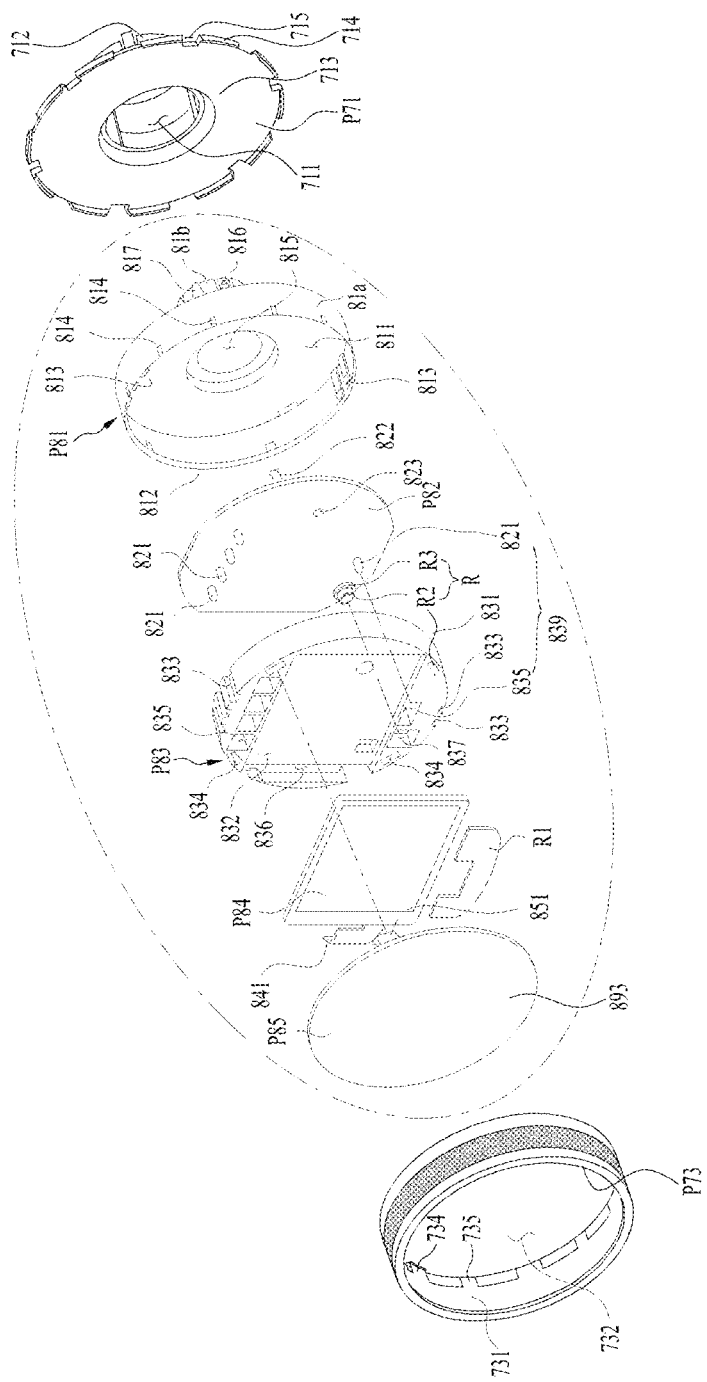

FIG. 10 shows a structure of a manipulation portion and a displaying portion.

The manipulation portion P7 may include a shaft P71 that is fixed to the rotating body 521 through the front panel 11, and a handle P73 fixed to the shaft P71 and positioned outside the cabinet 1.

The cabinet 1 has the panel through-hole 134 defined to extend through the front panel 11. The shaft P71 may be disposed to be inserted into the panel through-hole 134.

The shaft P71 may be formed a pipe having a shaft through-hole 711 defined therein. The rotating body 521 disposed in the encoder is inserted into the shaft through-hole 711, and a rotating body fastening portion 712 disposed on a circumferential face of the shaft P71 and positioned inside the shaft through-hole 711 is coupled to a shaft fastening portion 522 disposed on the rotating body. Accordingly, the shaft P71 is fixed to the rotating body 521 via the rotating body fastening portion 712 and the shaft fastening portion 522.

The handle P73 may be fixed to the shaft P71 so as to be located outside of the cabinet 1, and the user may provide a force required for the rotation of the rotating body 521 to the shaft P71 via the handle P73.

The handle P73 may include an accommodation space 731 defined inside the handle to be in communication with the shaft through-hole 711, and a handle through-hole 732 that extends through one face of the handle P73 to allow the accommodation space 731 to be in communication with the outside.

When a diameter of the handle P73 is set to be larger than a diameter of the shaft P71, the shaft P71 may further include a base 713 to which the handle P73 is fixed. The base 713 may be formed as a disk fixed to the circumferential face of the shaft P71.

The handle P73 and the base 713 may be coupled to each other via a base fastening portion 734 disposed on the handle 73 and a handle fastening portion 714 disposed on the base 713.

The base fastening portion 734 may be formed as multiple protrusions fixed to the handle so as to be located inside the accommodation space 731, and the handle fastening portion 714 may be formed as a groove defined in the base 713 and accommodating the protrusion therein.

In order to facilitate the coupling of the handle P73 and the base 713, the handle P73 may have a fastening guide 735 positioned between one base fastening portion 734 and another base fastening portion 734, and the base 713 may have a guide groove 715 into which the fastening guide 735 is inserted. The guide groove 715 may be defined as a groove in which a circumferential face of the base 713 is bent toward the shaft through-hole 711.

The displaying portion P8 may include a housing P81 fixed to the fixed body 512 of the encoder and located inside the accommodation space 731 of the actuator, the display P84 fixed to the housing and displaying information (information related to control, operation, and the like of the laundry treating apparatus), and a circuit board (second circuit board and a displaying portion circuit board) P82 disposed in the housing and having a circuit for controlling the display P84.

The housing P81 may include a fastening body 81b fixed to the fixed body 512 by extending through the shaft through-hole 711 and being inserted into the body through-hole 514, and an accommodating body 81a fixed to the fastening body 81b and positioned inside the accommodation space 731.

The accommodating body 81a may be formed in any shape as long as it may be inserted into the accommodation space 731. A case in which the accommodating body 81a is formed in a cylindrical shape is shown as an example.

A mounting space 811 is defined inside the accommodating body 81a, and the mounting space 811 is in communication with the accommodation space 731 defined in the handle via an accommodating body through-hole 812 (the accommodating body through-hole is defined to be in communication with the handle through-hole). That is, the accommodating body through-hole 812 is defined in a face directed in a direction in which the handle through-hole 732 is located of the space provided by the accommodating body 81a.

The fastening body 81b may be formed in any shape as long as it is able to be inserted into the shaft through-hole 711 and the body through-hole 514 of the encoder. A case in which the fastening body 81b is formed in a cylindrical shape is shown as an example. The fastening body 81b has a fastening body through-hole 815 connected to the mounting space 811.

A fixed body fastening portion 816 may be disposed on a circumferential face of the fastening body 81b. The fixed body fastening portion 816 is means for fixing the housing P81 to the fastening body fixing portion 531 disposed in the encoder.

Further, multiple position setting protrusions 817 may be further disposed on the circumferential face of the fastening body 81b.

The position setting protrusion 817 is formed in a shape capable of being inserted into the position setting groove 532 defined in the encoder, and the position setting protrusion 817 is disposed at a point corresponding to a position of the position setting groove 532. The position setting protrusion 817 and the position setting groove 532 are means for minimizing a risk that the fixed body fastening portion 816 fails to be coupled to the portion 531 (means for ensuring the coupling of the fixed body fastening portion and the fastening body fixing portion) when the fastening body 81b is inserted into the body through-hole 514.

The second circuit board P82 may be inserted into the mounting space 811, and the wire 822 connected to the second circuit board P82 may be withdrawn to the outside of the housing P81 through the fastening body through-hole 815. Multiple lamps 821 may be disposed on the second circuit board P82.

The second circuit board P82 may control the display P84 to display preset information in response to an electrical signal generated from the signal generator 54 when the handle P73 is rotated.

In order to maintain a gap between the second circuit board P82 and the display P84 and to prevent damage to the lamp 821, a mounting portion P83 positioned between the display P84 and the second circuit board P82 may be disposed in the mounting space 811.

The mounting portion P83 may be formed as a mounting body 831 fixed to the accommodating body 81a and positioned inside the mounting space 811. The mounting body 831 may have any shape as long as it is able to be inserted into the mounting space 811.

A seating groove 832 to which the display P84 is fixed is defined in one face of the mounting body 831. The seating groove 832 may have a connector through-hole 836. A connector 841 (a flexible PCB or the like) disposed in the display P84 may be connected to the second circuit board P82 by being inserted into the connector through-hole 836.

The mounting body 831 may have a lamp through-hole 835 into which the lamp 821 is inserted. It is preferable that the number of lamp through-holes 835 is the same number as the number of the lamps 821, and a position of the lamp through-hole 835 should be set to a space of the mounting body located above the mounting groove 832 or a space of the mounting body located below the mounting groove 832. This is for light emitted from the lamp 821 to be transmitted to the outside of the housing P81 through the lamp through-hole 835.

The mounting portion P83 is fixed to the housing P81 via a mounting body fastening portion 813 disposed on the accommodating body 81a and an accommodating body fastening portion 833 disposed on the mounting body 831. The mounting body fastening portion 813 may be formed as multiple protrusions located inside the mounting space 811, and the accommodating body fastening portion 833 may be defined as a groove or the like defined in the circumferential face of the mounting body 831 (one face of the mounting body in contact with the accommodating body) and to which the mounting body fastening portion 813 is fixed.

The number of mounting body fastening portions 813 and the number of accommodating body fastening portions 833 should be set to be the same, and positions of the mounting body fastening portion 813 and the accommodating body fastening portion 833 should be set to correspond to each other.

In order to increase a fastening force of the mounting body 831, the accommodating body fastening portion 833 may include an upper fastening portion positioned higher than the seating surface 832 and a lower fastening portion positioned lower than the seating surface 832. Unlike the drawing, the accommodating body fastening portion 833 may be disposed on each of left and right sides of the seating face.

A window P85 may be further disposed on the accommodating body 81a to prevent water and foreign substances from flowing into the display P84 and the second circuit board P82.

Preferably, the window P85 is fixed to at least one of the accommodating body 81a and the mounting body 831 to close the accommodating body through-hole 812. The window P85 should be made of a material having a transparency that allows the information displayed on the display P84 and the light emitted from the lamp 821 to be viewed from the outside.

When the window P85 is fixed to the mounting body 831, the window P85 may have a cover fixing protrusion 851 protruding toward the mounting body 831, and the mounting body 831 may have a fixing protrusion fastening portion 834 to which the cover fixing protrusion 851 is coupled.

The second circuit board P82 may also be fixed to the mounting body 831. That is, the mounting portion P83 may have a protrusion protruding from the mounting body 831 toward the second circuit board 82, and the second circuit board 82 may have a protrusion through-hole 823 into which the protrusion is inserted.

Further, the window P85 may further include a cover sheet 853 for lowering the transparency of the cover. It is preferable that a transparency of the cover sheet is set to such a degree that it is difficult to view the interior of the mounting space 811 from the outside (the transparency of the cover sheet is set lower than the transparency of the cover). The cover sheet 853 may be fixed to a surface of the window P85, and a letter or symbol H may be displayed in an area of the cover sheet on which the lamp through-hole 835 is projected.

In one example, a lamp through-hole 835 corresponding to the input area D3 among the lamp through-holes 835 in the mounting portion P83 may provide a signal instructing the user to press the input area D3.

The selection portion R may be disposed inside the displaying portion P8. Specifically, the selection portion R may be formed as a component of the displaying portion P8 and may be disposed in the displaying portion P8 to be disposed inside the manipulation portion P7.

Accordingly, it may be seen that the displaying portion P8 includes the selection portion R that receives a determination command to determine the state information displayed on the display P84. Because the determination command determined by the selection portion R changes based on the state information, the selection portion R may correspond to a variable input means.

For example, when the selection information of the course and the option is displayed on the display P84, the selection portion R may be configured to input a determination command to select or determine the course and option. In addition, when a guide is displayed on the display P84, the selection portion R may be configured to input a determination command to identify the guide.

As a result, the selection portion R may be configured to, based on a type of the control command displayed on the display 84, receive a determination command for the user to identify or determine the corresponding control command.

The selection portion R may be configured to determine whether the control command displayed on the display P84 is selected by sensing whether the user's body is in contact with the window P85.

That is, the selection portion R may include a sensor R3 disposed on the second circuit board 82 and sensing the static electricity of the user's body, and a conductor R2 or a physical button R1 for connecting the sensor R3 and the window P85 to each other.

The selection portion R may be composed of a receiver R1 attached to or coupled to the window P85, and a transmitter R2 having one end connected to the receiver R1 and the other end connected to the sensor R3. In this case, the mounting body 831 must have a conductor through-hole 837 into which the transmitter R2 is inserted.

The receiver R1 is means for facilitating the input of the control command by expanding an area that the user may contact. In the control panel P having the above structure, the display area D1 is formed in an upper space of the window P85, and the input area D3 is formed in a lower space of the window P85. Therefore, when a width of the receiver R1 is set to be great, a width of the input area D3 is expanded, so that the user may more easily input the control command. The width of the receiver R1 is preferably set to equal to or smaller than ¼ to ½ of a width of the window P85.

The transmitter R2 and the receiver R1 may be formed as a conductor. Therefore, when the user's body is in contact with the transmitter R2 and the receiver R1, a current of the user's body may be charged or transmitted, so that the current may be transmitted to the sensor R3.

In addition, the transmitter R2 and the receiver R1 may be formed physical buttons. Therefore, when the user's body presses the receiver R1, the pressure of the body may be transmitted to the sensor R3.

The receiver R1 may be formed as a film that is printed or attached to a rear face of the window P85, and may be made of a carbon-based material or the like.

In one example, the displaying portion P8 may include inducing means 839 for inducing the user to press the selection portion R.

The inducing means 839 may guide the user to the location of the selection portion R to induce the user to press the selection portion R.

The inducing means 839 may include the lamp 821 and the lamp through-hole 835 corresponding to the position of the receiver R1. Specifically, the inducing means 839 may include the lamp through-hole 835 defined below the display P84 and the lamp 821 installed inside the lamp through-hole 835.

The lamp through-hole 835 and the lamp 821 constituting the inducing means 839 may be disposed below the display P84 and at a center of the mounting portion 83.

Accordingly, when the lamp 821 emits the light in the inducting means 839, the selection portion R or an area adjacent to the selection portion R may be brightened.

In addition, the lamp 821 of the inducing means 830 may be formed as an LED element and the like to indicate a separate character or phrase.

The control panel P having the above structure enables display of the control command, search for the displayed control command, and selection of the displayed control command, and enables minimization of a space required for installation. However, the control panel P having the above structure needs means to block the inflow of water or the foreign substances to the displaying portion P8 and the manipulation portion P7 or to discharge the inflowed water or foreign substances to the outside.

The control panel P having the above structure will display a preset control command on the display P84 whenever the user rotates the handle P73 (whenever the encoder generates the electrical signal) (search and change the control command).

When the desired control command is displayed on the display P84, the user may select the displayed control command via the selection portion R, and the control command selected via the selection portion R may be initiated when the user inputs an execution command via the executing portion P47.

In one example, the handle P73 is coupled to the first circuit board P4 to enable a rotational movement, whereas the housing P81 of the displaying portion is fixed to the first circuit board P4, so that it is necessary to keep a gap between the handle P73 and the housing P81 constant. This is because, when the gap between the handle P73 and the housing P81 is not maintained, the rotation of the handle 7P3 is likely to be constrained.

FIG. 11 shows utilization of the control panel.

In the state display area D1 of the displaying portion P8, whether the door is locked, whether the communication module is activated, whether the course or the option is operated, whether the guide phrase is generated, and the like may appear in a form of an icon.

In addition, the number of displayed contents that may appear while rotating the manipulation portion P7 may be displayed in the state display area D1. For example, a plurality of dots may be arranged to be spaced apart from each other, and the number of contents displayed in the content display area D2 may be provided while one of the plurality of dots emits the light.

In the content display area D2, contents of the course and the option, the executed state of the course or the option, and the guide phrase necessary for the user may be displayed.

The content display area D2 may be larger than the state display area D1.

In the input area D3, light may be emitted to request the input of the user, and the guide phrase indicating which content the user should input may be displayed.

The power switch P46 may be disposed at a left side of the displaying portion P8, and the executing portion P47 may be disposed at a right side of the displaying portion P8.

The manipulation portion P7 may be rotatably disposed on an outer circumferential face of the displaying portion P8, and may rotate the drum 3.

The arbitrary course may be a series of control methods for performing the washing cycle (the drying cycle) of washing the laundry.

When the manipulation portion P7 is rotated, a name of the corresponding course and a simple option name may be displayed in the content display area D2 of the displaying portion P8 based on a set order, and a description of the course or the option may be displayed.

The option may be selected by the setting portion P2. The setting portion P2 may be configured to receive a selection command for selecting at least one of the arbitrary options.

The arbitrary option may include setting additional conditions of the course.

For example, the arbitrary option may be a set algorithm or a control method for adjusting at least one of the number of repetitions of each cycle to perform the course, an intensity of performing each cycle, a rotation speed of the drum when performing each cycle, a temperature of water, an amount of water, and a duration of each cycle.

The setting portion P2 may be formed as a touch display for selecting the arbitrary option, and may have a plurality of lamps and a plurality of conductor switches capable of sensing the user's body.

For example, the setting portion P2 may include option selection portion B that receives a setting command to set the conditions for the course, and option displaying portion B4 that displays option information corresponding to the option selection portion B.

For example, the option selection portion B may include rinsing means B1 for adjusting a rinsing force related to the rotation speed and duration of the drum, the amount of water, and the number of times of rinsing when the course performs the rinsing cycle, dehydration means B2 for adjusting a dehydration force related to the rotation speed and duration of the drum when the course performs the dehydration cycle, and temperature means B3 of adjusting a temperature of water when the course performs the washing cycle.

The option displaying portion B4 may be configured to indicate the rinsing force, the dehydration force, and the temperature in an objectified and unitized manner.

In one example, the setting portion P2 may have a utilizing means C that receives a utilization command to utilize a function of the laundry treating apparatus.

For example, the utilizing means C may include washing means C1 for inputting a special washing cycle such as functional laundry washing, soft laundry washing, and tub washing, reservation means C2 for inputting a reservation command to perform the washing course at a specific time, sterilizing means C for promoting sterilization by adding steam to the laundry during the course cycle, and additional function means C4 for utilizing additional functions such as pairing with other devices.

In addition, the setting portion P2 may include switching portion E for receiving a connection command to be in communication with the laundry drying apparatus 20 or the mini apparatus 60.

In one example, the setting portion P2 allows a function that may be utilized at a present time point or a function selected by the user to be turned on and allows a function that is not able to be executed or is not selected by the user to be turned off.

The setting portion P2 may display all of the contents via an auxiliary display P19.

Hereinafter, an embodiment and a control method for displaying and controlling the laundry drying apparatus 20 or the mini apparatus 60 with the control panel P of the laundry washing apparatus 10 will be described. However, this is only for omitting repetitive descriptions, and is able to be equally applied when controlling the laundry washing apparatus 10 or the mini apparatus 60 with the drying control panel PA.

In addition, the same may be applied when controlling the laundry washing apparatus 10 or the laundry drying apparatus 20 with the mini control panel PC.

Figure 12A:
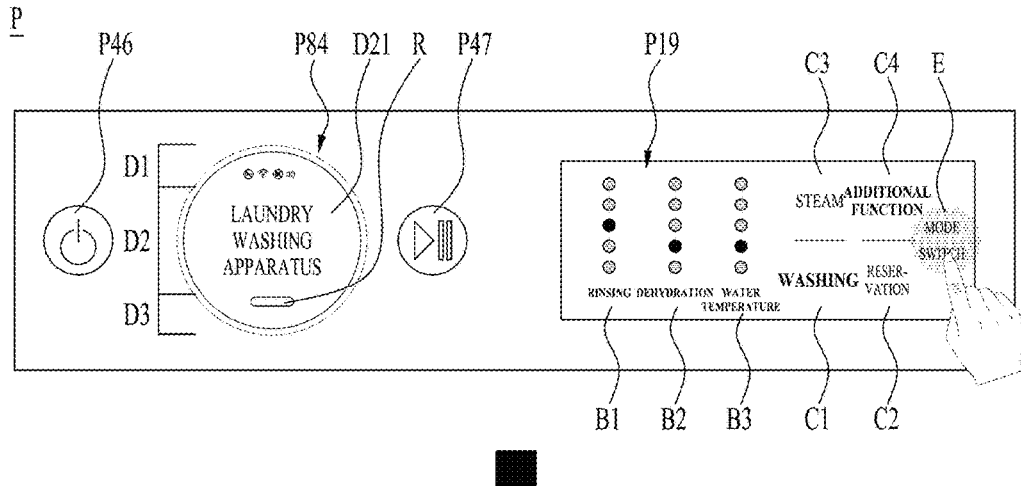
FIGS. 12A to 12C show an embodiment of displaying state information of another laundry treating apparatus with a control panel of a laundry treating apparatus.
Figure 12B:
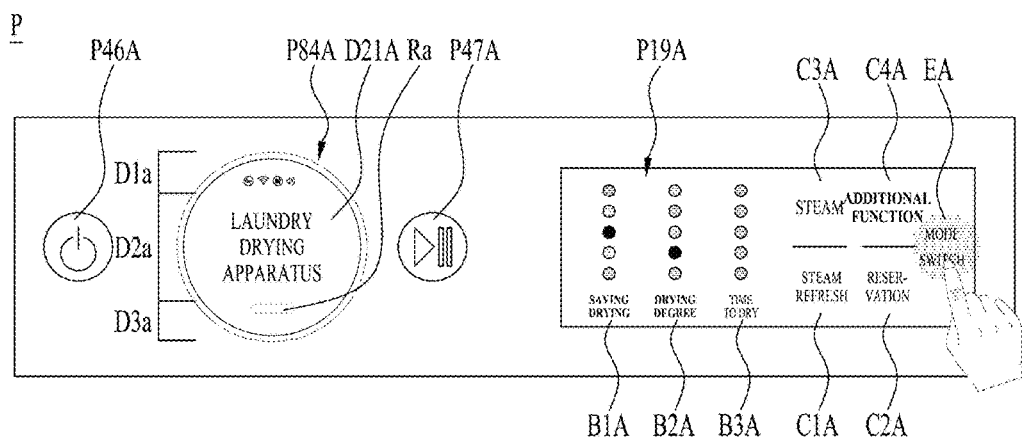
Figure 12C:
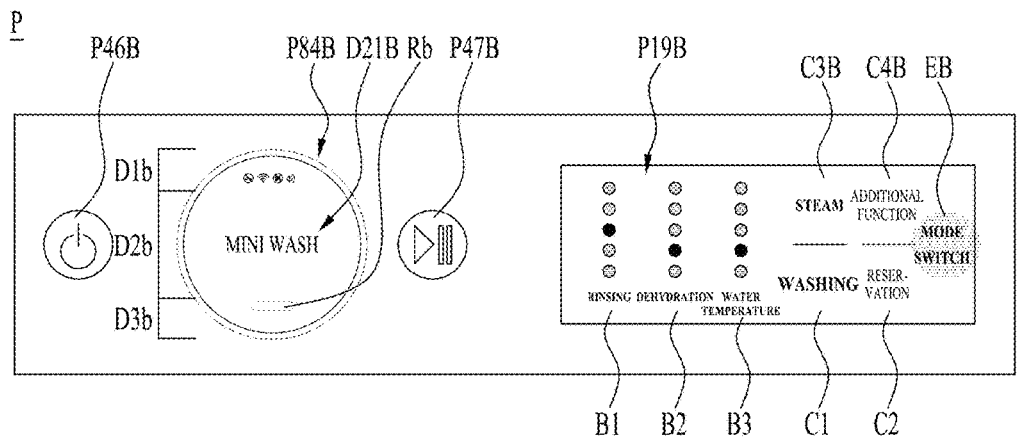

FIGS. 12A to 12C show an embodiment in which an entire laundry treating apparatus may be controlled by the control panel.

Referring to FIG. 12A, the displaying portion P8 may display the state of the laundry washing apparatus 10.

The displaying portion P8 may display laundry washing apparatus information D21 including at least one of the name of the course or the option that may be performed in the laundry washing apparatus 10, the selected state of the course or the option, the executed state of the course or the option, the completion state of the course or the option, and notification information indicating an additional announcement or a recommendation for the user.

Specifically, the name of the arbitrary washing course or option selectable via the manipulation of the manipulation portion P7 may be displayed. In addition, when the manipulation portion P7 selects one course or option, the displaying portion P8 may display the state in which the course or option is selected.

In addition, when the execution command is input to the executing portion P47 and the course or the option is executed, the displaying portion P8 may display the executed state such as a remaining time of the course or the option.

In addition, the displaying portion P8 may also display the notification information generated from the laundry washing apparatus 10 and required to be notified to the user. Therefore, the user may identify the operating state of the laundry washing apparatus 10 and identify the notification information generated from the laundry washing apparatus 10 to take action.

In one example, the user may be curious about the states of the laundry drying apparatus 20 and the mini apparatus 60. In addition, the user may be intended to additionally use the laundry drying apparatus 20 or the mini apparatus 60 after the use of the laundry washing apparatus 10.

when it is necessary for the user to access the laundry drying apparatus 20 and the mini apparatus 60 to additionally use the apparatuses 20 and 60, it may cause inconvenience such as an increase in a moving line of the user.

In order to reduce such inconvenience, the laundry washing apparatus 10 of the present disclosure may recognize the states of the laundry drying apparatus 20 and the mini apparatus 60 via the displaying portion P8 when the connection command is input to the switching portion E.

Referring to FIG. 12B, when the user inputs the connection command to the switching portion E, the displaying portion P8 may display laundry drying apparatus information D21A including at least one of a name of the course or the option that may be performed in the laundry drying apparatus 20, the selected state, the executed state, and the completion state to the outside.

In addition, when notification information is generated from the laundry drying apparatus 20, the notification information may be displayed on the displaying portion P8 of the laundry washing apparatus 10.

Accordingly, the user may recognize the state of the laundry drying apparatus 20 via the displaying portion P8 without moving to the laundry drying apparatus 20 and identifying the drying control panel PA.

For example, when the connection command is input to the switching portion E in the state in which the course or the option of the laundry drying apparatus 20 is being performed, the executed state of the course or the option of the laundry drying apparatus 20 may be displayed.

In addition, when the connection command is input to the switching portion E and the laundry drying apparatus information D21A is displayed on the displaying portion P8, it may be controlled such that the course or the option of the laundry washing apparatus 10 is not selected with the manipulation portion P4 or the selection portion R, but the course or the option of the laundry drying apparatus 20 is selected.

The displaying portion P8 may be configured to display the selected state of the course or the option of the laundry drying apparatus 20 when the selection command for selecting the course or the option of the laundry drying apparatus 20 is input with the manipulation portion.

In addition, when the connection command is input to the switching portion E and the laundry drying apparatus information D21A is displayed on the displaying portion P8, the setting portion P2 may also be configured to display an option command to change or reset the option of the laundry drying apparatus. In this regard, when the option command is input to the setting portion P2, the option of the laundry drying apparatus 20 rather than of the laundry washing apparatus 10 may be changed. That is, the setting portion P2 may be set to receive the option command of the laundry drying apparatus 20.

In addition, when the displaying interface P8 is displaying the selected state of the course or the option of the laundry drying apparatus 20, the executing portion P47 may be configured to receive the execution command to execute the course or the option of the laundry drying apparatus.

The displaying interface P8 may directly display the executed state of the course or the option of the laundry drying apparatus 20.

In addition, when the displaying interface is in the process of displaying the executed state of the course or the option of the laundry drying apparatus 20, the executing portion P47 may be configured to receive the stop command to stop the course or the option of the laundry drying apparatus 20, not the laundry washing apparatus 10. When the executing command is input to the executing portion P47, the operation of the laundry drying apparatus 20, not the laundry washing apparatus 10, may be stopped.

In other words, when the connection command is input to the switching portion E and the laundry drying apparatus information D21A is displayed on the displaying portion P8, the control panel P may be set to control the dryer 20. As a result, an effect of remotely controlling the laundry drying apparatus 20 with the control panel P may be derived.

When the connection command is input to the switching portion E, the communication module T1 and the drying communication module T2 may be set to be paired with each other. When the information about the state is transmitted to the communication module T1 via the drying communication module T2, the controller M1 or the communication controller T12 may display the state information with the displaying portion P8.

In addition, the communication module T and the drying communication module T2 may be configured to maintain the paired state once the pairing is set. In this case, when the connection command is input to the switching portion E, the information about the state may be directly transmitted to the communication module T via the drying communication module T2. When the information about the state is transmitted to the communication module T via the drying communication module T1, the controller M1 or the communication controller T12 display the state information with the displaying portion P8.

In one example, the same may be applied to the communication module T1 and the mini communication module T3.

For convenience, based on the laundry washing apparatus 10, the laundry drying apparatus 20 may be defined as the home appliance and the mini apparatus 60 may be defined as an additional product.

In one example, when only the laundry washing apparatus 10 and the laundry drying apparatus 20 are arranged, the laundry washing apparatus information D21 may be set to be displayed on the displaying portion P8 via re-inputting of the connection command to the switching portion E.

The driver information D21A may be continuously displayed on the displaying portion P8 until the connection command is input again to the switching portion E.

Referring to FIG. 12C, in a case in which the mini wash 60 is also installed, when the user additionally inputs the connection command to the switching portion E, the displaying portion P8 may display at least one of mini apparatus information D21B including a name of the course or the option that may be performed in the mini apparatus 60, the selected state, the executed state, and the completion state to the outside. In addition, when notification information is generated from the mini apparatus 60, the notification information may be displayed on the displaying portion P8 of the laundry washing apparatus 10. In addition, when the notification information is generated from the mini apparatus 60, the notification information may be displayed on the displaying portion P8 of the laundry washing apparatus 10.

In addition, when the connection command is input to the switching portion E and the mini apparatus information D21B is displayed on the displaying portion P8, it may be controlled that the course or the option of the mini apparatus 60, rather than the course or the option of the laundry washing apparatus 10, is selected with the manipulation portion P4 or the selection portion R.

The displaying portion P8 may be configured to display the selected state of the course or the option of the mini apparatus 60 when the selection command for selecting the course or the option of the mini apparatus 60 is input with the manipulation portion.

In addition, when the connection command is input to the switching portion E and the mini apparatus information D21B is displayed on the displaying portion P8, the setting portion P2 may also be configured to display an option command for changing or resetting the option of the mini apparatus. In this regard, when the option command is input to the setting portion P2, the option of the mini apparatus 60 rather than the laundry washing apparatus 10 may be changed. That is, the setting portion P2 may be set to receive the option command of the mini apparatus 60.

In addition, when the displaying portion P8 is displaying the selected state of the course or the option of the laundry drying apparatus 20, the executing portion P47 may be configured to receive the execution command to execute the course or the option of the laundry drying apparatus.

The displaying portion P8 may directly display the executed state of the course or the option of the product of the mini apparatus 60.

In addition, when the displaying portion is in the process of displaying the executed state of the course or the option of the mini apparatus 60, the executing portion P47 may be configured to receive the stop command to stop the course or the option of the mini apparatus 60, not the laundry washing apparatus 10. When the stop command is input to the executing portion P47, the operation of the mini apparatus 60 rather than the laundry washing apparatus 10 may be stopped.

In other words, when the connection command is input to the switching portion E and the mini apparatus information D21B is displayed on the displaying portion P8, the control panel P may be configured to control the mini apparatus 60. As a result, an effect of remotely controlling the mini apparatus 20 with the control panel P may be derived.

When the connection command is repeatedly input to the switching portion E, the laundry drying apparatus information D21A and the mini apparatus information D21B may be sequentially displayed on the displaying portion P8. In addition, when the connection command is further input to the switching portion E, the laundry washing apparatus information D21 may be displayed again.

In one example, the communication module T may memorize an order in which the laundry drying apparatus 20 and the mini apparatus 60 are connected to the communication module. Accordingly, when the connection command is repeatedly input to the switching portion E, the laundry drying apparatus information D21A and the mini apparatus information D21B may be displayed in the order in which the laundry drying apparatus 20 and the mini apparatus 60 were paired to the communication module T.

In addition, information on an order in which the power is supplied to the laundry drying apparatus 20 and the mini apparatus 60 may be stored in the communication module storage T13 or the like via the communication module. Using the information, the laundry drying apparatus D21A and the mini apparatus information D21B may be displayed on the displaying portion P8 in the order in which the power is supplied to the laundry drying apparatus 20 and the mini apparatus 60.

Figure 13A:
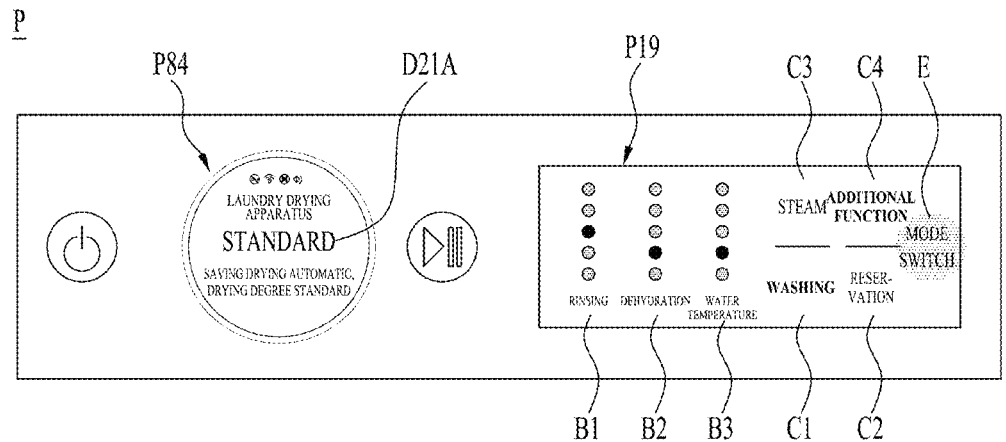
Figure 13B:
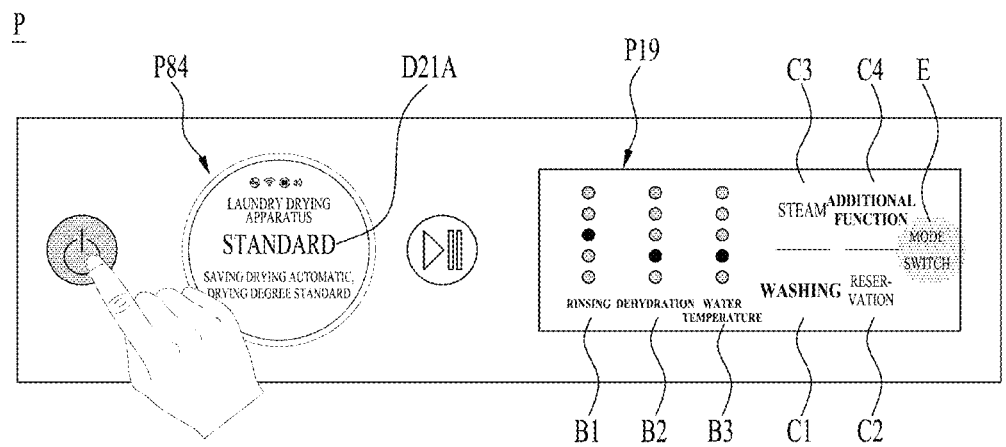
Figure 13C:
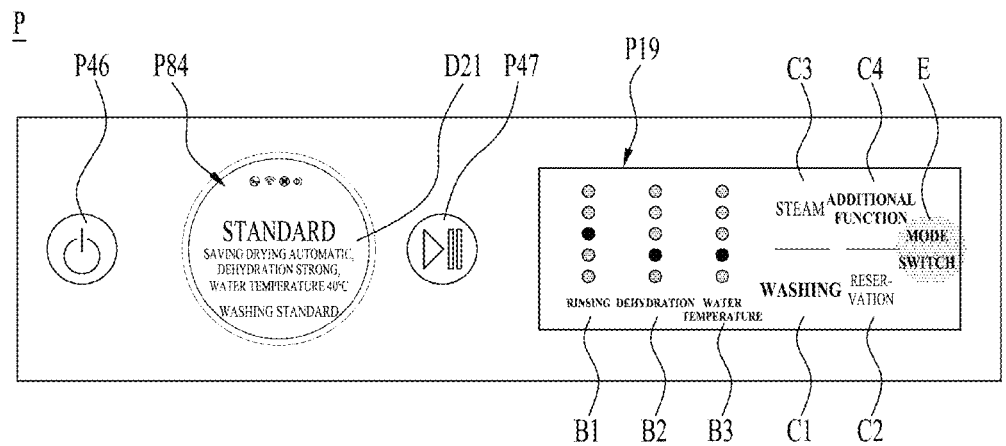

FIGS. 13A to 13C show an embodiment in which the laundry washing apparatus 10 may cut off power of another home appliance.

Referring to FIG. 13A, the display P84 of the control panel P of the laundry washing apparatus may be displaying the laundry drying apparatus information D21A of the laundry drying apparatus 20 upon the connection command being input to the switching portion E.

Referring to FIG. 13B, the power command may be input to the power switch P46. That is, although the laundry drying apparatus information D21A is displayed on the display P84, the power command may be input to the power switch p46 of the laundry washing apparatus 10.

Referring to FIG. 13C, the laundry drying apparatus 20 may be in a power-off state because the power supply thereto is cut off. Accordingly, the communication module T of the laundry washing apparatus 10 is disconnected from the drying communication module T2, and the display portion P8 may display the laundry washing apparatus information D21A again thereon.

In other words, when the power command is input to the power switch P46 in a state in which the display portion P8 displays the laundry drying apparatus information D21A, the power of the laundry drying apparatus 20 may be cut off. Further, when the power command is input to the power switch P46 while the display portion P8 is displaying the mini apparatus information D21C, the power of the mini apparatus 60 may be cut off.

That is, the control panel P may remotely cut off the power of another home appliance via the switching portion E.

Accordingly, when it is necessary for the user to stop an operation of another home appliance in addition to a specific home appliance, the user may immediately and remotely stop another home appliance. Accordingly, when the user recognizes that a child or the like has accidentally operated another home appliance or another home appliance has operated erroneously, the user may end the operation of another home appliance using the specific home appliance.

In one example, in a state in which the power of the laundry drying apparatus 20 is cut off, the course or option of the laundry washing apparatus 10 may be also completed. In this case, the power of the laundry washing apparatus 10 may be also cut off.

FIGS. 14A to 14C show an embodiment in which the laundry washing apparatus 10 may supply power to another home appliance.

Referring to FIG. 14A, the display portion P8 of the laundry washing apparatus 10 may display the laundry washing apparatus information D21 in the state in which the power command is input to the power switch P46. However, the laundry drying apparatus 20 or the mini apparatus 60 may be in a state in which power is not supplied thereto.

Even in this case, the user may input the power command to the power switch E.

Referring to FIG. 14B, the control panel P may display power information indicating that the laundry drying apparatus 20 or the mini apparatus 60 is in a power-off state on the display portion P8.

For example, the display portion P8 may display the laundry drying apparatus information D21A on the display P84 even when the power of the laundry drying apparatus 20 is cut off.

Referring to FIG. 14C, the laundry drying apparatus information D21A may be displayed on the display portion P8. The laundry drying apparatus information D21A may be in the same state as that of the screen displayed on the display portion of the laundry drying apparatus 20 when the power is input to the laundry drying apparatus 20.

As a result, when the connection command is input to the switching portion of the laundry washing apparatus 10 in a state in which power is not supplied to the laundry drying apparatus 20 or the mini apparatus 60, power may be supplied to a home appliance with which paring is scheduled.

In other words, even when power is not supplied to the laundry drying apparatus 20 or the mini apparatus 60, the connection command may be input to the switching portion of the laundry washing apparatus 10 such that the power is supplied to the laundry drying apparatus 20 or the mini apparatus 60.

The communication module T may transmit the input command to the switching portion to the communication module of the laundry drying apparatus 20 or the mini apparatus 60. Since the communication module of the laundry drying apparatus 20 or the mini apparatus 60 is in a state in which power is continuously supplied thereto, the communication module may receive the input command and input the power command for supplying power to each of the main controllers. Accordingly, the laundry drying apparatus information D21A or the mini apparatus information D21B may be displayed on the display portion P8.

Therefore, the user may supply or cut off the power to or from the laundry drying apparatus 20 and the mini apparatus 60 via the control panel P of the laundry washing apparatus 10.

Accordingly, the user may remotely input the power to the laundry drying apparatus 20 and the mini apparatus 60 and may input the course or option. For example, the laundry drying apparatus 20 may be remotely instructed to be ready to perform a course or option, for example, to heat the refrigerant.

In another example, when there is no additional manipulation for a reference time duration in a state in which the connection command is input to the switching portion E, the power supply to the laundry drying apparatus 20 or the mini apparatus 60 may be cut off again.

FIGS. 15A and 15B show an embodiment in which input to the switching portion E may be inactivated.

Unlike the above-described embodiment, the communication module of the laundry washing apparatus 10 is not in a state paired with the laundry drying apparatus 20 or the mini apparatus 60, so communication is not possible, or the laundry drying apparatus 20 or the mini apparatus when the power is in the cut-off state at 60, the switching portion E may be inactivated.

Accordingly, the user may recognize that the switching portion E cannot receive the input, and thus may recognize that the laundry drying apparatus 20 or the mini apparatus 60 is not in operation.

FIGS. 16A to 16D show an embodiment when a course of a corresponding home appliance is terminated during remote display.

Figure 16A:
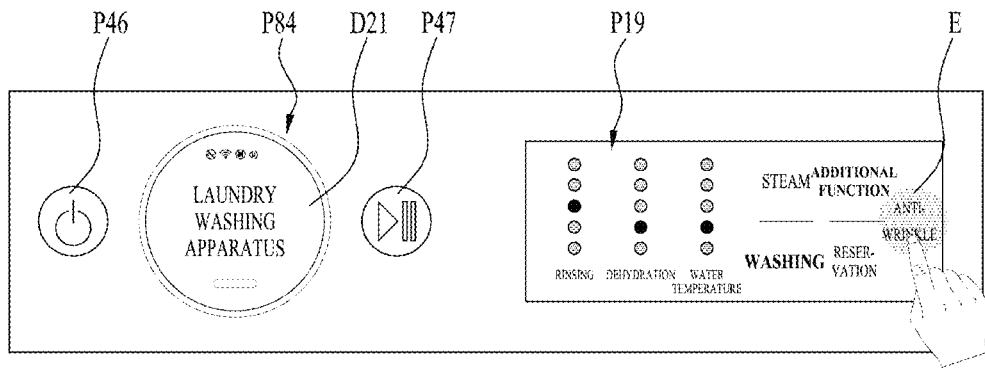

Referring to FIG. 16A, the control panel P may be in a state in which the laundry washing apparatus information D21 is displayed thereon. At this time, the laundry drying apparatus 20 may be in a state in which the drying course is performed therein.

In this process, when the connection command is input to the switching portion E, the control panel P may serve as the control panel PA of the laundry drying apparatus 20.

Figure 16B:
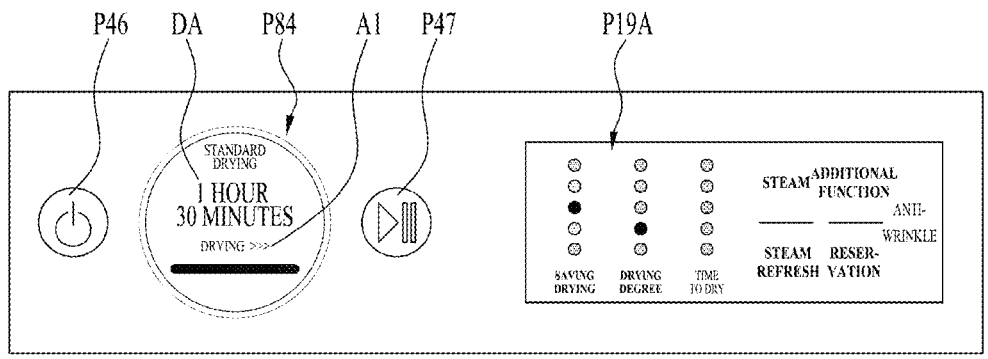

Referring to FIG. 16B, the laundry drying apparatus information D21A may be displayed on the display portion P8. For example, a name of the course being performed, a state of each of the course and the option being performed, a time duration thereof, etc. may be displayed thereon.

The setting portion P2 may also be switched to setting portion of the laundry drying apparatus 20.

Figure 16C:
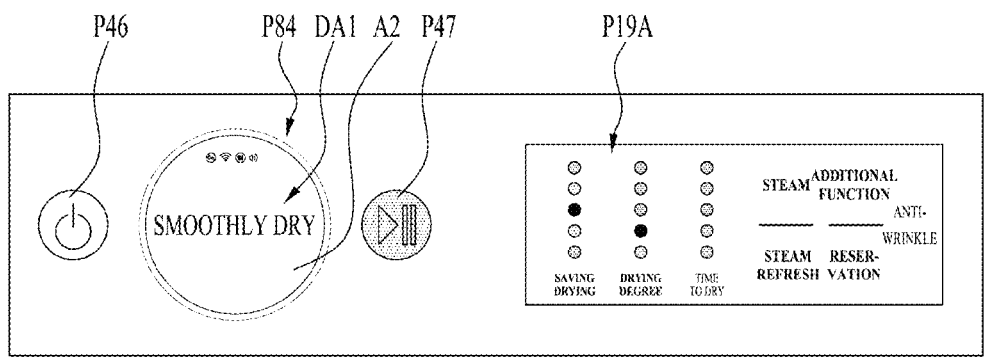

Referring to FIG. 16C, execution of the course and the option of the laundry drying apparatus 20 may be completed. The laundry drying apparatus information P21B of the display portion P8 may be displayed until the course and the option of the laundry drying apparatus 20 are performed.

Accordingly, the display portion P8 of the laundry washing apparatus may display completion information indicating that the course and the option of the laundry drying apparatus 20 have been completed. For example, a phrase such as "laundry has been dried in a dry and soft state" may be displayed.

Figure 16D:
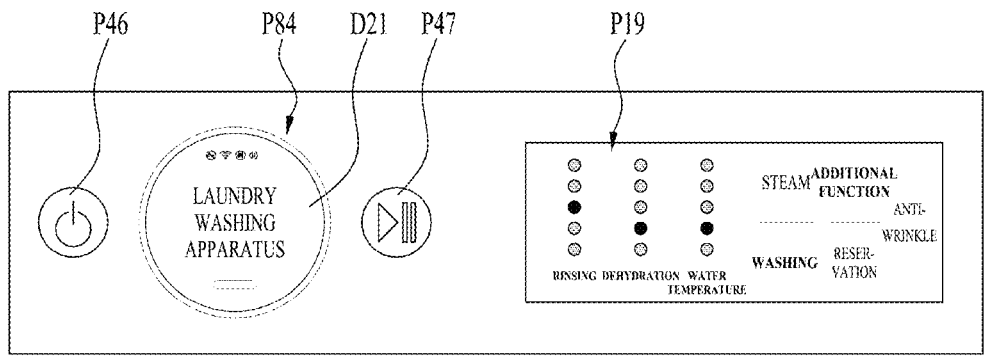

Referring to FIG. 16D, when execution of the course and the option of the laundry drying apparatus 20 has been completed, the display portion P8 may display the laundry washing apparatus information D21 again thereon. At this time, when a reference time duration has elapsed, the power of the laundry washing apparatus 10 may also be cut off.

As a result, the display portion P8 may be prevented from being activated for an endless time duration and thus from consuming standby power.

Figure 17:
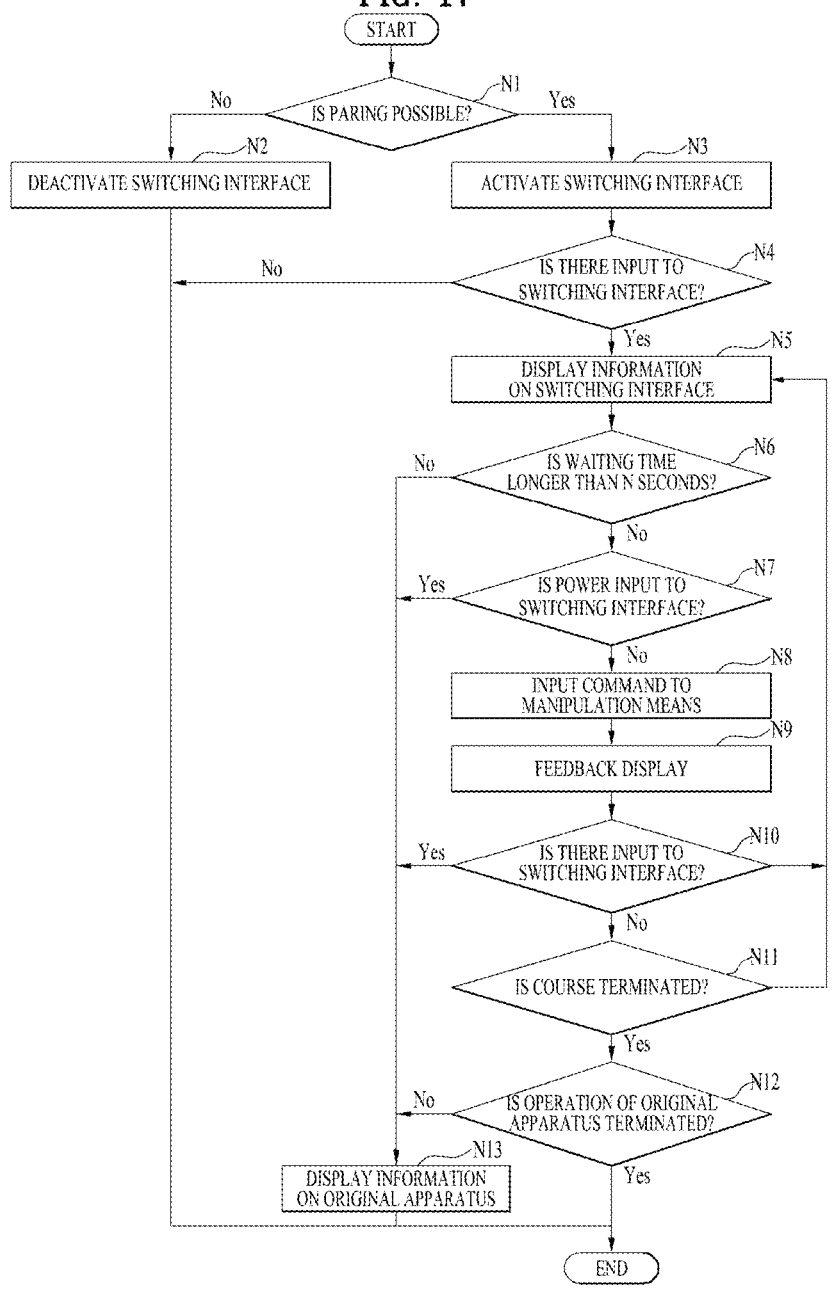
FIGS. 17 to 19D show an embodiment of a control method that may be utilized in a system of the present disclosure.

FIG. 17 shows an embodiment of a control method of the laundry treating apparatus according to the present disclosure.

The above control method is described based on the laundry washing apparatus 10. This description may be equally applied to each of the laundry drying apparatus 20 and the mini apparatus 60.

The communication module T of the laundry washing apparatus 10 may perform a checking step N1 of checking whether the communication module T is paired with or is communication-connected to the laundry drying apparatus 20 or the mini apparatus 60. The checking step N1 may be performed when power is supplied to the laundry washing apparatus 10.

When the pairing is not established in the checking step N1, a deactivation step N2 in which the switching portion is deactivated may be performed. In the deactivation step N2, inputting to the switching portion E may be inactivated, or the inputting thereto may be impossible.

When the pairing is established in the checking step N1, an activation step N3 in which the switching portion E is activated such that inputting thereto is possible may be performed. When inputting to the switching portion is possible, a switching step (N4) of detecting the input to the switching portion E may be performed.

When there is no input to the manipulation portion P4 and the switching portion E does not receive any input for a reference time duration in the switching step (N4), power supply to the laundry washing apparatus 10 may be cut off.

When the connection command is input to the switching portion in the switching step N4, a display step N5 in which product information of a home appliance corresponding to the connection command to the switching portion is displayed on the display portion P8 may be performed.

In the display step N5, the display portion may display not the laundry washing apparatus information but the laundry drying apparatus information, or the mini apparatus information.

When the laundry drying apparatus information or the mini apparatus information is displayed on the display portion P8, a signal detection step N6 of determining whether a waiting time is longer than a reference time duration may be performed. When there is no separate manipulation in the signal detection step N6, a return step N13 in which the display N8 displays the laundry washing apparatus information thereon again may be performed.

The reference time duration may be set to a value between 10 seconds and 60 seconds.

In the signal detecting step N6, a cutoff detection step N7 of detecting cut off of the power from the laundry drying apparatus 20 or the mini apparatus 60 may be performed. When the power to the laundry drying apparatus 20 or the mini apparatus 60 is cut off in the cutoff detection step N7, the return step 13 may be performed.

An input step N8 of detecting that a command is input to the manipulation portion P7, the executing portion P47, etc. in the signal detecting step N6 may be performed. When the input step N8 is performed, the course or the option of the laundry drying apparatus 20 or the mini apparatus 60 may be selected or performed.

The display portion P8 may perform a feedback display step N9 for displaying the selected state or the executed state of the course or the option.

In this regard, a re-input step N10 of sensing the input to the switching portion E is performed. When the connection command is input to the switching portion E, the return step N13 may be performed.

When there is no input to the switching portion E until end of the course in the re-input step N10, an end determination step N11 of determining whether the course is terminated is performed. Upon determination that the course does not end in the end determination step N11, the display step N5 may be performed such that the executed state may be displayed.

Upon determination that the course ends in the end determination step N11, an apparatus state determination step N12 is performed to determine whether the course or the option of the laundry washing apparatus 10 is in an ended state. Upon determination that the laundry washing apparatus operates in the apparatus state determination step N12, the return step N13 is performed such that laundry washing apparatus information may be displayed on the display portion P8.

Upon determination that the laundry washing apparatus 10 does not operate in the apparatus state determination step N12, the power to the laundry washing apparatus 10 may be cut off.

Figure 18:
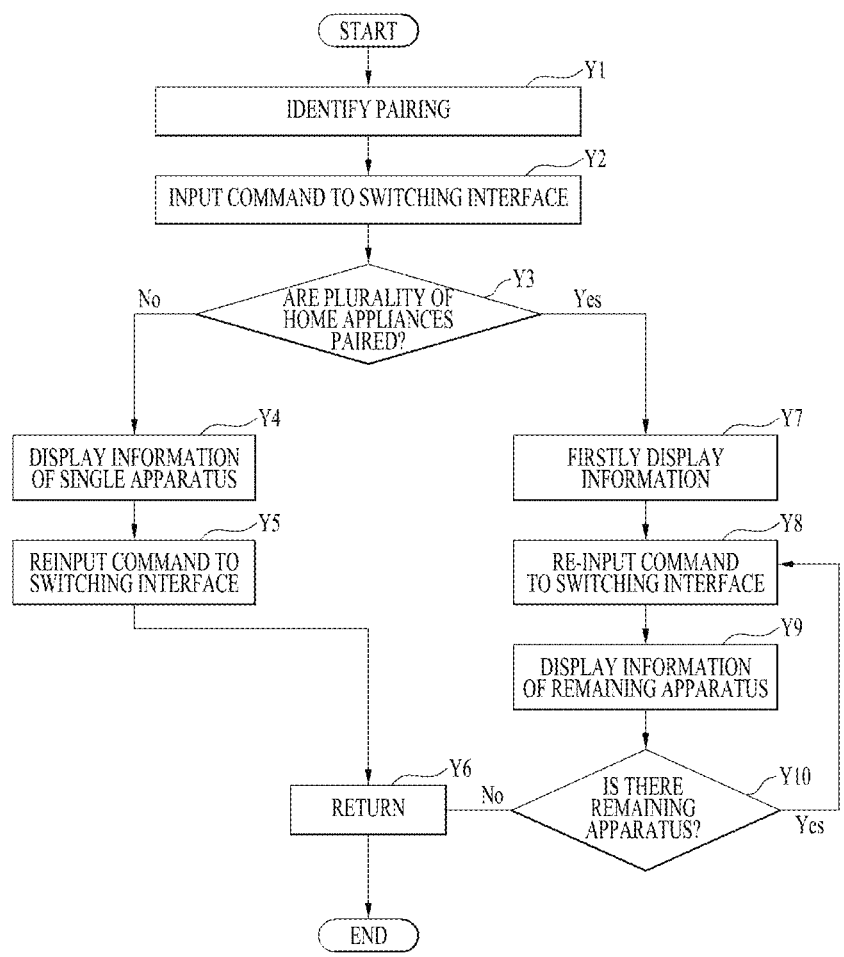

FIG. 18 shows a further embodiment of a control method of a laundry treating apparatus according to the present disclosure.

The communication module T of the laundry washing apparatus 10 according to the present disclosure may include a pairing step Y1 for performing pairing with the laundry drying apparatus 20 and the mini apparatus 60.

That is, the control method of FIG. 18 may be based on a state in which the pairing has been established.

When the laundry washing apparatus 10 is connected with another home appliance via the pairing step Y1, the switching portion E is activated such that an input step Y2 in which the connection command is input to the switching portion E may be performed.

The control panel P may perform a pairing determination step Y3 of determining whether a plurality of home appliances are paired to the communication module T.

When only the laundry drying apparatus 20 or the mini apparatus 60 is paired to the communication module T, a display step Y4 in which the display portion P8 displays information about only the home appliance paired therewith may be performed.

At this time, when the connection command is input to the switching portion E again, a return step Y6 in which the display portion P8 displays the laundry washing apparatus information D21 again thereon may be performed.

In one example, when both the laundry drying apparatus 20 and the mini apparatus 60 are paired with the communication module T, a priority may be allocated to the laundry drying apparatus 20 and the mini apparatus 60 and then the display portion P may first display information of a specific home appliance based on the priority. The priority may be preset in an order of the laundry drying apparatus 20 and the mini apparatus 60. The priority may be preset based on an order in which power is supplied to the laundry drying apparatus 20 and the mini apparatus 60, or based on an order in which the laundry drying apparatus 20 and the mini apparatus 60 are paired to the communication module T.

The priority may be stored in the communication storage T13 of the communication module T or the main storage S of the control panel P.

The laundry washing apparatus 10 may perform a re-input detection step Y8 of detecting re-input to the switching portion.

When the re-input detection step Y8 is performed, a remaining apparatus display step Y9 in which information of the remaining home appliances is displayed may be performed. The control panel P may perform a remaining apparatus determination step Y10 of determining whether there is a home appliance that is not displayed on the display portion P8 in the remaining apparatus display step Y9. Upon determination that the remaining apparatus remains, the remaining apparatus display step Y9 is performed again when the connection command is re-inputted to the switching portion E. Upon determination that there is no remaining apparatus, the return step Y9 may be performed when the connection command is re-inputted to the switching portion E. Thus, the laundry washing apparatus information may be displayed again on the display portion P8.

FIGS. 19A to 19D show a further embodiment of a laundry treating apparatus according to the present disclosure.

In the laundry treating apparatus according to the present disclosure, one of a plurality of home appliances may be in a paired state with remaining ones thereof. For example, the laundry washing apparatus 10 may be in a paired state with both the laundry drying apparatus 20 and the mini apparatus 60.

Hereinafter, the control method will be described based on the laundry washing apparatus 10. The same control method may be equally applied to the laundry drying apparatus 20 or the mini apparatus 60.

Figure 19A:
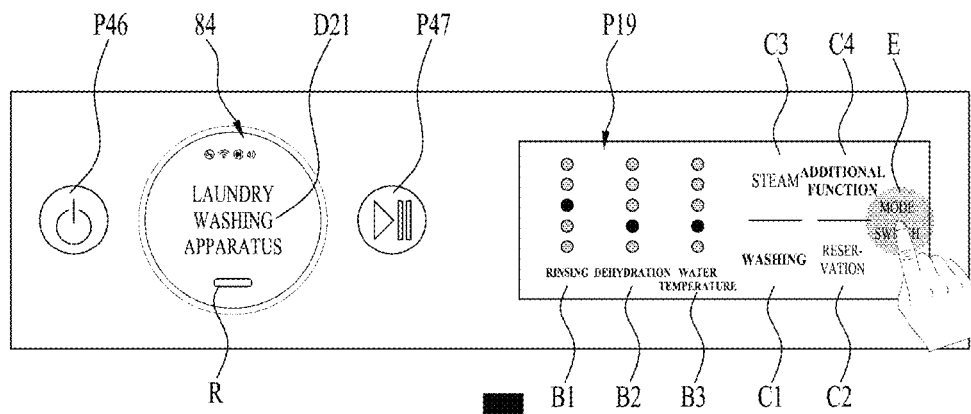

Referring to FIG. 19A, the laundry washing apparatus information D21 is displayed on the control panel P. Option information or additional functions of the laundry washing apparatus 10 may be displayed on the display P19 of the setting portion.

Unlike the above-described embodiment, the display P19 of the setting portion may be always configured to display only the optional information or additional functions of the laundry washing apparatus 10 so that the optional information or additional functions of another home appliance are not displayed on the display P19 of the setting portion. Accordingly, only the display portion P8 may include the display P84 such as a liquid crystal display, and the auxiliary display P19 may be provided in a simple form in which only a predetermined area thereof is turned on/off.

As a result, the user may acquire information while focusing on the display portion P8, and may intuitively identify auxiliary information such as option information and additional functions using the auxiliary display P19.

Figure 19B:
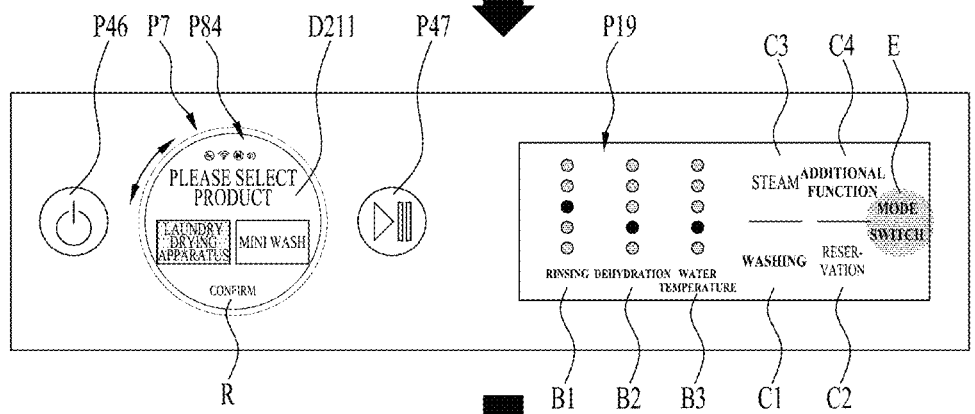

Referring to FIG. 19B, the connection command may be input to the switching portion E. When the connection command is input to the switching portion E, the display portion P8 may display thereon a selection request information D211 for requesting the user to select which one of the laundry drying apparatus 20 and the mini apparatus 60 such that the selected one is displayed.

That is, the display portion P8 may request the user to select whether to display the laundry drying apparatus information D21A or the mini apparatus information D21B.

In other words, unlike the above-described embodiment, when a plurality of home appliances are paired to the communication module T, the control panel P of the laundry washing apparatus 10 may allocate the priority to the plurality of home appliances and thus may not randomly display information about a specific home appliance but may display information of a home appliance desired by the user.

This may prevent the user from repeatedly inputting the connection command to the switching portion E, and may prevent the user from confusing between the laundry drying apparatus information D21A and the mini apparatus information D21B.

Figure 19C:
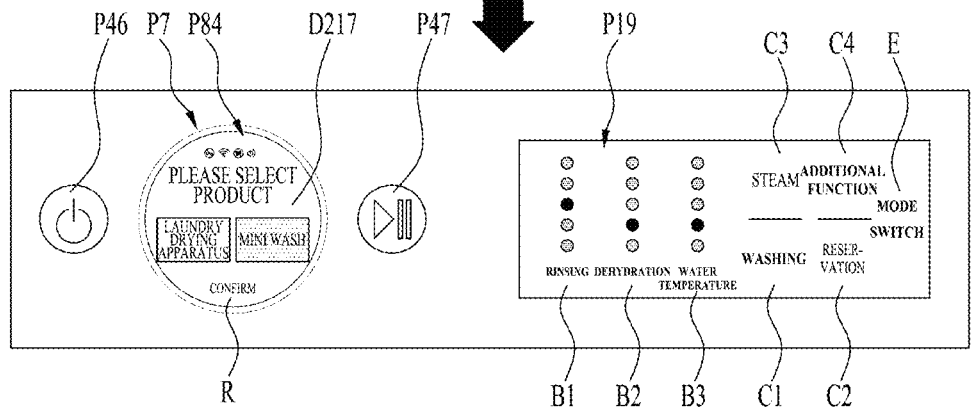

Referring to FIG. 19C, the selection request information D211 may be configured to allow the user to perform selection using the manipulation portion P7. For example, when the user turns the manipulation portion P7 to the left, the laundry drying apparatus information D21 may be displayed. When the user turns the manipulation portion P7 to the right, the mini apparatus information D21B may be displayed.

In addition, the user may turn the manipulation portion P7 continuously or in several directions such that selection of one of the laundry drying apparatus information D21A and the mini apparatus information D21B may be modified from time to time.

In the laundry treating apparatus according to the present disclosure, a plurality of home appliances may be paired with a specific home appliance. In this case, information on an intended home appliance among the plurality of home appliances selected through the manipulation portion P7 upon inputting the connection command to the switching portion E may be displayed on the display portion P8. Thus, quick determination may be made so that the home appliance intended by the user is manipulated using the control panel P of the specific home appliance.

For example, the user may manipulate the manipulation portion P7 to select the mini apparatus information D21B.

Figure 19D:
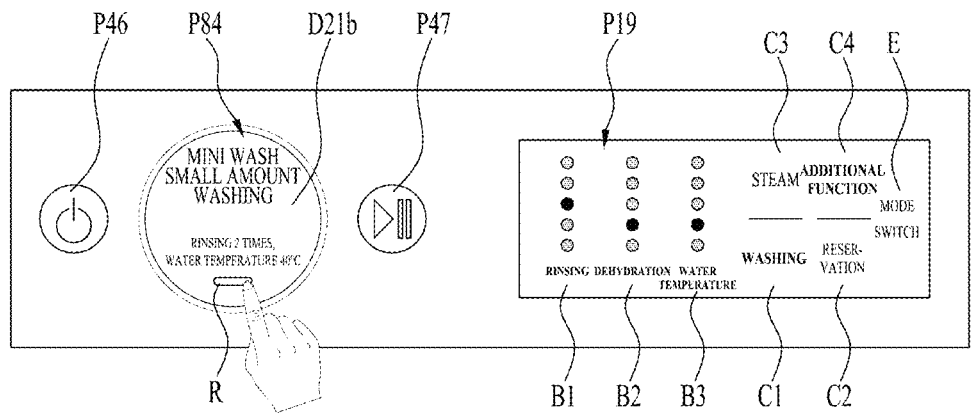

Referring to FIG. 19D, when the user finally decides to control a specific home appliance using the control panel P, the user may input a command to the selection portion R. The input command to the selection portion may be embodied as the user's body contact therewith.

When the command is input to the selection portion R, the user may confirm the selection of the home appliance selected with the manipulation portion P7.

For example, the mini apparatus information D21B may be displayed on the display portion P8.

Figure 20:
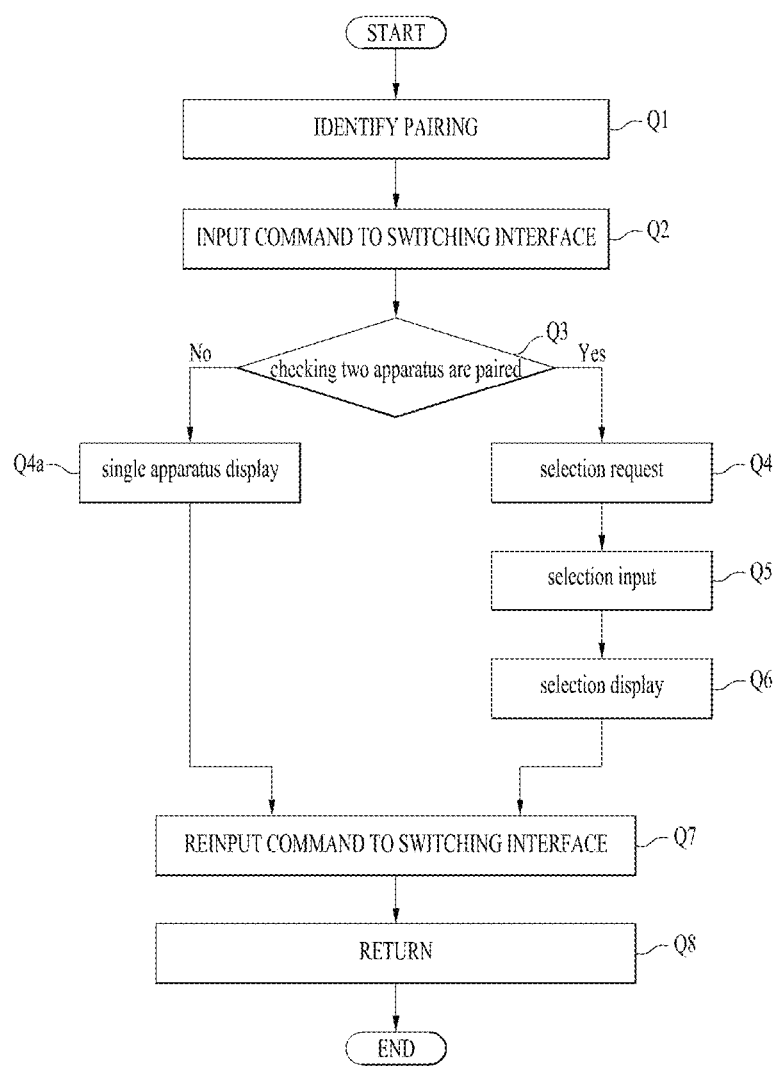

FIG. 20 shows a control method in which FIGS. 19A to 19D is performed.

The communication module T of the laundry washing apparatus 10 may perform a pairing state check step O1 to check the pairing state with the communication module of each of the laundry drying apparatus 20 and the mini apparatus 60.

When a switching portion input step Q2 in which the connection command is input to the switching portion E is performed, the control panel P may perform a check step Q3 of checking which of the laundry drying apparatus 20 and the mini apparatus 60 is paired therewith may be performed.

Upon determination that only one of the laundry drying apparatus 20 and the mini apparatus 60 is paired therewith in the check step Q3, a single apparatus display step Q4a may be performed in which the display portion P8 displays only the information of the paired device among the laundry drying apparatus 20 and the mini apparatus 60.

For example, when only the laundry drying apparatus 20 is paired therewith, the display portion P8 may display only the laundry drying apparatus information D21A.

Thereafter, when a re-input detection step Q7 of detecting that the connection command is re-inputted to the switching portion E is performed, a return step Q8 may be performed in which the display portion P8 displays the laundry washing apparatus information D21 again.

In one example, upon determination that all of the plurality of home appliances are paired therewith in the check step Q3, a selection request step Q4 may be performed in which the control panel P displays a selection request for the user to select information about which of the plurality of home appliances to be displayed on the display portion P and for the user to control which of the plurality of home appliances using the control panel P.

For example, when both the laundry drying apparatus 20 and the mini apparatus 60 are paired with the laundry washing apparatus, the display portion P8 may display the selection request D211 for the user to select information about which one of the laundry drying apparatus 20 and the mini apparatus 60 to be displayed thereon.

When the selection request D211 is displayed, the control panel P may perform a determination step Q5 to determine information about which of the laundry drying apparatus 20 and the mini apparatus 60 to be displayed based on the detection of the input to the manipulation portion P7. In the determining step Q5, the user may turn the manipulation portion P7 to select one of the names of the laundry drying apparatus 20 and the mini apparatus 60.

When the determining step Q5 is performed, a selected apparatus display step Q6 in which the display portion P8 displays information on the selected home appliance may be performed.

For example, when a command to select the laundry drying apparatus 20 is input to the manipulation portion P7 and the selection portion R, the display portion P8 may display the laundry drying apparatus information D21A.

Thereafter, when the re-input detection step Q7 of detecting that the connection command is re-input to the switching portion E is performed, the return step Q8 in which the display portion P8 displays the laundry washing apparatus information D21 again may be performed.

Figure 21A:
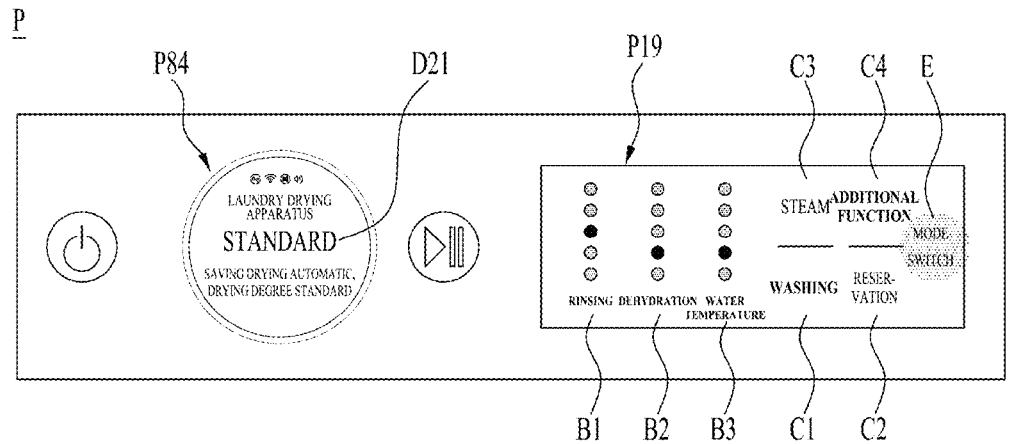
Figure 21B:
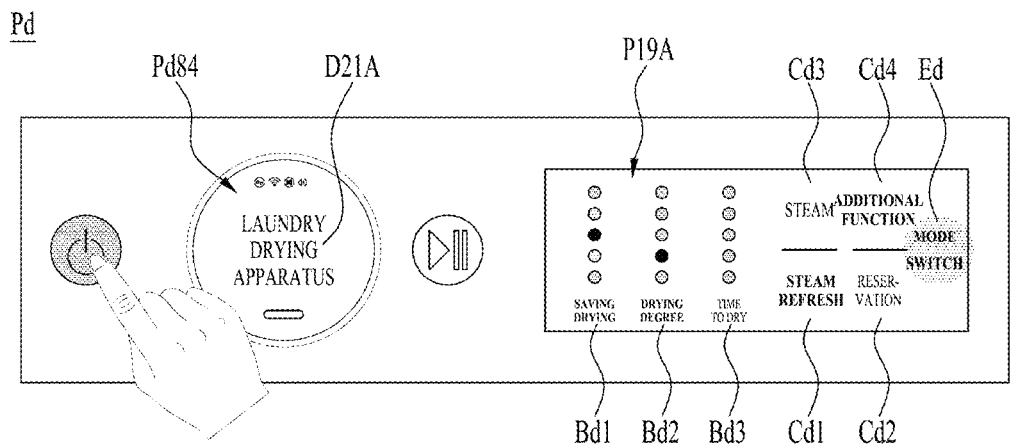
Figure 21C:
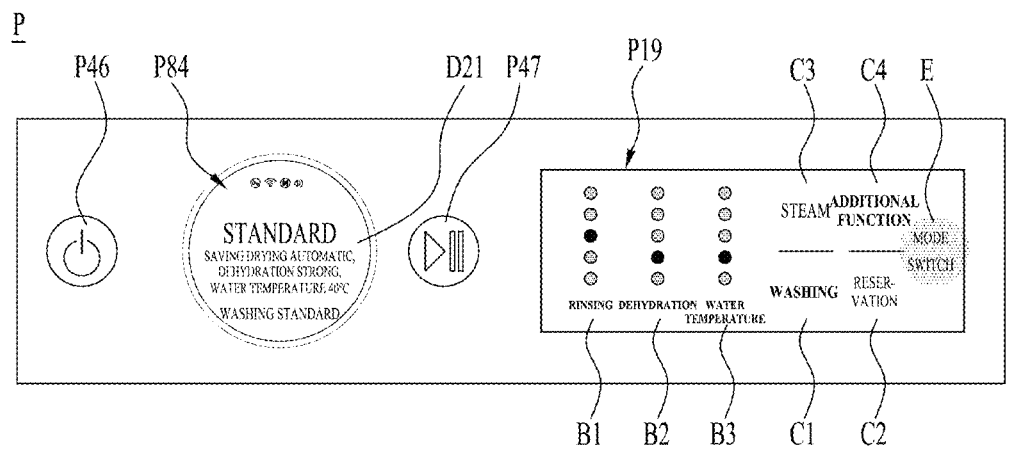

FIGS. 21A to 21C show still another embodiment of the laundry treating apparatus 10.

Referring to FIG. 21A, the control panel P may be configured so that the connection command is input to the switching portion E such that the control panel P may control another home appliance. For example, the display portion P8 may be configured to display the laundry drying apparatus information D21A. The power switch P46, the executing portion P47, the manipulation portion P7 may be configured to transmit a command to the laundry drying apparatus 20.

Referring to FIG. 21B, an additional command may be input to the laundry drying apparatus 20. For example, the user may turn on the power switch p47 of the control panel PA of the laundry drying apparatus 20.

Even when the control panel P is in a state that the control panel may control the laundry drying apparatus 20 upon the connection command being input to the switching portion E, the drying control panel PA of the laundry drying apparatus 20 may receive all control commands as long as the drying control panel PA is not in a locked state.

Therefore, when a command is input to the power switch P47, the laundry drying apparatus 20 may be powered off, and the pairing thereof with the communication module T may be stopped.

Referring to FIG. 21C, when the power to the laundry drying apparatus 20 is cut off, the control panel P may be configured to display the laundry washing apparatus information D21 again. Accordingly, the control panel P may be configured to control the laundry washing apparatus 10 again.

In the state of FIG. 21B, the user may manipulate not the drying power switch P46A of the laundry drying apparatus 20, but the drying control panel PA such as the drying manipulation portion P7 or the drying setting portion P19A, the drying executing portion P47A, etc.

The user manipulating the drying control panel PA may mean that the user does not need to manipulate the control panel P of the laundry washing apparatus 10.

Further, when a user manipulating the control panel P of the laundry washing apparatus 1 and a user manipulating the drying control panel PA are different from each other, confusion therebetween may occur.

Accordingly, when a user's manipulation of the drying control panel PA or a command input to the drying control panel PA is sensed, the control panel P may stop control of the laundry drying apparatus 20. In other words, when a command is input to the drying power switch P46A of the drying control panel PA, as well as one of the drying manipulation portion P7, the drying executing portion P47, and the drying setting portion P2A, the display portion P8 which has displayed the laundry drying apparatus information D21A thereon may display the laundry washing apparatus information D21 again thereon even when the connection command is input to the switching portion E.

Figure 22:
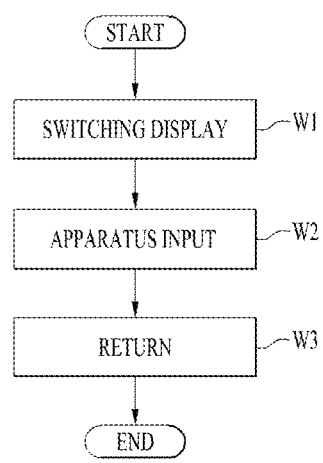

FIG. 22 shows the control method of FIGS. 21A to 21C.

In the home appliance system according to the present disclosure, a switching display step W1 in which the connection command is input to the switching portion E and thus a state in which the control panel P of a specific home appliance displays may control another home appliance is displayed may be performed.

An apparatus input step W2 in which the user's manipulation command is input to the home appliance controlled during the switching display step W1 may be performed. When the apparatus input step W2 is performed, the home appliance system according to present disclosure may perform a return step W3 in which the control panel P of the specific home appliance stops control of the other home appliance and returns to and controls the corresponding apparatus.

In other words, when the connection command is input to the switching portion E in the switching display step W1, the display portion P8 may be configured to display the name, the selected state, and the executed state of the course or the option which the laundry drying apparatus 20 or the mini apparatus 60 may perform.

However, when the laundry drying apparatus 20 or the mini apparatus 60 receives a control command to independently select or execute the course or the option in the apparatus input step W2, the display portion P8 may re-display the name, selected state, and executed state of the course or the option that may be selected using the manipulation portion P4 in the return step W3.

This scheme may prevent confusion between the users, and may allocate the priority to a manipulation command of a user who actually manipulate the home appliance.

Figure 23A:
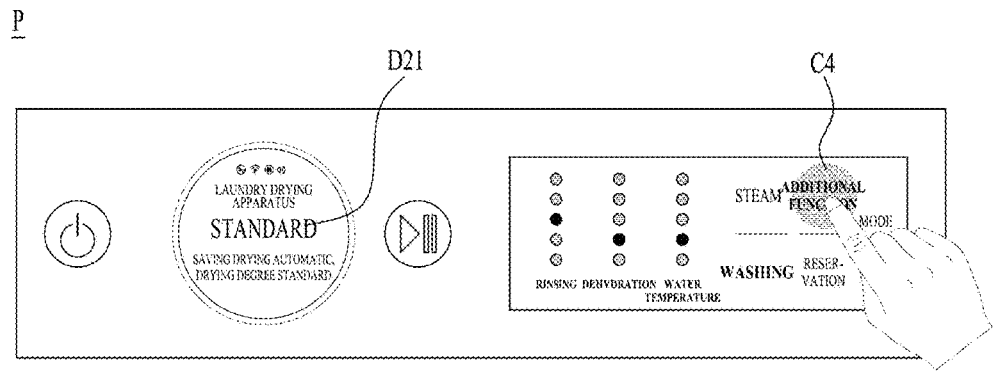
Figure 23B:
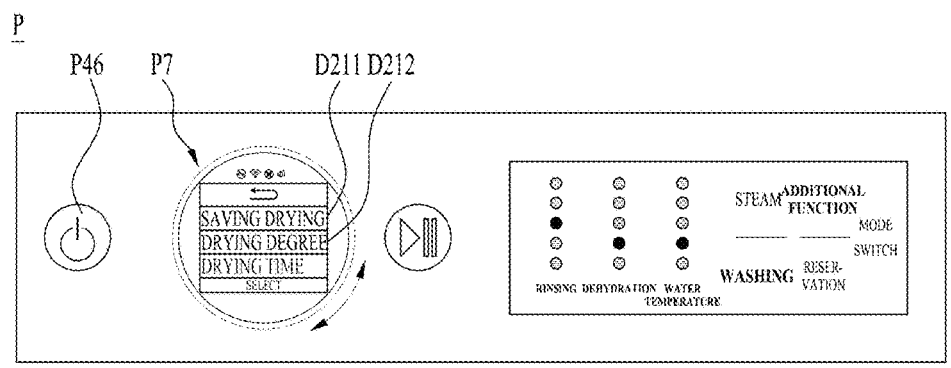
Figure 23C:
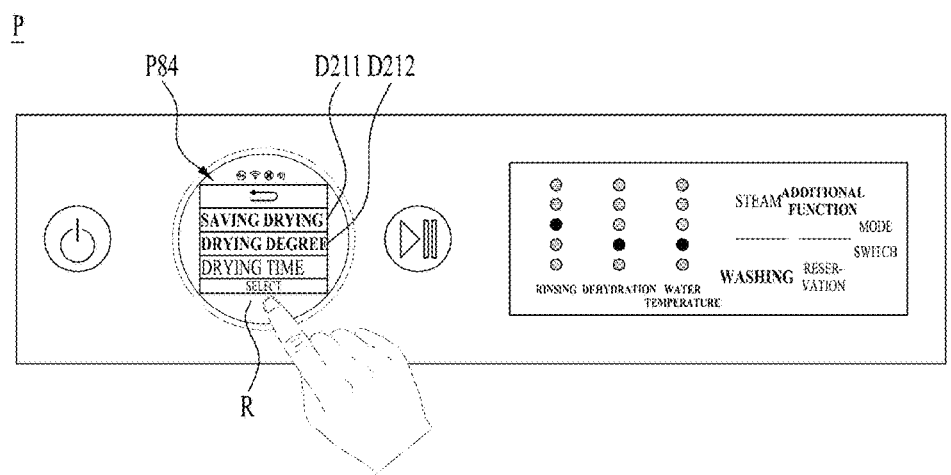

FIGS. 23A to 23C show still yet another embodiment of the treating laundry apparatus according to the present disclosure.

Referring to FIG. 23A, the setting portion P2 of the control panel P may be configured so that the display thereon does not change. Therefore, even when the connection command is input to the switching portion E, the setting portion P2 may not be able to display the option information, etc. of another home appliance.

Referring to FIG. 23B, when the connection command is input to the switching portion E, the display portion P8 may display options of the controlled home appliance which may be changed.

Specifically, in the state in which the connection command is input to the switching portion E, the command may be input to the selection portion R is input or the command may be input to the setting portion P2, the display portion P8 may display a list of options which may be inputted or changed in another home appliance.

The display portion P8 may display a list of options such that only option information that may be executed in the current state of the home appliance may be input or selected, and may inactivate the option that cannot be executed so that the option cannot be selected. Therefore, the user cannot select the list of the options as inactivated using the manipulation portion P7.

For example, when any drying course or option is being performed in the laundry drying apparatus 20, etc., the setting of the time duration for performing the course and option is prohibited to be changed.

Therefore, the display portion P8 may set, to the variable menus, the energy saving drying D211 that may control energy by changing the temperature of the hot air, the number of rotations of the drum, the driving intensity of the blowing fan, etc., and the drying amount D212 to adjust a drying target value of the laundry but may set the drying time duration to an invariable menu.

In addition, the list of the menus or options may be changed based on the executed state of the course or option of the home appliance. That is, the above list of the menus or options may vary as setting or changing the options may vary according to the type and executed state of the course or option of the laundry drying apparatus 20 or the mini apparatus 60.

For example, there is no reason to spray steam to the laundry in a wet state in an initial state of the drying course. Thus, in an initial state of the drying course, it is impossible to set a steam option. However, it is possible set the steam option since a moment when dryness of the laundry exceeds 50%. In addition, a condenser washing option to wash the heat exchanger 4 is also impossible at the beginning of the drying course because condensate is not sufficiently collected at the beginning of the drying course. However, the condenser washing option may be possible since a moment when the dryness exceeds 70%.

Accordingly, the steam option or the condenser cleaning option may be displayed on the display portion P8 in a different manner depending on the execution time of the drying course.

Referring to FIG. 23C, the user may turn the manipulation portion P7 to select option information to change from the list. The manipulation portion P7 may be configured to select any one option of the list. A command may be input to the selection portion R to input the option information.

Thereafter, the user may use the manipulation portion P7 and the selection portion R to set or change the option of the home appliance that is controlled or displayed.

Accordingly, even when the control panel P cannot set or change the option of another home appliance using the setting portion P2, the user may set an option of another home appliance or change the set option, using the manipulation portion P7, and the selection portion, R and the display portion P8.

FIGS. 24A and 24B show an embodiment when pairing of home appliances is impossible in a laundry treating apparatus of the present disclosure.

Referring to FIG. 24A, the control panel P may be configured to control the laundry washing apparatus 10. The displaying portion P8 may be configured to display the laundry washing apparatus information D21.

In this regard, the user may input the connection command to the conversion unit E.

However, the communication module T of the laundry washing apparatus 10 may not be paired with the other home appliance or may not be able to be in the paired state.

However, even in such state, the switching portion E may be activated and may receive the connection command. Therefore, the user may recognize that there is no problem with the switching function.

Referring to FIG. 24B, when the switching portion E is input, the displaying portion P8 may be configured to display a disabled state indicating that the name of the course or the option that other home appliances may perform, the selected state, and the executed state are not able to be displayed to the outside.

In other words, the switching portion E may be activated and the communication module T of the laundry washing apparatus 10 may inform the user that the normal state. In addition, by displaying the disabled state, it may be displayed to the user that there is a problem outside the laundry washing apparatus 10, such as the laundry drying apparatus 20, the mini apparatus 60, or the AP, not the laundry washing apparatus 10.

As such, the user may focus on finding the problem outside the laundry washing apparatus 10 and promote quick problem solving.

FIGS. 25A to 25D show an embodiment when pairing of home appliances is incomplete in a laundry treating apparatus of the present disclosure.

Figure 25A:
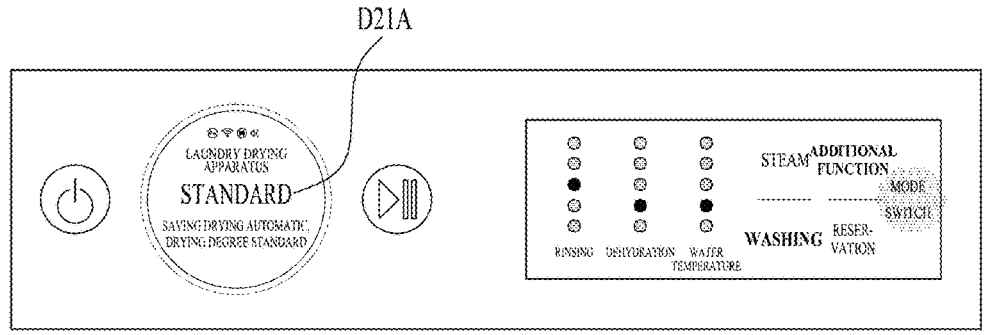

Referring to FIG. 25A, the control panel P of a specific home appliance may be configured to display information of the other home appliance as the connection command has already been input to the switching portion E.

For example, the control panel P of the laundry washing apparatus 10 may display the laundry drying apparatus information D21A. In this regard, the paired state of the laundry washing apparatus 10 and the laundry drying apparatus 20 may be unstable.

Figure 25B:
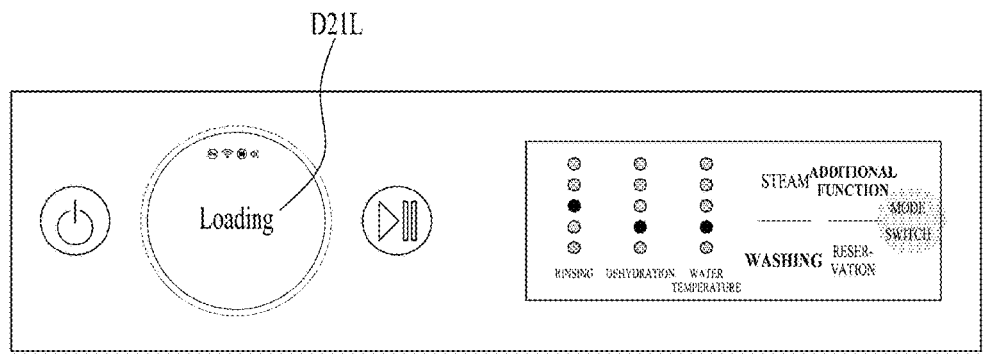

Referring to FIG. 25B, when the communication module T of the laundry washing apparatus 10 and the laundry drying apparatus 20 are paired with each other unstably, the displaying portion P8 may display loading information D21L representing at least one of communication connection with the laundry drying apparatus 20 being unstable or being re-done.

When the loading information D21L is displayed on the displaying portion P8, the communication module may re-try the communication connection with the laundry drying apparatus 20. In this regard, when the communication connection is established again, the displaying portion P8 may continue to display the laundry drying apparatus information D21A again.

Figure 25C:
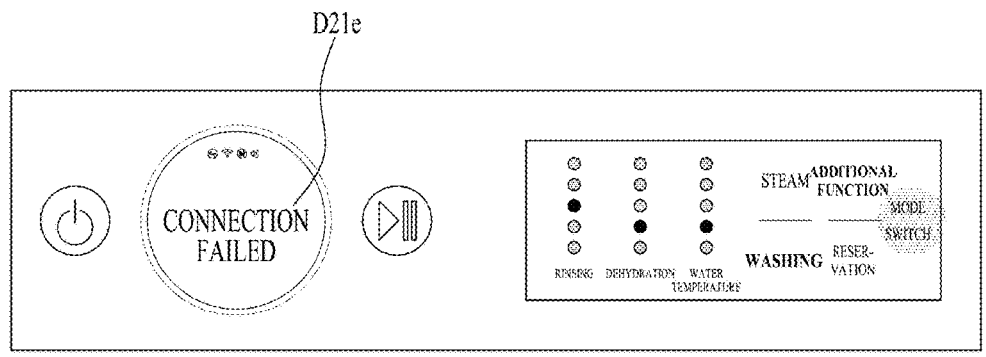

Referring to FIG. 25C, the communication module T may not be paired with the laundry drying apparatus 20 again. The displaying portion P8 may display disability information D21e indicating that the communication connection with the laundry drying apparatus 20 is impossible. Therefore, the user may be prevented from waiting indefinitely without even identifying the laundry washing apparatus information D21.

Figure 25D:
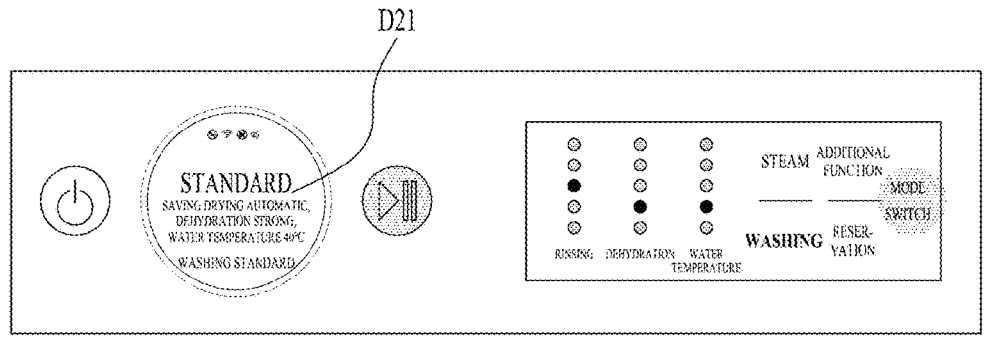

Referring to FIG. 25D, when the loading information D21L or the disability information D21e is displayed for a reference duration, the displaying portion P8 may display the laundry washing apparatus information D21 again.

FIGS. 26A to 26D show another embodiment when pairing of home appliances is incomplete in a laundry treating apparatus of the present disclosure.

Figure 26A:
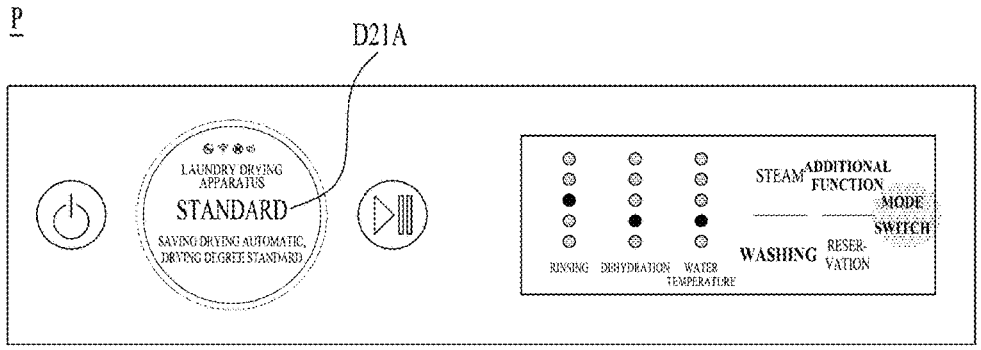

Referring to FIG. 26A, the control panel P of the specific home appliance may be configured to display information of the other home appliance as the connection command has already been input to the switching portion E.

For example, the control panel P of the laundry washing apparatus 10 may display the laundry drying apparatus information D21A. In this regard, the paired state of the laundry washing apparatus 10 and the laundry drying apparatus 20 may be unstable.

Figure 26B:
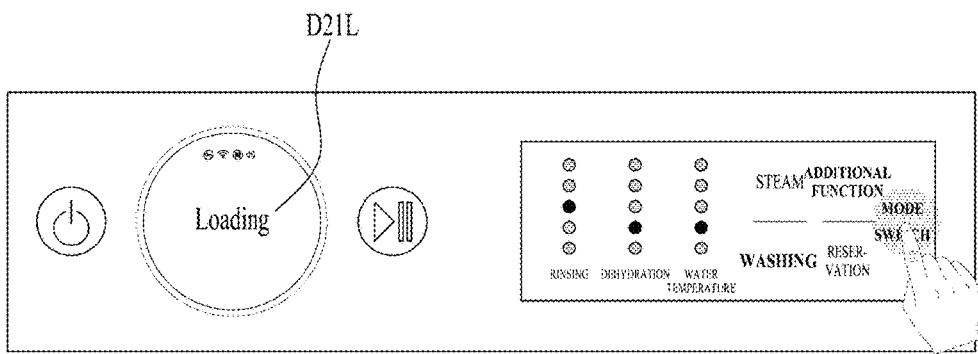

Referring to FIG. 26B, when the communication module T of the laundry washing apparatus 10 and the laundry drying apparatus 20 are paired with each other unstably, the displaying portion P8 may display the loading information D21L representing at least one of communication connection with the laundry drying apparatus 20 being unstable or being re-done.

In addition, the communication module T may also display disability information D21e as the communication connection with the laundry drying apparatus 20 is unstable.

Figure 26C:
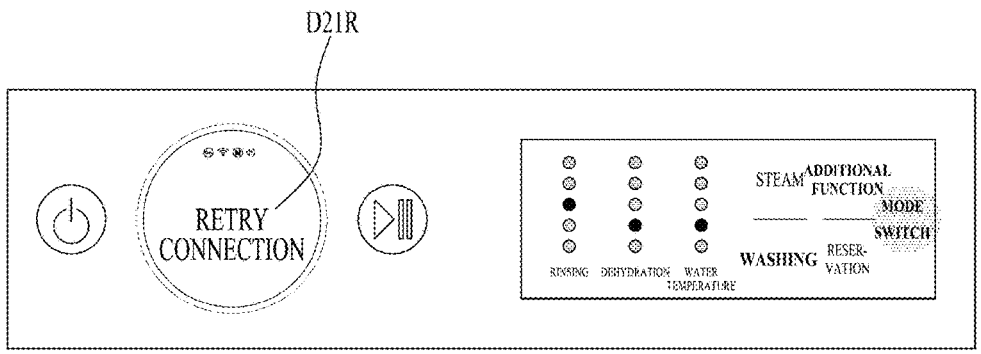

Referring to FIG. 26C, the connection command may be input to the switching portion E again. The connection command being input to the switching portion E again may be seen as a reconnection intention indicating that the user wants the communication module T to be reconnected to the laundry drying apparatus 20.

Accordingly, when the connection command is input to the switching portion E again, the displaying portion P8 may display reconnection execution information D21R. in this regard, the communication module T may actively perform the pairing of the laundry drying apparatus 20 while transmitting a signal to the communication module of the laundry drying apparatus 20 or even to the server 50.

Figure 26D:
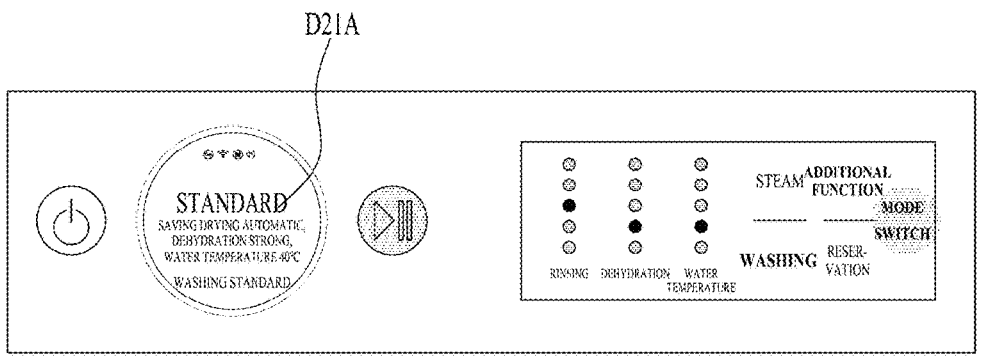

Referring to FIG. 26D, when the communication module T of the laundry washing apparatus is successfully paired with the drying communication module T2 of the laundry drying apparatus 20, the displaying portion P8 may display the laundry drying apparatus information D21A again.

In one example, when the pairing is still impossible, the displaying portion P8 may display the disability information D21e again.

FIGS. 27A and 27B show an embodiment in which the control panel P displays states of a plurality of home appliances.

The displaying portion P8 may be set to display the state of the original home appliance and display the state of another home appliance instead differently in a form or a scheme.

For example, the displaying portion P8 of the laundry washing apparatus 10 may display the laundry washing apparatus information D21, the laundry drying apparatus information D21A, and the mini apparatus information D21B differently.

Referring to FIG. 27A, the displaying portion P8 of the laundry washing apparatus 10 may display the laundry washing apparatus information D21 in various manners by mixing an icon, a remaining time state bar, a picture, and the like with each other in addition to the phrase.

Referring to FIG. 27B, when the connection command is input to the switching portion E, the displaying portion P8 may display the laundry drying apparatus information D21A centered on the phrase. For example, the display of the remaining time state bar may be omitted, and simple information indicating that the laundry drying apparatus 20 is performing the course or the option, and the course or the option is able to be stopped may only be displayed.

Accordingly, the user may intuitively recognize which home appliance the information displayed on the displaying portion P8 is about. In addition, confusion in the remaining time or the like may be prevented.

Furthermore, other users who did not input the connection command to the switching portion E may also intuitively recognize whether the displaying portion P8 is displaying the state of the corresponding home appliance or the state of another home appliance.

The present disclosure may be modified and implemented in various forms, so that the scope of rights thereof is not limited to the above-described embodiment. Therefore, when the modified embodiment includes the components of the claims of the present disclosure, it should be viewed that the modified embodiment belongs to the scope of rights of the present disclosure.

What is claimed is:

1. A laundry treating apparatus comprising:
    a cabinet;
    a drum disposed in the cabinet and configured to receive laundry therein;
    a driver configured to rotate the drum;
    a control panel configured to receive an input and display information and including:
        a manipulation portion configured to receive a selection command for triggering an operation of the driver, a display portion configured to display state information including one or more of a name, a selected state, or an executed state of a course or an option triggering the operation of the driver, and a setting portion disposed at an outside of the manipulation portion and the display portion and configured to receive a change command to change the operation of the driver;

a communication module configured to communicate with a home appliance that is different from the laundry treating apparatus; and a switch disposed at the cabinet and configured to receive a connection command that causes the communication module to communicate with the home appliance, wherein the setting portion is configured to, based on the switch receiving the connection command, be deactivated to thereby restrict at least a part of the setting portion from receiving the change command.

2. The laundry treating apparatus of claim 1, wherein the display portion is configured to, based on the switch receiving the connection command, display thereon a list of options to be changed in the home appliance.

3. The laundry treating apparatus of claim 2, wherein the manipulation portion is configured to, based on the list of options being displayed on the display portion, receive the selection command for selecting a first option to be changed in the home appliance among the list of options.

4. The laundry treating apparatus of claim 3, wherein the control panel includes a selection portion configured to receive a determination command that is for determining the state information and that varies based on the state information, and wherein the selection portion is configured to, based on the list of options being displayed on the display portion, receive the determination command for determining the selection command selecting the first option.

5. The laundry treating apparatus of claim 4, wherein the selection portion is disposed inside the manipulation portion.

6. The laundry treating apparatus of claim 3, wherein the display portion is configured to display a list of options that are restricted to be selected based on an executed state of a course or an option of the home appliance such that the list of options is restricted to be selected using the manipulation portion.

7. The laundry treating apparatus of claim 1, wherein the display portion is configured to, based on the switch receiving the connection command, display thereon one or more of a name, a selected state, or an executed state of a course or an option to be executed by the home appliance, and wherein the display portion is configured to, based on the home appliance receiving a control command for independently selecting or executing the course or the option, display thereon the name, the selected state, or the executed state of the course or the option to be selected using the manipulation portion.

8. The laundry treating apparatus of claim 7, wherein the display portion is configured to display thereon (i) an executed state of the course or the option to be selected using the manipulation portion and (ii) an executed state of a course or an option performed in the home appliance differently from the executed state of the course or the option to be selected using the manipulation portion.

9. The laundry treating apparatus of claim 8, wherein the display portion is configured to display thereon a remaining time duration of the course or the option to be selected using the manipulation portion, and wherein the display portion is configured to not display thereon a remaining time duration of the course or the option performed in the home appliance.

10. The laundry treating apparatus of claim 1, wherein the display portion is configured to, based on (i) the communication module and the home appliance not being able to communicate with each other and (ii) the switch receiving the connection command, display thereon display inability information indicating that the display portion does not display a name, a selected state, or an executed state of a course or an option to be performed by the home appliance.

11. The laundry treating apparatus of claim 10, wherein the display portion is configured to, based on the communication module and the home appliance not being able to communicate with each other while the display portion displays the name, the selected state, or the executed state of the course or the option to be performed by the home appliance, display thereon one or more of the display inability information or reconnection information for re-attempting communication connection with the home appliance.

12. The laundry treating apparatus of claim 11, wherein the display portion is configured to, based on the reconnection information or the inability information being continuously displayed for a reference time duration, display thereon the name, the selected state, and the executed state of the course or the option to be selected using the manipulation portion.

13. The laundry treating apparatus of claim 12, wherein the display portion is configured to, based on the switch receiving the connection command again within the reference time duration, display thereon the reconnection information.

14. The laundry treating apparatus of claim 1, wherein a list of options displayed on the display portion is configured to vary based on an executed state of a course or an option of the home appliance.

15. The laundry treating apparatus of claim 1, wherein the communication module is configured to communicate with an additional product that is disposed separately from the cabinet and the home appliance and that is configured to receive the laundry, and wherein the display portion is configured to, based on the switch receiving the connection command, display thereon a selection request requesting selection of one among the home appliance and the additional product such that one or more of a name, a selected state, or a executed state of a course or an option of the selected one is displayed on the display portion.

16. The laundry treating apparatus of claim 15, wherein the manipulation portion is configured to select one among the home appliance and the additional product such that one or more of a name, a selected state, or a executed state of a course or an option of the selected one is displayed on the display portion.

17. The laundry treating apparatus of claim 1, wherein the manipulation portion is rotatably disposed on the cabinet, and wherein the display portion is coupled to the cabinet and located inside the manipulation portion.

18. The laundry treating apparatus of claim 1, further comprising an encoder, wherein the control panel includes a circuit board, and wherein the encoder is configured to rotatably couple the manipulation portion to the circuit board.

19. The laundry treating apparatus of claim 18, wherein the encoder includes a first portion fixed to the circuit board to which the manipulation portion is coupled.

20. The laundry treating apparatus of claim 1, wherein the setting portion includes a plurality of lamps and a plurality of conductor switches configured to sense a user.

* * * * *